(12) United States Patent
Kim et al.

(10) Patent No.: US 10,965,622 B2
(45) Date of Patent: Mar. 30, 2021

(54) METHOD AND APPARATUS FOR RECOMMENDING REPLY MESSAGE

(71) Applicant: Samsung Electronics Co., Ltd., Suwon-si (KR)

(72) Inventors: Deok-ho Kim, Seoul (KR); Hae-jun Lee, Suwon-si (KR); Eun-jeong Ko, Seoul (KR); Ji-hyun Rho, Seoul (KR); Volodymyr Zubariev, Hwaseong-si (KR); Tae-yeun Yang, Seoul (KR); Ha-yoon Jung, Seoul (KR); Ho-jin Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 483 days.

(21) Appl. No.: 15/064,085

(22) Filed: Mar. 8, 2016

(65) Prior Publication Data

US 2016/0308794 A1 Oct. 20, 2016

Related U.S. Application Data

(60) Provisional application No. 62/148,378, filed on Apr. 16, 2015, provisional application No. 62/163,605, filed on May 19, 2015.

(30) Foreign Application Priority Data

May 29, 2015 (KR) .................. 10-2015-0076488
Sep. 21, 2015 (KR) .................. 10-2015-0133096

(51) Int. Cl.
*G06F 15/16* (2006.01)
*H04L 12/58* (2006.01)
*H04M 19/04* (2006.01)

(52) U.S. Cl.
CPC ............ *H04L 51/02* (2013.01); *H04L 51/046* (2013.01); *H04M 19/04* (2013.01)

(58) Field of Classification Search
CPC ...................................... H04L 12/58
(Continued)

(56) References Cited

U.S. PATENT DOCUMENTS 5,180,309 A * 1/1993 Egnor .................. G09B 7/04
273/430
5,297,250 A * 3/1994 Leroy .................. G06F 8/38
715/763

(Continued)

FOREIGN PATENT DOCUMENTS

CN 102323873 A 1/2012
CN 102611796 A 7/2012
(Continued)

OTHER PUBLICATIONS

U.S. Appl. No. 62/055,333, filed Sep. 25, 2014, All pages.*
(Continued)

*Primary Examiner* — Anthony Mejia
(74) *Attorney, Agent, or Firm* — Jefferson IP Law, LLP

(57) ABSTRACT

A device for transmitting a reply message is provided. The device includes a communication unit configured to receive a question message from another device, a controller configured to determine a category of the question message, a display unit configured to display a user interface (UI) for selecting data to be included in a reply message to the question message, according to the category, and a user input unit configured to receive a user input of selecting data to be included in the reply message through the UI, wherein the communication unit transmits the reply message including the data to the other device.

20 Claims, 93 Drawing Sheets

(58) Field of Classification Search
USPC .................................................... 709/206
See application file for complete search history.

(56) References Cited

U.S. PATENT DOCUMENTS

| | | | | |
|---|---|---|---|---|
| 5,705,995 A * | 1/1998 | Laflin | | G08B 5/227 |
| | | | | 340/4.5 |
| 6,497,412 B1 * | 12/2002 | Bramm | | A63F 9/183 |
| | | | | 273/430 |
| 6,842,877 B2 * | 1/2005 | Robarts | | G06F 21/606 |
| | | | | 715/708 |
| 7,137,070 B2 | 11/2006 | Brown et al. | | |
| 7,207,010 B2 * | 4/2007 | Hirneisen | | G09B 23/36 |
| | | | | 707/999.1 |
| 7,437,338 B1 * | 10/2008 | Forman | | G06N 20/00 |
| | | | | 706/20 |
| 7,475,109 B1 * | 1/2009 | Fletcher | | G06Q 10/107 |
| | | | | 709/204 |
| 7,533,348 B2 * | 5/2009 | D'Hers | | G06Q 10/109 |
| | | | | 715/764 |
| 7,593,904 B1 * | 9/2009 | Kirshenbaum | | G06N 20/00 |
| | | | | 706/12 |
| 7,668,789 B1 * | 2/2010 | Forman | | G06N 20/00 |
| | | | | 706/20 |
| 7,788,327 B2 | 8/2010 | Naito et al. | | |
| 8,059,491 B1 * | 11/2011 | Hennings-Kampa | | |
| | | | | G04G 9/0064 |
| | | | | 368/14 |
| 8,082,590 B2 | 12/2011 | Kim et al. | | |
| 8,160,566 B2 | 4/2012 | Angwin et al. | | |
| 8,195,169 B1 * | 6/2012 | Upadhyay | | H04L 51/38 |
| | | | | 455/445 |
| 8,275,351 B1 | 9/2012 | Cazanas et al. | | |
| 8,359,014 B2 | 1/2013 | Olincy et al. | | |
| 8,516,059 B1 | 8/2013 | Singh et al. | | |
| 8,548,509 B2 | 10/2013 | Goyal et al. | | |
| 8,626,706 B2 | 1/2014 | Babu | | |
| 8,719,073 B1 * | 5/2014 | Kirshenbaum | | G06Q 30/0201 |
| | | | | 705/7.32 |
| 8,817,968 B1 * | 8/2014 | Boutcher | | H04M 3/5191 |
| | | | | 379/265.09 |
| 8,972,323 B2 | 3/2015 | Grieves et al. | | |
| 8,995,972 B1 * | 3/2015 | Cronin | | H04W 4/18 |
| | | | | 455/414.3 |
| 8,996,639 B1 * | 3/2015 | Faaborg | | H04L 51/02 |
| | | | | 709/206 |
| 9,047,290 B1 * | 6/2015 | Kirshenbaum | | G06N 5/00 |
| 9,638,537 B2 * | 5/2017 | Abramson | | G01C 21/3626 |
| 9,659,037 B2 * | 5/2017 | Soni | | G01N 33/49 |
| 10,276,170 B2 * | 4/2019 | Gruber | | G06F 16/9537 |
| 2001/0003479 A1 * | 6/2001 | Fujiwara | | G09B 5/067 |
| | | | | 353/122 |
| 2001/0049597 A1 * | 12/2001 | Klipstein | | G06F 40/20 |
| | | | | 704/200.1 |
| 2002/0156917 A1 * | 10/2002 | Nye | | H04L 63/104 |
| | | | | 709/238 |
| 2002/0182577 A1 * | 12/2002 | Yoshizawa | | G09B 3/00 |
| | | | | 434/322 |
| 2003/0004909 A1 * | 1/2003 | Chauhan | | G06N 5/022 |
| | | | | 706/45 |
| 2003/0046401 A1 * | 3/2003 | Abbott | | G06F 9/451 |
| | | | | 709/228 |
| 2003/0050778 A1 * | 3/2003 | Nguyen | | G10L 15/30 |
| | | | | 704/235 |
| 2004/0054709 A1 * | 3/2004 | Bess | | G06Q 99/00 |
| | | | | 709/200 |
| 2004/0210470 A1 * | 10/2004 | Rusk | | G06Q 10/063114 |
| | | | | 705/7.15 |
| 2005/0033617 A1 * | 2/2005 | Prather | | G06Q 10/06 |
| | | | | 434/323 |
| 2005/0198128 A1 * | 9/2005 | Anderson | | G06F 40/166 |
| | | | | 709/204 |
| 2005/0198147 A1 * | 9/2005 | Pastro | | H04M 3/5322 |
| | | | | 709/206 |
| 2006/0069728 A1 | 3/2006 | McEvilly et al. | | |
| 2006/0112078 A1 * | 5/2006 | Betarbet | | G06Q 10/107 |
| 2006/0242253 A1 * | 10/2006 | Kwon | | H04M 15/08 |
| | | | | 709/207 |
| 2006/0248054 A1 * | 11/2006 | Kirshenbaum | | G06F 16/35 |
| 2007/0022026 A1 * | 1/2007 | Davidson | | G06Q 30/0282 |
| | | | | 705/31 |
| 2007/0226649 A1 | 9/2007 | Agmon | | |
| 2007/0239981 A1 * | 10/2007 | Lessing | | G06K 7/10237 |
| | | | | 713/164 |
| 2007/0281759 A1 * | 12/2007 | Choi | | H04M 1/72552 |
| | | | | 455/575.1 |
| 2007/0288969 A1 * | 12/2007 | Prum | | A63F 13/10 |
| | | | | 725/81 |
| 2008/0045249 A1 | 2/2008 | Nam | | |
| 2008/0102889 A1 | 5/2008 | May et al. | | |
| 2008/0166691 A1 * | 7/2008 | Cowley | | G09B 7/02 |
| | | | | 434/322 |
| 2008/0235095 A1 * | 9/2008 | Oles | | G06Q 30/0225 |
| | | | | 705/14.26 |
| 2009/0094050 A1 * | 4/2009 | Yoshida | | G06Q 30/012 |
| | | | | 705/346 |
| 2009/0192947 A1 * | 7/2009 | Kenigsberg | | G06Q 40/06 |
| | | | | 705/36 R |
| 2009/0216803 A1 * | 8/2009 | Goldfarb | | G06Q 40/08 |
| 2009/0259642 A1 * | 10/2009 | Cao | | G06F 16/353 |
| 2009/0319633 A1 | 12/2009 | Adams et al. | | |
| 2010/0281426 A1 * | 11/2010 | Schmidt | | G06F 16/2477 |
| | | | | 715/810 |
| 2011/0252108 A1 | 10/2011 | Morris et al. | | |
| 2011/0307478 A1 * | 12/2011 | Pinckney | | G06F 16/9537 |
| | | | | 707/724 |
| 2012/0239761 A1 | 9/2012 | Linner et al. | | |
| 2012/0297341 A1 * | 11/2012 | Glazer | | G06F 8/30 |
| | | | | 715/810 |
| 2012/0303355 A1 | 11/2012 | Liu et al. | | |
| 2012/0315880 A1 * | 12/2012 | Peitrow | | H04M 1/642 |
| | | | | 455/412.1 |
| 2013/0041951 A1 | 2/2013 | Lee et al. | | |
| 2013/0050267 A1 * | 2/2013 | Miyamoto | | G09G 5/14 |
| | | | | 345/660 |
| 2013/0055156 A1 * | 2/2013 | Miyamoto | | G06F 16/958 |
| | | | | 715/810 |
| 2013/0172027 A1 | 7/2013 | Sturges et al. | | |
| 2013/0226453 A1 | 8/2013 | Trussel et al. | | |
| 2013/0232204 A1 | 9/2013 | Barney et al. | | |
| 2013/0290865 A1 * | 10/2013 | Kageyama | | G06F 13/00 |
| | | | | 715/747 |
| 2013/0346496 A1 * | 12/2013 | Maarek | | G06Q 50/01 |
| | | | | 709/204 |
| 2014/0088954 A1 | 3/2014 | Shirzadi et al. | | |
| 2014/0114986 A1 * | 4/2014 | Bierner | | G06Q 10/10 |
| | | | | 707/748 |
| 2014/0120510 A1 * | 5/2014 | Blanchard | | G09B 3/00 |
| | | | | 434/322 |
| 2014/0122056 A1 | 5/2014 | Duan | | |
| 2014/0129457 A1 * | 5/2014 | Peeler | | G06Q 10/067 |
| | | | | 705/317 |
| 2014/0179227 A1 * | 6/2014 | Nousiainen | | H04L 51/043 |
| | | | | 455/41.2 |
| 2014/0189829 A1 * | 7/2014 | McLachlan | | H04L 63/08 |
| | | | | 726/6 |
| 2014/0194064 A1 | 7/2014 | Murakami | | |
| 2014/0221854 A1 * | 8/2014 | Wai | | A61B 5/02444 |
| | | | | 600/508 |
| 2014/0222655 A1 * | 8/2014 | Cummings | | G06Q 30/0185 |
| | | | | 705/38 |
| 2014/0282108 A1 * | 9/2014 | Wenger | | G06F 3/0482 |
| | | | | 715/753 |
| 2014/0282915 A1 * | 9/2014 | Tekwani | | H04L 63/08 |
| | | | | 726/4 |
| 2014/0289604 A1 | 9/2014 | Cheung et al. | | |
| 2014/0297543 A1 * | 10/2014 | Mitsuhashi | | G06Q 30/02 |
| | | | | 705/304 |

(56) References Cited

U.S. PATENT DOCUMENTS

| | | | | |
|---|---|---|---|---|
| 2014/0347289 | A1* | 11/2014 | Suh | G06F 3/017 345/173 |
| 2014/0351016 | A1* | 11/2014 | Khundmiri | G06Q 30/0203 705/7.32 |
| 2015/0032724 | A1* | 1/2015 | Thirugnanasundaram | H04L 51/32 707/722 |
| 2015/0088485 | A1* | 3/2015 | Alhabobi | G06F 40/58 704/2 |
| 2015/0113435 | A1* | 4/2015 | Phillips | G06F 40/20 715/752 |
| 2015/0163358 | A1* | 6/2015 | Klemm | G06F 16/248 379/88.01 |
| 2015/0205946 | A1* | 7/2015 | Aurongzeb | G06F 3/0346 726/19 |
| 2015/0207765 | A1* | 7/2015 | Brantingham | H04L 51/046 715/758 |
| 2015/0228280 | A1* | 8/2015 | Watanabe | G10L 15/26 704/235 |
| 2015/0258422 | A1* | 9/2015 | Volpe | A63F 3/00006 273/242 |
| 2015/0302301 | A1* | 10/2015 | Petersen | G06N 5/04 706/11 |
| 2015/0363500 | A1* | 12/2015 | Bhamidipati | G06F 3/04842 707/722 |
| 2016/0048514 | A1* | 2/2016 | Allen | G06F 16/24578 707/731 |
| 2016/0092410 | A1* | 3/2016 | Martin | G06Q 30/0241 715/269 |
| 2016/0110748 | A1* | 4/2016 | Xiong | G06Q 30/0212 705/14.14 |
| 2016/0147762 | A1* | 5/2016 | Yu | G06F 8/38 707/723 |
| 2016/0147828 | A1* | 5/2016 | Yu | G06F 16/3329 705/31 |
| 2016/0196561 | A1* | 7/2016 | Iyer | G06Q 30/016 705/304 |
| 2016/0308799 | A1* | 10/2016 | Schubert | H04L 51/046 |
| 2016/0359771 | A1* | 12/2016 | Sridhar | H04M 1/72552 |
| 2016/0371276 | A1* | 12/2016 | Furtado | G06F 16/24578 |
| 2017/0126610 | A1* | 5/2017 | Sachidanandam | G06Q 10/109 |

FOREIGN PATENT DOCUMENTS

| | | | | |
|---|---|---|---|---|
| CN | 104123070 A | | 10/2014 | |
| CN | 104516986 A | | 4/2015 | |
| EP | 1 715 475 A1 | | 10/2006 | |
| GB | 2385489 A | * | 8/2003 | ............. A63F 13/12 |
| KR | 10-0735886 B1 | | 7/2007 | |
| KR | 10-1300272 B1 | | 8/2013 | |
| KR | 10-2013-0143680 A | | 12/2013 | |

OTHER PUBLICATIONS

Bowskill et al., "Wearable Location Mediated Telecommunications; A First Step Towards Contextual Communication", IEEE, All Pages (Year: 1999).*
Chinese Office Action dated Feb. 6, 2020, issued in Chinese Application No. 201680031982.8.
Chinese Office Action dated Sep. 8, 2020, issued Chinese Application No. 201680031982.8.
European Search Report dated Nov. 20, 2020, issued in European Application No. 20190079.2.
Indian Office Action dated Jan. 14, 2021, issued in Indian Application No. 201727037917.

* cited by examiner

FIG. 32A

| SENDING INTENTION | MESSAGE TYPE | CONTEXT ||||  REPLY INTENTION ||||
|---|---|---|---|---|---|---|---|---|---|
| | | DAY OF WEEK | SCHEDULE | TIME | LOCATION | REPLY INTENTION 1 | REPLY INTENTION 2 | REPLY INTENTION 3 | REPLY INTENTION 4 |
| question_Activity | short_answer_Activity | SATURDAY | MEETING AT 10:00 A.M | AM 9:50 | OFFICE | ACTIVITY_WATCHING_TV | ACTIVITY_WATCHING_TV | ACTIVITY_DOING_NOTHING | NOT_SURE |

3210 — SENDING INTENTION
3220 — MESSAGE TYPE
3230 — CONTEXT
3240 — REPLY INTENTION

FIG. 33A

| SENDING INTENTION | MESSAGE TYPE | CONTEXT ||||  | REPLY INTENTION ||||
|---|---|---|---|---|---|---|---|---|---|
| | | DAY OF WEEK | SCHEDULE | TIME | LOCATION | REPLY INTENTION 1 | REPLY INTENTION 2 | REPLY INTENTION 3 | REPLY INTENTION 4 |
| question ∟ Activity | short_answer ∟ Activity | SATURDAY | PLAN WITH FRIENDS AT 1:00 P.M | AM 9시 | HOME | ACTIVITY_ WATCHING_TV | ACTIVITY_ WATCHING_TV | ACTIVITY_DOING_ NOTHING | NOT_SURE |

| REPLY MESSAGE (3510) | RECEIVED MESSAGE (3520) | CONTEXT (3530) | | | SENDER (3540) |
|---|---|---|---|---|---|
| | | TIME | PLACE | TIME ARRIVED HOME PREVIOUS DAY | |
| YES | ARE YOU TIRED? | MONDAY 09:00 P.M. | OFFICE | 11:00 P.M. | MOTHER |
| YEAH, I'M TIRED | TIRED? | THURSDAY 11:00 P.M | OFFICE | 10:00 P.M | BROTHER |
| I'M DEAD-TIRED | BURNT OUT? | FRIDAY 11:00 P.M. | OFFICE | | MOTHER |
| NO | ARE YOU FEELING TIRED? | SATURDAY 02:00 P.M. | HOME | 11:00 P.M. | WIFE |
| I'M NOT TIRED | BURNT OUT? | SUNDAY 11:00 P.M. | HOME | X | WIFE |
| I'M FINE | ARE YOU WORN OUT? | WEDNESDAY 11:00 A.M. | OFFICE | 6:00 P.M. | FRIEND 1 |
| ⋮ | ⋮ | ⋮ | ⋮ | ⋮ | ⋮ |

FIG. 35B

| CONTEXT | CORRELATION |
|---|---|
| DAY OF WEEK : WEEKDAY | 0.73 |
| DAY OF WEEK : WEEKEND | −0.5 |
| PLACE : OFFICE | 0.82 |
| PLACE : HOME | −0.71 |
| SENDER : MOTHER | 0.02 |
| ⋮ | ⋮ |

3550 — CONTEXT
3560 — CORRELATION

FIG. 36A

| SENDING INTENTION | MESSAGE TYPE | CONTEXT | | | SENDER | REPLY INTENTION | | |
|---|---|---|---|---|---|---|---|---|
| | | TIME | DAY OF WEEK | LOCATION | | REPLY INTENTION 1 | REPLY INTENTION 2 | REPLY INTENTION 3 |
| question | yes or no | NIGHT | WEEK DAY | OFFICE | WIFE | ANSWER_YES | ANSWER_YES | NOT_SURE |

| | AFFIRMATION INTENTION | NEGATION INTENTION |
|---|---|---|
| PROBABILITY | 0.83 | 0.17 |

METHOD AND APPARATUS FOR RECOMMENDING REPLY MESSAGE

CROSS-REFERENCE TO RELATED APPLICATION(S)

This application claims the benefit under 35 U.S.C. § 119(e) of a U.S. Provisional application filed on Apr. 16, 2015 in the U.S. Patent and Trademark Office and assigned Ser. No. 62/148,378, and of a U.S. Provisional application filed on May 19, 2015 in the U.S. Patent and Trademark Office and assigned Ser. No. 62/163,605, and under 35 U.S.C. § 119(a) of a Korean patent application filed on May 29, 2015 in the Korean Intellectual Property Office and assigned Serial number 10-2015-0076488, and of a Korean patent application filed on Sep. 21, 2015 in the Korean Intellectual Property Office and assigned Serial number 10-2015-0133096, the entire disclosure of each of which is hereby incorporated by reference.

TECHNICAL FIELD

The present disclosure relates to methods and apparatuses for analyzing a received message. More particularly, the present disclosure relates to methods and apparatuses for analyzing a received message and providing a user interface or a recommended replay message required to prepare a replay message based on content of the analyzed message.

BACKGROUND

According to developments in natural language processing technologies, devices are able to analyze meanings of messages exchanged between users. Natural language processing technologies may mean technologies capable of processing a language used by people for communication so as to be understandable to a computer, or technologies capable of expressing information processed by a computer in a language used by people for communication.

According to mobilization and miniaturization of devices, the devices are easily carried but it is becoming increasingly difficult to input letters (characters) into the devices. Thus, when a message is received, there is a greater need to transmit a reply message suitable to the received message with a minimum amount of input.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide methods and apparatuses for providing a user interface (UI) or a recommended reply message required to prepare a reply message.

Additional aspects will be set forth in part in the description which follows and, in part, will be apparent from the description, or may be learned by practice of the presented embodiments.

In accordance with an aspect of the present disclosure, a device for transmitting a reply message is provided. The device includes a communication unit configured to receive a question message from another device, a controller configured to determine a category of the question message, a display unit configured to display a UI for selecting data to be included in a reply message to the question message, according to the category, and a user input unit configured to receive a user input of selecting data to be included in the reply message through the UI, wherein the communication unit transmits the reply message including the data to the other device.

In accordance with another aspect of the present disclosure, a method of transmitting a reply message is provided. The method includes receiving a question message from another device, determining a category of the question message, displaying a UI corresponding to the category for selecting data to be included in a reply message to the question message, according to the category, receiving a user input of selecting data to be included in the reply message through the UI, and transmitting the reply message including the data to the other device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description, taken in conjunction with the accompanying drawings, in which:

FIGS. 32A to 33B are diagrams of a method of determining, by a device, a recommended reply message according to a context of a user, according to various embodiments of the present disclosure;

FIGS. 35A and 35B are diagrams of a method of calculating, by a device, a correlation between a reply intention and a context or a sender, based on a pre-transmitted message of a user, according to an embodiment of the present disclosure;

FIGS. 36A to 36C are diagrams of a method of displaying a recommended reply message based on a correlation between a reply intention and a context or a sender, according to an embodiment of the present disclosure;

Throughout the drawings, it should be noted that like reference numbers are used to depict the same or similar elements, features, and structures.

DETAILED DESCRIPTION

Figure 1:
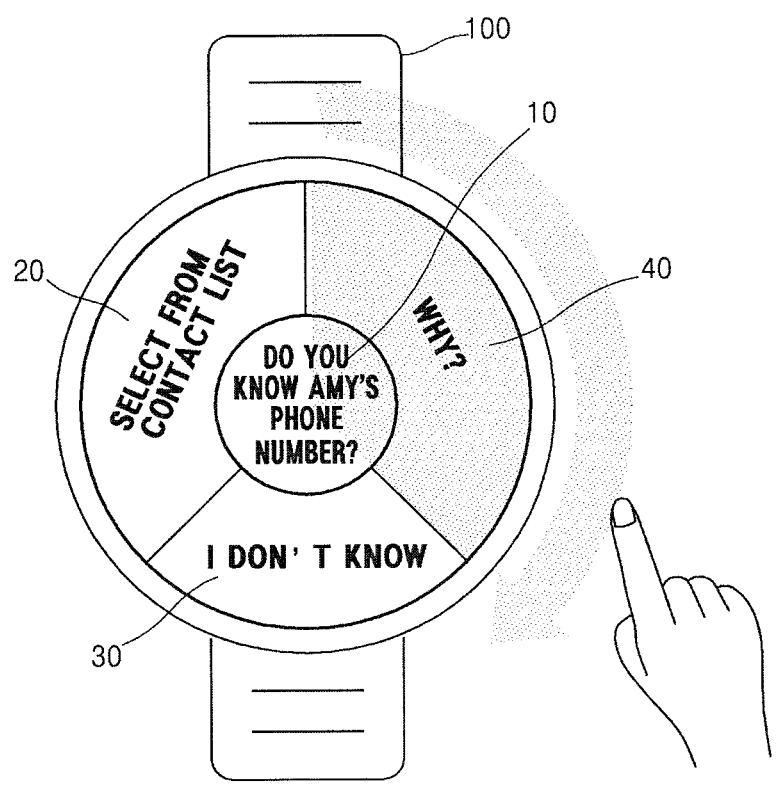
FIG. 1 is a diagram of a method of providing, by a device, information required to input a reply message when a message is received, according to an embodiment of the present disclosure.

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

All terms including descriptive or technical terms which are used herein should be construed as having meanings that are obvious to one of ordinary skill in the art. However, the terms may have different meanings according to an intention of one of ordinary skill in the art, precedent cases, or the appearance of new technologies. Also, some terms may be arbitrarily selected by the applicant, and in this case, the meaning of the selected terms will be described in detail in the detailed description of the present disclosure. Thus, the terms used herein have to be defined based on the meaning of the terms together with the description throughout the specification.

When a part "includes" or "comprises" an element, unless there is a particular description contrary thereto, the part can further include other elements, not excluding the other elements. In the following description, terms such as "unit" and "module" indicate a unit for processing at least one function or operation, wherein the unit and the block may be embodied as hardware or software or embodied by combining hardware and software.

One or more embodiments will now be described more fully with reference to the accompanying drawings. However, the one or more embodiments may be embodied in many different forms, and should not be construed as being limited to the embodiments set forth herein; rather, these embodiments are provided so that this disclosure will be thorough and complete, and will fully convey the concept of the one or more embodiments to those of ordinary skill in the art. In the following description, well-known functions or constructions are not described in detail since they would obscure the one or more embodiments with unnecessary detail, and like reference numerals in the drawings denote like or similar elements throughout the specification.

FIG. 1 is a diagram of a method of providing, by a device, information required to input a reply message when a message is received, according to an embodiment of the present disclosure.

Referring to FIG. 1, upon receiving the message, a device 100 may provide a user interface (UI) required to input the reply message.

For example, when a message 10 of "Do you know phone number of Amy?" is received, the device 100 may provide a UI for inputting a phone number. The UI for inputting a phone number may include a contact list stored in the device 100.

The device 100 may display a menu 20 of "select from contact list", and when a user input of selecting the menu 20 is received, the device 100 may display a list of names stored in the contact list. Upon receiving a user input of selecting one of the names, the device 100 may transmit a phone number of the selected name to a device of a sender.

The device 100 may also display a recommended reply message regarding the message. Upon receiving the message 10, the device 100 may analyze the message 10 to determine that a sending intention of a sender is to ask for a phone number, and recommend "why?" 40 and "I don't know" 30 as reply messages.

In this case, the device 100 may analyze a context of a user and determine a recommended reply message based on the analyzed context. For example, when the message is received and the user is driving, the device 100 may display "I'm driving" as a recommended reply message.

The device 100 may also display a recommended reply message based on a reply message pre-transmitted by the user with respect to a message having the same sending intention as the received message. For example, when a message asking about a plan is received, and a reply message mostly sent by the user is a message meaning that the user is busy, the device 100 may display "I'm busy" as a recommended reply message upon receiving the message asking about a plan.

Even if messages having the same sending intention are received, the user may transmit reply messages having different reply intentions according to a context of the user. For example, when a message asking whether the user is busy is received while the user is exercising, the user may transmit a reply message indicating that the user is not busy, whereas when a message asking whether the user is busy is received while the user is driving, the user may transmit a replay message indicating that the user is busy. Accordingly, the device 100 may display different recommended reply messages even when messages having the same sending intention are received, based on reply messages transmitted by the user according to a context of the user.

Figure 2:
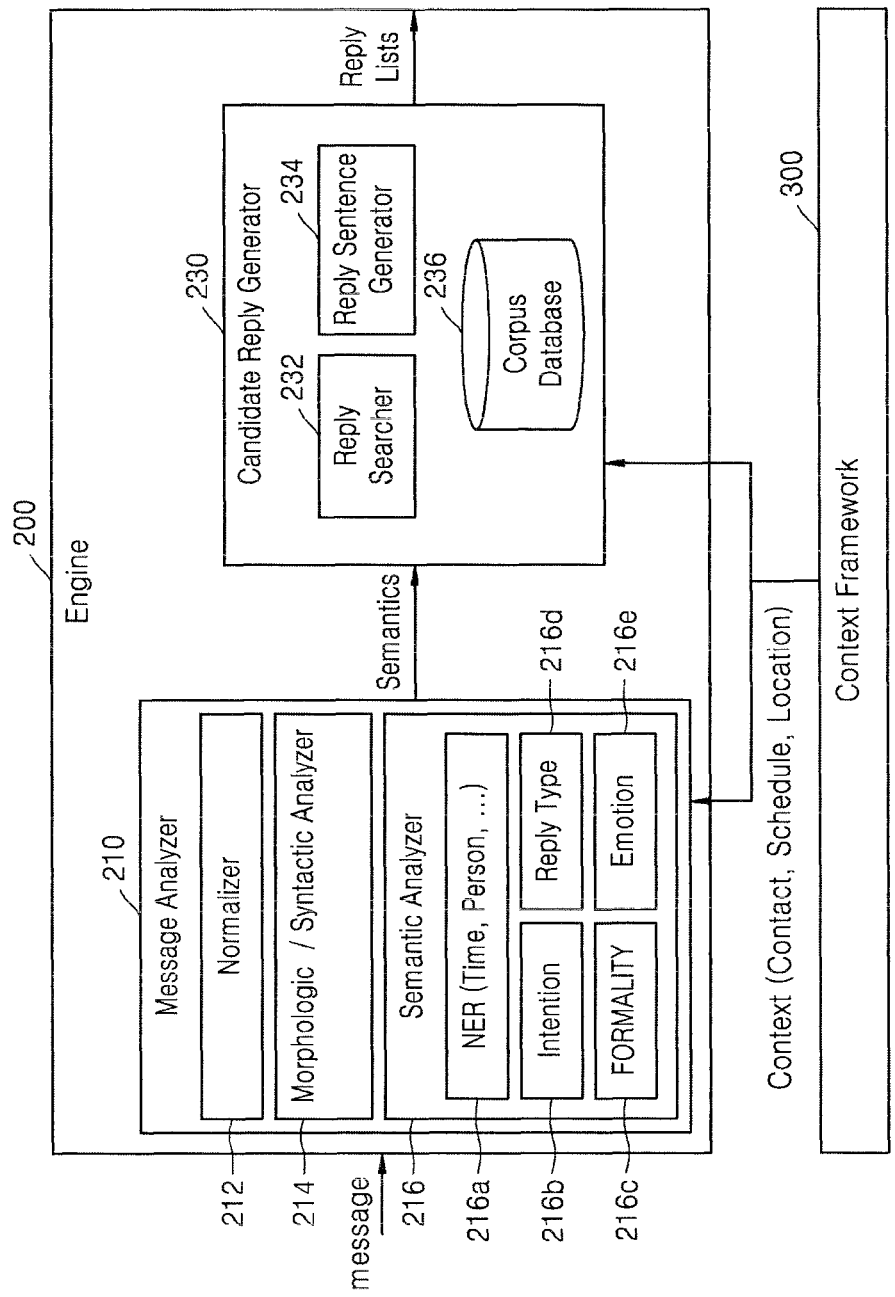
FIG. 2 illustrates an engine for generating a recommended reply message, according to an embodiment of the present disclosure.

FIG. 2 illustrates an engine for generating a recommended reply message, according to an embodiment of the present disclosure.

Referring to FIG. 2, the device 100 may include an engine 200. The engine 200 may include a message analyzer 210 determining a sending intention of a received message, and a candidate reply generator 230 generating a recommended reply message based on an analyzed sending intention.

The message analyzer 210 may determine a sending intention of a received message. The message analyzer 210 may include a normalizer 212, a morphologic/syntactic analyzer 214, and a semantic analyzer 216.

The normalizer 212 may restore slang or an abbreviation included in the received message to a standard language.

The normalizer 212 may restore slang or abbreviation to a standard language based on a pre-set formula. The normalizer 212 may also restore slang or an abbreviation included in the received message to a standard language based on a dictionary in which slang or an abbreviation is mapped to a standard language. An example of such a map is shown in Table 1 below.

TABLE 1

| Slang/Abbreviation | Standard Language | Frequency |
| --- | --- | --- |
| TMR | Tomorrow | 87 |
| GTG | Got to go | 81 |
| BTB | Be right back | 77 |
| K | OK | 71 |
| Y | Yes | 53 |
| Cuz | Because | 52 |
| UR | You are | 47 |
| CU | See you | 42 |
| JK | Just kidding | 37 |
| Dry out | Stop drinking | 35 |
| Ass-wipe | Toilet paper | 33 |
| Aite | Alright | 30 |
| Juz | Just | 28 |
| TTYL | Talk to you later | 27 |
| Tat | that | 23 |
| N2 | into | 22 |
| Nah | No | 21 |
| S2U | Same to you | 21 |
| Scrilla | Money | 20 |
| Sis | Sister | 20 |
| Mabby | maybe | 20 |

For example, when a message "OMG, that's supa" is received, the normalizer 212 may determine that "OMG" and "supa" are slang, and convert "OMG" to "oh my god" and "supa" to "super". When a message "where you want to have dinner, Mark?" is received, the normalizer 212 determine that the message is not grammatically correct, and change the message to "where do you want to have dinner, Mark?"

The device 100 may store words, expressions, or ways of speaking in messages exchanged between the user and a sender, according to senders. The normalizer 212 may restore slang or abbreviation included in a received message to a standard language based on words, expressions, or ways of speaking in messages exchanged between the user and a sender.

Content of past conversations exchanged between acquaintances in a contact list may be analyzed and words, ways of speaking, and expressions used with the acquaintances may be stored according to the acquaintances. The normalizer 212 may restore slang or an abbreviation included in a text message from a sender to a standard language based on words, ways of speaking, or expressions stored according to the sender.

The morphologic/syntactic analyzer 214 may determine morphemes included in a received message, and determine sentence constituents of the morphemes.

For example, regarding a message "please come to the meeting immediately", the morphologic/syntactic analyzer 214 may determine "meeting" as a noun and "immediately" as an adverb, "come to" as a predicate, and "please" as a formal form, as sentence constituents of morphemes.

The morphologic/syntactic analyzer 214 may determine a verb, a sending intention, and formality in a message based on the determined sentence constituents. For example, regarding the message "please come to the meeting immediately", the morphologic/syntactic analyzer 214 may determine "come" as a verb, an instruction to come as a sending intention of the message, and that the message is formal.

The semantic analyzer 216 may determine, based on the morphemes and the sentence constituents determined by the morphologic/syntactic analyzer 214, a named entity, a sending intention, formality, and emotion of a sender, and determine a reply type.

The semantic analyzer 216 may include a named entity recognizer 216a, an intention recognizer 216b, a formality recognizer 216c, an emotion recognizer 216d, and a reply type determiner 216e.

The named entity recognizer 216a may recognize a named entity in a received message. A named entity may denote a noun or a number having an intrinsic meaning. A named entity may be largely classified into a name expression, such as a name of a person, a name of a place, or a name of an organization, a time expression, such as a date or a time, and a numeric expression, such as a price or a percentage. Named entity recognition may be performed by recognizing a named entity included in a message and determining a type of the named entity.

For example, when a message "where do you want to have dinner, Mark?" is received, the named entity recognizer 216a may recognize "Mark" and "dinner" as named entities, and recognize "Mark" as a name of a person and "dinner" as a meal taken in the evening. The named entity recognizer 216a may determine "Mark" as a name of a person based on a contact list stored in the device 100, and when a relationship with "Mark" is stored in the contact list, may obtain the relationship between the user and "Mark". The named entity recognizer 216a may recognize "dinner" as a meal taken in the evening by referring to a pre-stored named entity dictionary.

The intention recognizer 216b may determine a sending intention of a sender, which is expressed in a message. Examples of a sending intention include a greeting, a question, a command, a request, a suggestion, emotion expression, and information transmission, but are not limited thereto.

The intention recognizer 216b may determine a sending intention in a received message based on analyzed morphemes, named entities, sentence constituents, or word classes. For example, when a message is in English and the first word in the message is a verb "Be" or an original form of a verb, the intention recognizer 216b may determine that a sending intention of the message is a command. Also, when a message is in English and the first word in the message is "would you" or "please", the intention recognizer 216b may determine that a sending intention of the message is a request.

When a sending intention of a received message is a question, the intention recognizer 216b may determine whether the sending intention is a yes-or-no question, a question requesting to select at least one of a plurality of options, a question asking for agreement, or a five W's and one H (5W1H) question. For example, when a received message is "where do you want to have dinner, Mark?", the intention recognizer 216b may determine that the received message is a question asking where from among 5W1H based on a sentence constituent of "where" and a punctuation mark "?" indicating an interrogative sentence from among morphemes in the received message.

The intention recognizer 216b may classify sending intentions into a plurality of categories as shown in Table 2 below, and each category may include a plurality of lower categories.

TABLE 2

| Sending Intention | |
| --- | --- |
| Level 1 | Level 2 |
| greeting | meet |
|  | farewell |
|  | new year |
|  | christmas |
|  | morning |
|  | night |

TABLE 2-continued

Sending Intention

| Level 1 | Level 2 |
|---|---|
| question | ask after |
|  | location |
|  | time |
|  | age |
|  | price |
|  | count |
|  | person |
|  | activity |
|  | confirm |
|  | reason |
| simple answer | yes_no |
|  | agreement |
| command/request/suggest/help | move |
|  | work |
|  | meet |
|  | invite |
| express emotion | irritated |
|  | happy |
|  | surprised |
|  | worried |
|  | sad |
|  | angry |
| inform | location |
|  | time |
|  | age |
|  | price |
|  | count |
|  | person |
|  | activity |
|  | confirm |
|  | reason |
| thanks | to user |
|  | to third person |
| apologies | to user |
|  | to third person |
| sympathy | condolences |
|  | congratulations |
|  | compliment |
| blame | to user |
|  | to third person |
| complaint | to user |
|  | to third person |
| call | to user |
|  | to third person |

For example, when it is determined that a sending intention in a received message is a question, the intention recognizer 216b may determine whether the received message is a question asking about one of a location, a time, an age, a price, a count, a person, an activity, and a reason.

The formality recognizer 216c may determine whether a received message is formal. For example, when morphemes in the received message include "please", "would you", or "sir", the formality recognizer 216c may determine that the received message is formal.

The emotion recognizer 216d may determine an emotion of a sender in a received message. Examples of the emotion include happiness, fun, sadness, fear, surprise, and anger, but are not limited thereto.

The emotion recognizer 216d may recognize an emotion of a sender based on an exclamation, slang, or emoticon included in a received message. For example, when a message is "I'm late :-(" and ":-(" is an emoticon indicating unhappiness, the emotion recognizer 216d may determine that the sender is not happy.

The reply type determiner 216e may determine a type of a received message. For example, the reply type determiner 216e may determine a type of a message based on a sending intention of the message, which is determined by the intention recognizer 216b. When a sending intention of a received message is a yes-or-no question, a command, a request, or a suggestion, the reply type determiner 216e may determine a type of the received message to be selecting one of yes and no. When a sending intention of a received message is a question requesting for data in a certain category, the reply type determiner 216e may determine the type of the received message to be a short-answer type. A question requesting for data in a certain category may be, for example, a question requesting for certain information (for example, "what's phone number of Dave?") or a question asking what a sender and a user are going to do together, a time, a place, and a method (for example, "what time are we seeing?"). For example, the reply type determiner 216e may classify a type of a message into a plurality of categories as shown in Table 3 below.

TABLE 3

Message Type

| Level 1 | Level 2 | Level 3 |
|---|---|---|
| yes no | yes | n/a |
|  | no | n/a |
| short answer | person | relationship |
|  |  | phone number |
|  |  | job |
|  |  | age |
|  | location | home |
|  |  | office |
|  |  | school |
|  |  | subway |
|  |  | gps value |
|  | date/time | relative |
|  |  | day of week |
|  |  | hour |
|  |  | date |
|  | number | count |
|  |  | size |
|  |  | price |
|  |  | age |
|  | activity | exercising |
|  |  | studying |
|  |  | working |
|  |  | relaxing |
|  |  | cooking |
|  |  | cleaning |
|  |  | traveling |
|  |  | car driving |
|  |  | watching tv |
|  |  | breakfast |
|  |  | lunch |
|  |  | dinner |
|  |  | snack |
|  | food | bibimbap |
|  |  | bulgogi |
|  |  | spaghetti |
|  |  | risotto |
|  |  | pizza |
|  |  | sushi |
|  |  | ramen |
| choose one | A or B | n/a |
|  | A or B or C | n/a |
|  | a plurality of X | n/a |
| custom | greeting | HOW_ARE_YOU |
|  |  | HOW_ARE_YOU_DOING |
|  |  | WHAT_ARE_YOU_DOING |
|  | weather | NICE_WEATHER |
|  | good-bye | HAVE_A_NICE_DAY |
|  |  | HAVE_A_NICE_DINNER |
|  |  | HAVE_A_NICE_WEEKEND |
|  |  | GOOD_NIGHT |

As shown in Table 3, examples of a type of a message may include a yes-or-no type, a short-answer type, and a type of selecting one of a plurality of options, and each type may be classified again into a plurality of categories. For example, when a message is a short-answer type, the message may be classified into whether an answer should be about a certain person, a certain place, or a certain number. Types of a message shown in Table 3 are only examples, and a type of an answer may be assigned according to sending intentions.

The candidate reply generator 230 may generate a recommended reply message to be provided to a user. The candidate reply generator 230 may include a reply searcher 232, a reply sentence generator 234, and a corpus database 236.

The corpus database 236 may store a reply intention corresponding to a sending intention. For example, the corpus database 236 may store affirmation, negation, and ignorance as reply intentions with respect to a yes-or-no question. The corpus database 236 may also store a suggestion intention or an advice intention based on data selected by a user, as a reply intention corresponding to a question asking what a sender and the user are going to do together, a time, a place, and a method (HOW_WILL_WE_DO-_QUESTION).

TABLE 4

| Sending Intention | Reply Intention |
|---|---|
| YES_OR_NO_QUESTION | ANSWER_POSITIVE |
| | ANSWER_NEGATIVE |
| | ANSWER_NOT_SURE |
| INFORMATION_QUESTION | ANSWER_XX |
| | ANSER_DO_NOT_KNOW |
| HOW_WILL_WE_DO_QUESTION | SUGGEST_XX |
| | LETS_XX |
| | ANSER_DO_NOT_KNOW |
| SUGGESTION | ANSWER_AGREE |
| | ANSWER_DISAGREE |
| | ANSER_DO_NOT_KNOW |
| CONGRATULATIONS | ANSWER_THANKYOU |
| HAVE_A_NICE_WEEDEND | HAVE_A_NICE_WEEDEND |

The corpus database 236 may store a recommended reply message corresponding to a reply intention. For example, referring to Table 5, "have a nice dinner", "hope you enjoy your dinner", and "bon appetite" according to a reply intention (HAVE_A_NICE_DINNER) of having a dinner

TABLE 5

| Reply Intention (Corpus ID) | Formality | Recommended Reply Message (Corpus) |
|---|---|---|
| HAVE_A_NICE_DINNER | Informal | Have a nice dinner. |
| | | Bon appetite. |
| | Formal | Hope you enjoy your dinner. |
| HAVE_A_NICE_WEEDEND | Formal | Wish you a nice weekend. |
| | | Hope you enjoy your weekend. |
| | Informal | Kick back on weekend. |
| | | Happy weekend! |
| ASK_WHO | Informal | Who? |
| | | Who the heck are you? |
| | Formal | Who are you? |
| ANSWER_LOCATION_XX | Formal | It is in XX. |
| | | It is located in XX. |
| | Informal | In XX. |
| SUGGEST_XX | Formal | How about XX? |
| | Informal | Cool with XX? |

The reply searcher 232 may determine a reply intention based on a sending intention of a received message. For example, the reply searcher 232 may obtain a reply intention corresponding to a sending intention from the corpus database 236.

The reply searcher 232 may determine data selected by a user as a reply intention. For example, when a short-answer type question asking about a place is received, the reply searcher 232 may display selectable data and determine data selected by the user from among the selectable data as a reply intention.

When a received message is "where do you want to have dinner, Mark?", the semantic analyzer 216 may determine that a sending intention of the received message is a question asking about a place for a dinner. The reply searcher 232 may then display a plurality of places or a map, and upon receiving a user input of selecting one of the plurality of places or a spot on the map, determine the selected place or spot as a reply intention.

Upon determining at least one reply intention, the reply searcher 232 may obtain a recommended reply message corresponding to the at least one reply intention from the corpus database 236. In this case, the reply searcher 232 may determine whether a received message is formal and whether to be formal in a reply message based on a relationship between the user and a sender, and obtain different recommended reply messages based on formality.

The reply sentence generator 234 may change a recommended reply message according to a word, an expression, or a way of speaking based on messages exchanged between the user and a sender. The device 100 may store words, expressions, or ways of speaking in messages exchanged between the user and senders according to senders. Accordingly, the reply sentence generator 234 may obtain at least one message corresponding to a reply intention, and change words, expressions, or ways of speaking in the at least one message to words, expressions, or ways of speaking according to a sender.

For example, when the user has a habit of adding "babe" at the end of a sentence in messages exchanged with a sender, and a recommended reply message is "how about a movie?", the reply sentence generator 234 may change "how about a movie?" to "how about a movie, babe?".

The device 100 may store words, ways of speaking, and expressions according to acquaintances in a contact list as content of past conversation with the acquaintances are analyzed. The reply sentence generator 234 may generate a recommended reply message according to the words, the ways of speaking, or the expressions stored according to the acquaintances.

Accordingly, the device 100 may automatically generate a reply message reflecting closeness with a sender.

The device 100 may further include a context framework 300. The context framework 300 may obtain a context of the user at a certain time. Examples of the context include a time, a day of week, a date, a schedule of the user, a location of the user, and an activity of the user, but are not limited thereto. For example, the context framework 300 may obtain a schedule of the user at a certain time based on the schedule stored in the device 100. The context framework 300 may also obtain a location of the user by using a location sensor (for example, a global positioning system (GPS)) included in the device 100. The context framework 300 may detect an activity of the user by using a position sensor or a motion sensor included in the device.

The candidate reply generator 230 may determine a recommended reply message based on a sending intention of a received message and a context of the user.

For example, the reply searcher 232 may obtain a context of the user from the context framework 300. The reply searcher 232 may determine a recommended reply message not only based on the sending intention but also the context of the user.

The corpus database 236 may store a reply intention according to a sending intention and a context. For example, as shown in Table 6 below, at least one reply intention may be stored according to a sending intention and a context.

busy", "is something wrong?", and "I don't know" as recommended reply messages in a formal style.

However, when the same message is received from a boyfriend of the user at the same time, the reply searcher 232 may determine "wy?", "working", "bzzy", "sup?", and "dunno" as recommended reply messages in an informal style.

TABLE 6

| Sending Intention (lv1) | Sending Intention (lv2) | Type of Message (lv1) | Type of Message (lv2) | Form of Received Message Formality | Context Time | Day of Week | Contact Registration | Reply Intention |
|---|---|---|---|---|---|---|---|---|
| Greeting | Night | Custom | GOOD_NIGHT | Formal | Evening | Mon. | Registered | HAVE_A_NICE_DINNER |
| Greeting | Night | Custom | GOOD_NIGHT | Informal | Evening | Fri. | Registered | HAVE_A_NICE_WEEKEND |
| Greeting | Night | Custom | GOOD_NIGHT | Informal | Evening | Tues. | Not Registered | ASK_WHO HAVE_A_NICE_DINNER |
| Question | Location | Short Answer | Location | Formal | Morning Afternoon | Wed. | Registered | ANSWER_LOCATION_OFFICE ANSWER_LOCATION_HOME |
| Question | Location | Short Answer | Location | Informal | Night | Thur. | Registered | ANSWER_LOCATION_HOME ANSWER_LOCATION_OFFICE |

The reply searcher 232 may obtain a reply intention corresponding to a sending intention and a context. For example, when a message "have a nice evening" is received at night, the reply searcher 232 may determine whether a time when the message is received, a day of week when the message is received, and a contact number of a sender are stored in the device 100. The reply searcher 232 may determine that a sending intention of "have a nice evening" is a greeting at night, a day of week when the message is received is Wednesday, and a contact number of the sender is stored in the device 100. Accordingly, the reply searcher 232 may obtain a reply intention (HAVE_A_NICE_DINNER) of having a nice dinner from the corpus database 236 according to the sending intention of greeting at night, Wednesday, and the contact number stored in the device 100.

Accordingly, even if the same messages are received, the device 100 may provide different recommended reply messages according to a context of the user.

The corpus database 236 may store different recommended reply messages based on not only a sending intention and a context, but also whether to be formal or whether a contact number of a sender is stored in the device 100.

The reply searcher 232 may determine a relationship between a sender and the user based on whether a contact number of the sender is stored in the device 100 and a name of the sender stored according to the contact number. For example, when a name of a sender stored in the device 100 is "mom" or "mother", the reply searcher 232 may determine that the sender is mother of the user. The reply searcher 232 may determine a relationship between a sender and the user based on a contact list group to which a contact number of the sender belongs. Examples of the contact list group include a family, a company, a school, or a club.

The reply searcher 232 may determine whether to be formal in a reply message based on a relationship between a sender and the user. Accordingly, the reply searcher 232 may determine a recommended reply message based on not only a sending intention and a context, but also a relationship between a sender and the user.

For example, the device 100 may receive a message "what are you doing now?" from the user's mother at 9:30 a.m. on Mar. 30, 2015. In this case, the reply searcher 232 may determine "why do you ask?", "I'm working", "I'm a little FIGS. 3A and 3B illustrate a UI displaying recommended reply messages, according to an embodiment of the present disclosure.

Figure 3A:
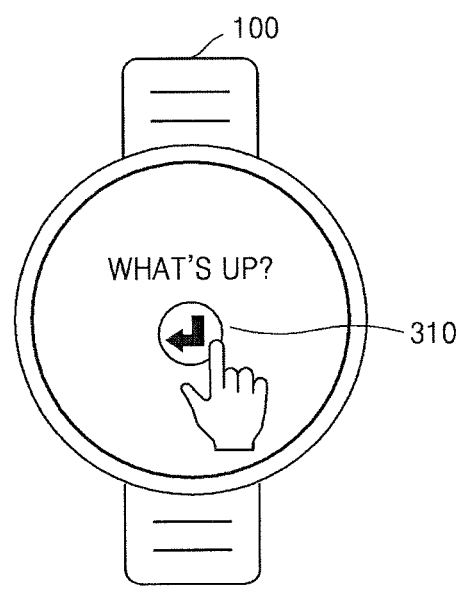
FIGS. 3A and 3B illustrate a user interface (UI) displaying recommended reply messages, according to an embodiment of the present disclosure.

Referring to FIG. 3A, the device 100 may be a wearable watch. The device 100 may receive a message "what's up?". The device 100 may display a check button 310 for receiving a confirmation on checking the message.

Figure 3B:
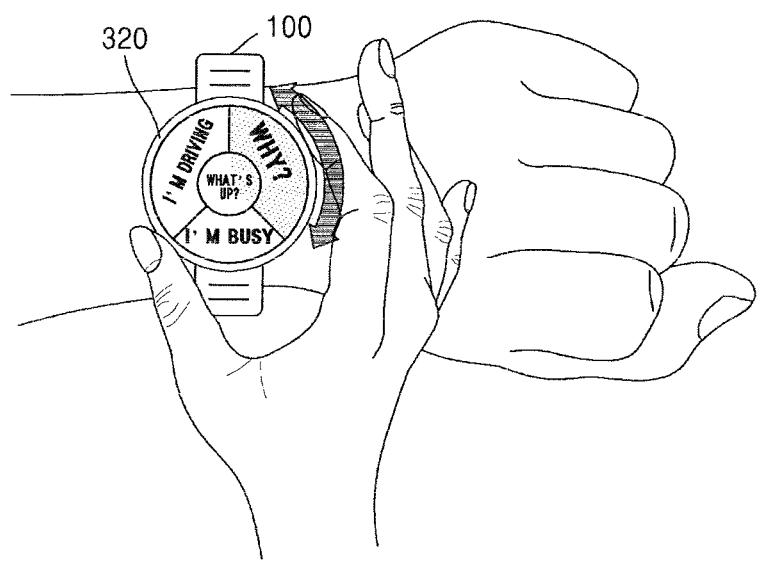

Referring to FIG. 3B, upon receiving a user input of touching the check button 310, the device 100 may display recommended reply messages. For example, the device 100 may divide a region of a screen into a plurality of regions including a center region and an outer regions, display the message in the center region and display at least one recommended reply message in the outer region. The device 100 may display "I'm driving", "why?", or "I'm busy" as a recommended reply message with respect to the message "what's up?".

The device 100 may be a device including a wheel 320 in a bezel region. The device 100 may display a recommended reply message selected by the user as distinguished from a recommended reply message not selected by the user. For example, the device 100 may display a region where a selected recommended reply message is displayed in a color or design different from other regions.

The device 100 may sequentially select recommended reply messages according to a direction of rotating the wheel 320, as a user input of rotating the wheel 320 is received. Upon receiving a user input of rotating the wheel 320 by at least a reference angle, the device 100 may delete a displayed recommended reply message and display a new recommended reply message.

The device 100 may determine a selected recommended reply message as a reply message, and transmit the reply message to a device of a sender.

Figure 4A:
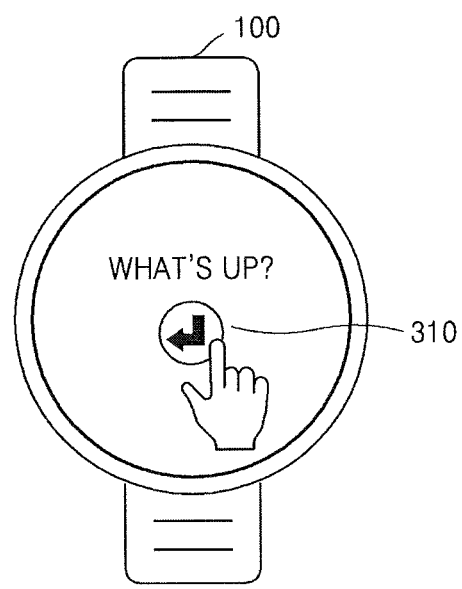
FIGS. 4A and 4B illustrate a UI displaying recommended reply messages, according to an embodiment of the present disclosure.
Figure 4B:
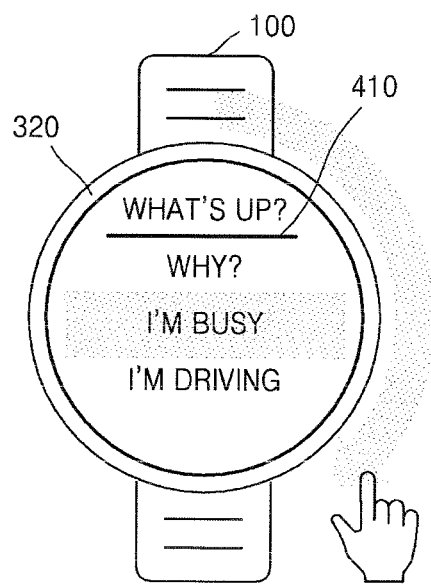

FIGS. 4A and 4B illustrate a UI displaying recommended reply messages, according to an embodiment of the present disclosure.

Referring to FIG. 4A, the device 100 may receive a message "what's up?". The device 100 may display the check button 310 for receiving a confirmation on checking the message.

Referring to FIG. 4B, upon receiving a user input of touching the check button 310, the device 100 may display at least one recommended reply message. In this case, the device 100 may display the message as distinguished from the at least one recommended reply message. For example, the device 100 may display a line 410 splitting a screen, and display the message above the line 410 and the at least one recommended reply message below the line 410.

Upon receiving a user input of rotating the wheel 320, the device 100 may sequentially select the at least one recommended reply message. Also, upon receiving a user input of rotating the wheel 320 at least a reference angle, the device 100 may generate a scrolling event of deleting the at least one recommended reply message and displaying a new recommended reply message.

The device 100 may determine a selected recommended reply message as a reply message, and transmit the reply message to a device of a sender.

Figure 5:
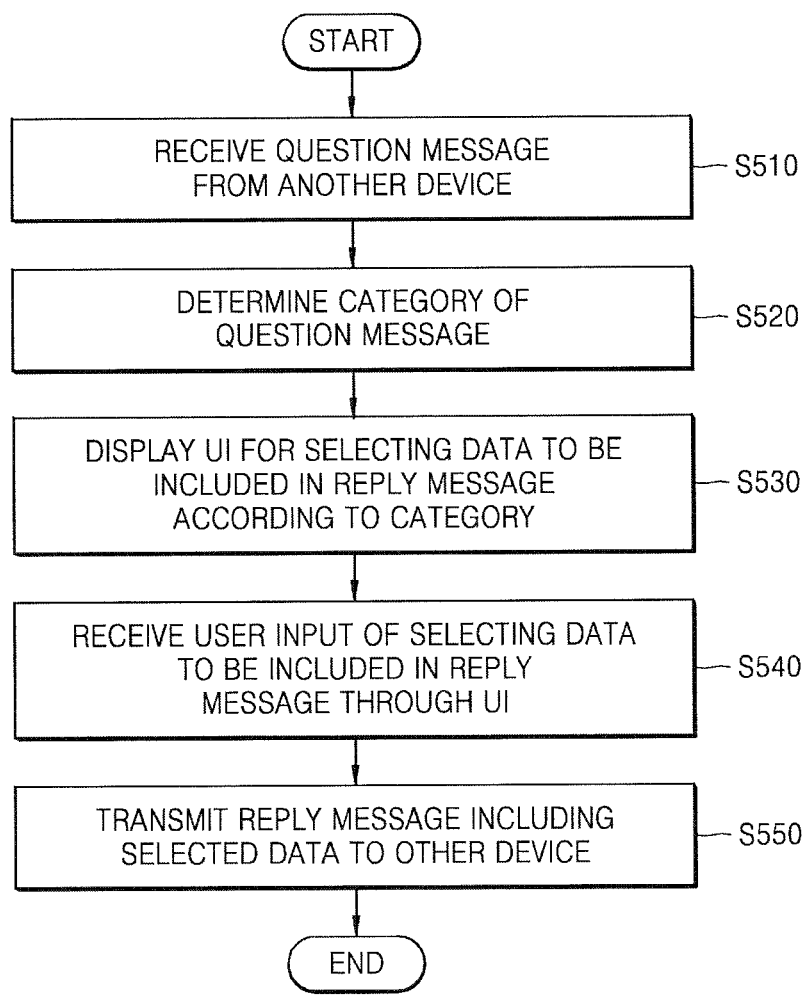
FIG. 5 is a flowchart of a method of generating, by a device, a recommended reply message, according to an embodiment of the present disclosure.

FIG. 5 is a flowchart of a method of generating, by a device, a recommended reply message, according to an embodiment of the present disclosure.

Referring to FIG. 5, in operation S510, the device 100 may receive a question message from another device. Examples of a message may include a short-message service (SMS) message, an email message, and a chat message, but are not limited thereto.

In operation S520, the device 100 may determine a category of the question message. The device 100 may determine a message type of the question message. Examples of the message type include a yes-or-no type, a short-answer type, and a simple emotion expression type, but are not limited thereto.

A question message of a yes-or-no type may be a message asking a user to select one of affirmation and negation regarding content of the question message. A question message of a short-answer type may be a message asking a user which data is pre-determined or desired from among data in a certain category. For example, a message type of "what is Kate's phone number?" is a short-answer type, and a category may be a phone number. A message type of "where do you want to meet later?" is a short-answer type, and a category may be a place. Examples of the category include a time, a date, a place, an age, a size, a price, an activity, a food, a movie, and a person, but are not limited thereto.

A question message of a simple emotion expression type may be a message from a sender simply expressing his/her emotion.

The device 100 may determine a message type of a received message based on morphemes, and sentence constituents and named entities in the morphemes of the received message. For example, when a question message is in Korean, the device 100 may determine that the question message is a yes-or-no type question when a sentence in the question message includes an interrogative ending and a punctuation mark "?" indicating an interrogative sentence.

When a question message is in English, the device 100 may also determine that the question message is a yes-or-no type question when a sentence in the question message starts with an auxiliary verb (for example, "do", "be", or "can") and includes a punctuation mark "?" indicating an interrogative sentence.

When a question message is in Korean, the device 100 may determine that the question message is a short-answer type when the question message includes a word, such as "뭐", "몇", "얼마", "누구", "언제", or "어디서", or an interrogative ending, and a punctuation mark "?" indicating an interrogative sentence.

When a question message is in English, the device 100 may determine that the question message is a short-answer type when the question message includes an interrogative adverb, such as "what", "which", "who", "when", "how much", or "where", and a punctuation mark "?" indicating an interrogative sentence.

When it is determined that the message type is a short-answer type, the device 100 may determine a category of the question message.

The device 100 may determine the category of the question message based on an interrogative included in the question message. For example, when the question message includes a phrase "what time", the device 100 may determine the category of the question message to be a time.

The device 100 may also determine the category based on a word included in the question message, the word indicating the category. For example, when the question message includes a word "when" or "what time", the device 100 may determine the category of the question message to be a time.

In operation S530, the device 100 may display a UI for selecting data to be included in a reply message according to the determined category. Upon receiving a user input of checking the question message, the device 100 may display the UI. Also, upon receiving a user input for preparing the reply message, the device 100 may display the UI.

The UI may include a menu for executing a function used to select the data to be included in the reply message, and upon receiving a user input of selecting a menu, the device 100 may execute a function corresponding to the selected menu.

When the category is a date, a UI corresponding to the category may include a calendar image for receiving a user input of selecting a date. When the category is a time, a UI corresponding to the category may include a clock image for receiving a user input of adjusting a time. When the category is a place, a UI corresponding to the category may include a map image for receiving a user input of selecting a spot. When the category is a phone number, a UI corresponding to the category may include a contact list of the user. When the category is a schedule, a UI corresponding to the category may include a schedule list of the user.

The UI may include various data selectable by the user. The data may be pre-stored in the device 100. For example, a plurality of phone numbers to be included in a UI for selecting a phone number may be stored in the device 100. A plurality of times to be included in a UI for selecting a time may be from 00:00:00 to 24:59:59. The data may be received from an external server. For example, a plurality of movies to be included in a UI for selecting a movie may be received from a movie server.

The data in the UI may be displayed in a list, such as a contact list, or in an image, such as a map image.

The device 100 may determine the data to be included in the UI based on not only the category of the question message, but also additional information included in the question message. For example, the device 100 may obtain additional information specifying data to be included in the reply message from the question message, and determine the data to be included in the UI based on the category and the additional information. For example, when the question message is asking for a phone number of a certain person, the device 100 may search for names that are similar to or same as identification (ID) information of the certain person from among phone numbers included in the contact list, and determine the UI to display found names.

In operation S540, the device 100 may receive a user input of selecting data to be included in the replay message through the displayed UI.

In operation S550, the device 100 may transmit the reply message including the selected data to the other device.

The device 100 may transmit the selected data as it is as the reply message. The device 100 may generate the reply message including the selected data and transmit the generated reply data. For example, when the device 100 received a message "what is Dave's phone number?", the device 100 may display a contact list stored in the device 100. Upon receiving a user input of selecting a phone number of a person named "Dave" from the contact list, the device 100 may generate a reply message "Dave's phone number is XXX-XXXX" in which "Dave's phone number" is a subject and the selected phone number is a complement.

The device 100 may display at least one recommended reply message including the selected data, and upon receiving a user input of selecting one of the at least one recommended reply message, transmit the selected recommended reply message.

Figure 6A:
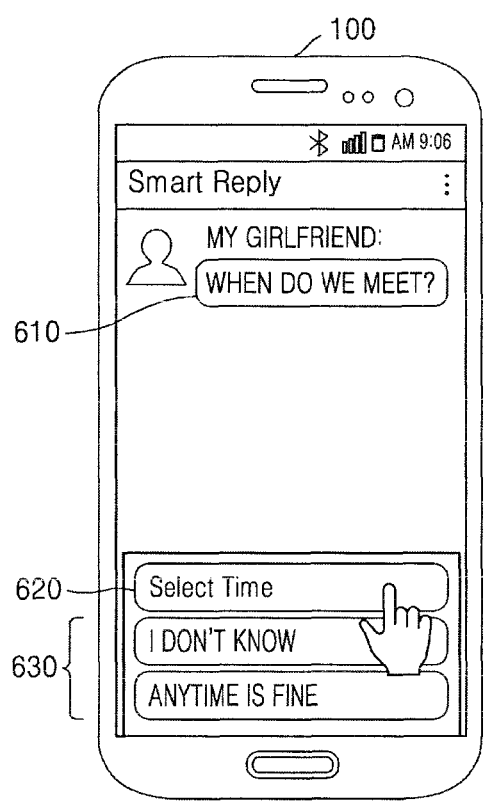
FIGS. 6A to 6C are diagrams of a method of providing, by a device, a UI for selecting a time when a message asking about a time is received, according to an embodiment of the present disclosure.
Figure 6B:
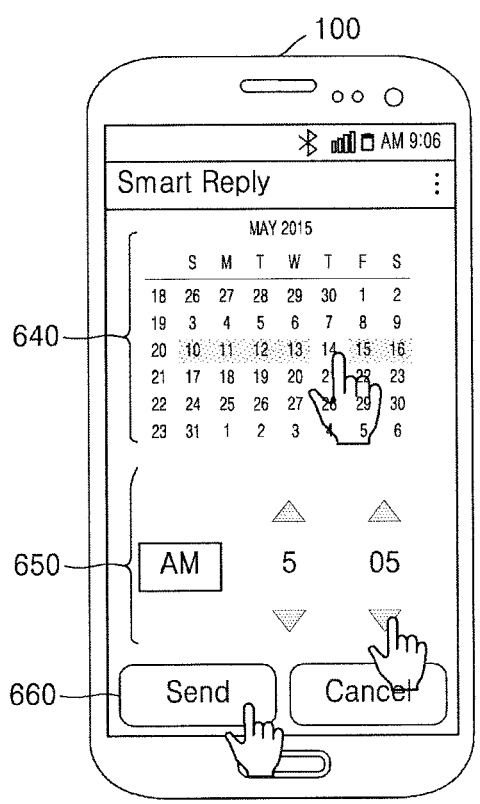
Figure 6C:
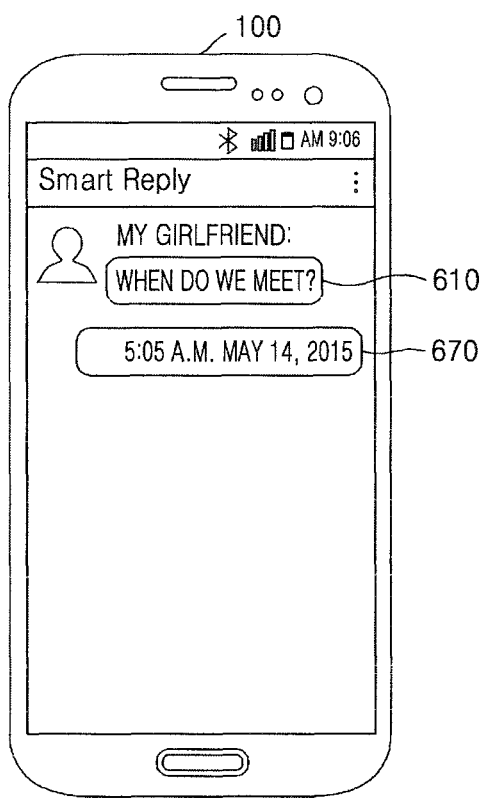

FIGS. 6A to 6C are diagrams for describing a method of providing, by a device, a UI for selecting a time when a message asking about a time is received, according to an embodiment of the present disclosure.

Referring to FIG. 6A, the device 100 may receive a message 610 of "when do we meet?". Upon receiving the message 610, the device 100 may display the message 610, a menu 620 for selecting a date and a time, and at least one recommended reply message 630.

Upon receiving the message 610, the device 100 may determine that a message type of the message 610 is a short-answer type based on an interrogative "when" indicating time and a punctuation mark "?" indicating an interrogative sentence, and determine that a category of the message 610 is a date and a time.

When it is determined that the message type is a short-answer type and the category is date and time, the device 100 may determine "I don't know" and "anytime is fine" as the recommended reply messages 630. "I don't know" and "anytime is fine" may be recommended reply messages pre-stored in the device 100 according to a case where a message type is a short-answer type and a category is a date or a time.

The device 100 may display the menu 620 for executing a function of selecting a date and a time.

Referring to FIG. 6B, upon receiving a user input of selecting the menu 620, the device 100 may display a UI for selecting a date and a time. For example, the device 100 may display a calendar image 640 including a date when the user checked the message 610. In this case, the calendar image 640 may include a month and a day when the user input of selecting the menu 620 is received. The device 100 may receive a user input of selecting a date in the calendar image 640.

The device 100 may display a digital clock image 650. The digital clock image 650 may include a button for changing an hour, a button for changing a minute, and a button indicating whether a selected time is a.m. or p.m.

Referring to FIG. 6C, upon receiving user inputs of selecting a date and a time and selecting a send button 660, the device 100 may transmit a reply message 670 including the selected date and time to a device of a sender. The reply message 670 may be displayed on a chat window.

Figure 7A:
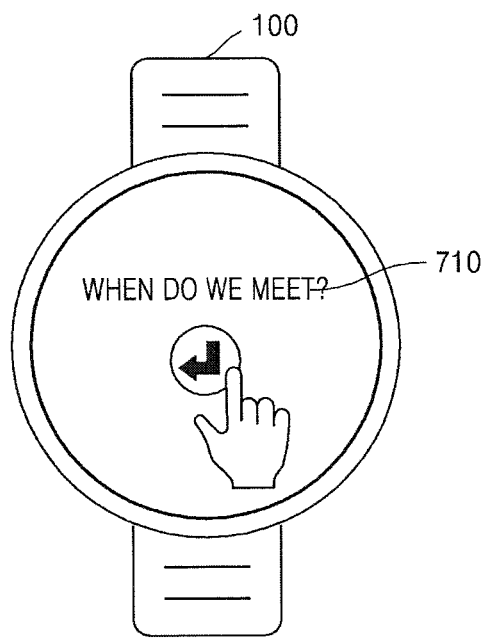
FIGS. 7A to 7C are diagrams of a method of providing, by a device, a UI for selecting a time when a message asking about a time is received, according to an embodiment of the present disclosure.
Figure 7B:
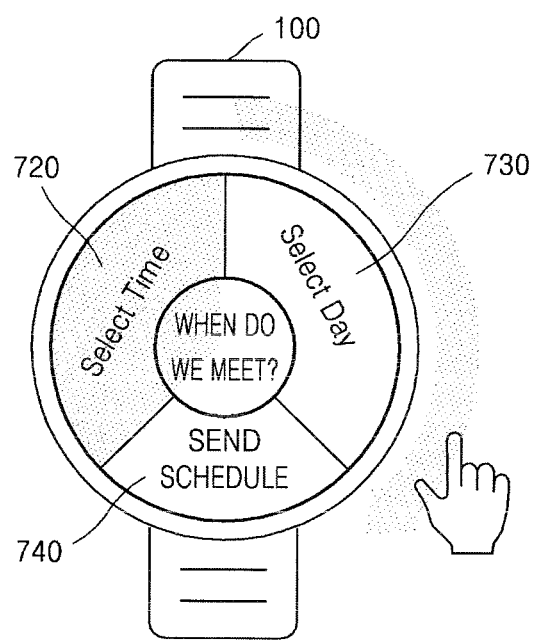
Figure 7C:
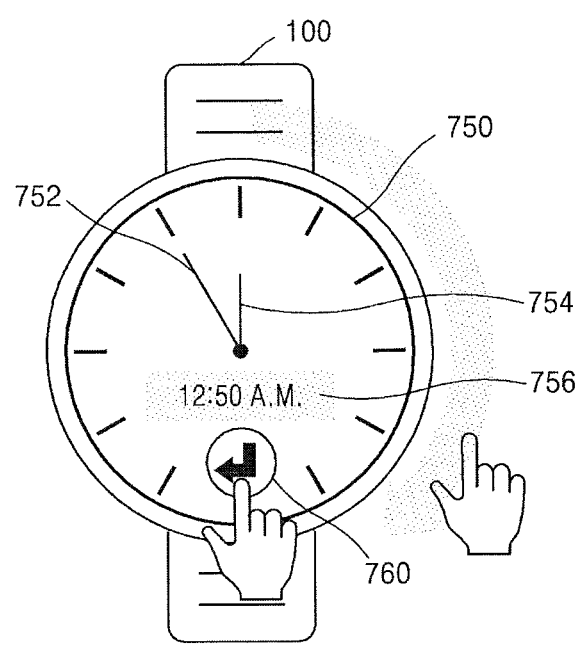

FIGS. 7A to 7C are diagrams of a method of providing, by a device, a UI for selecting a time when a message asking about a time is received, according to an embodiment of the present disclosure.

Referring to FIGS. 7A to 7C, when the received message is requesting to select a time for a certain situation, the device 100 may provide a UI for selecting a time and provide a recommended reply message indicating the selected time.

Referring to FIG. 7A, the device 100 may receive a message 710 of "when do we meet?". Upon receiving the message 710, the device 100 determines that a message type of the message 710 is a short-answer type and a category of the message 710 is a time.

Referring to FIG. 7B, upon determining that the message type is a short-answer type and the category is a time, the device 100 may display a menu 720 for selecting a time, a menu 730 for selecting a date, and a menu 740 for transmitting a schedule of the user.

Referring to FIG. 7C, upon receiving a user input of selecting the menu 720, the device 100 may display a UI for providing a function of selecting a time. For example, the UI for providing a function of selecting a time may include an analog clock image 750. The analog clock image 750 may include hand images 752 and 754 having locations adjustable by the user.

By adjusting the hand images 752 and 754 on the analog clock image 750, the device 100 may display an adjusted time 756. Also, upon receiving user inputs of adjusting the hand images 752 and 754 and selecting a check button 760, the device 100 may transmit at least one recommended reply message including the adjusted time 756 to a device of a sender.

Figure 8A:
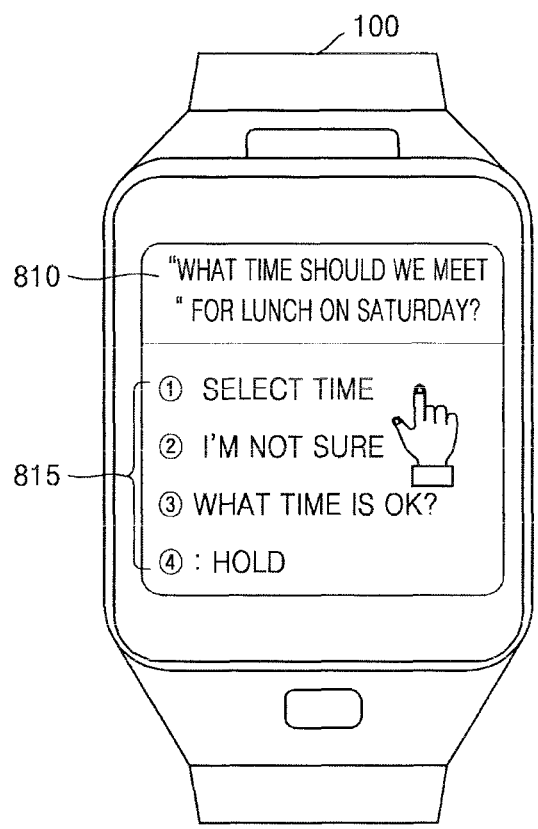
FIGS. 8A to 8C are diagrams of a method of providing, by a device, a UI for selecting a time when a message asking about a time is received, according to an embodiment of the present disclosure.
Figure 8B:
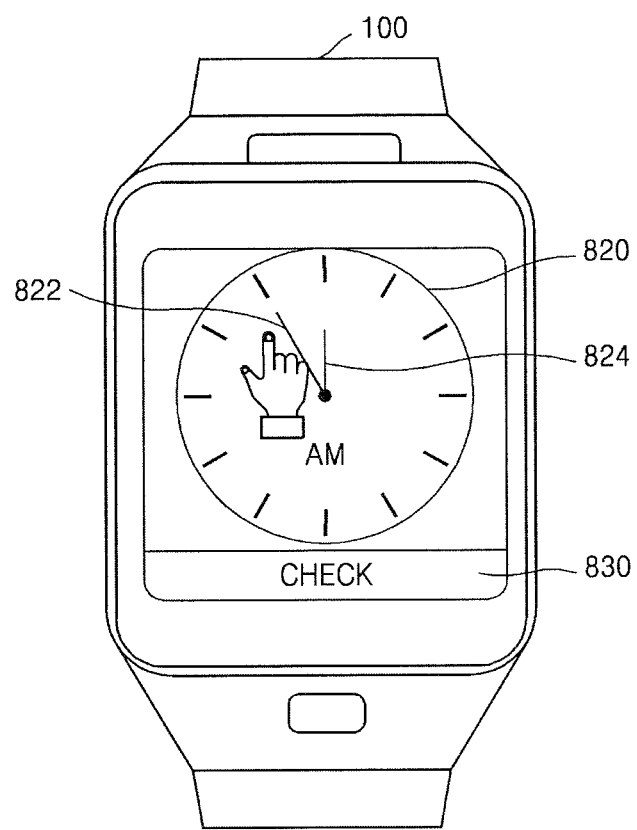
Figure 8C:
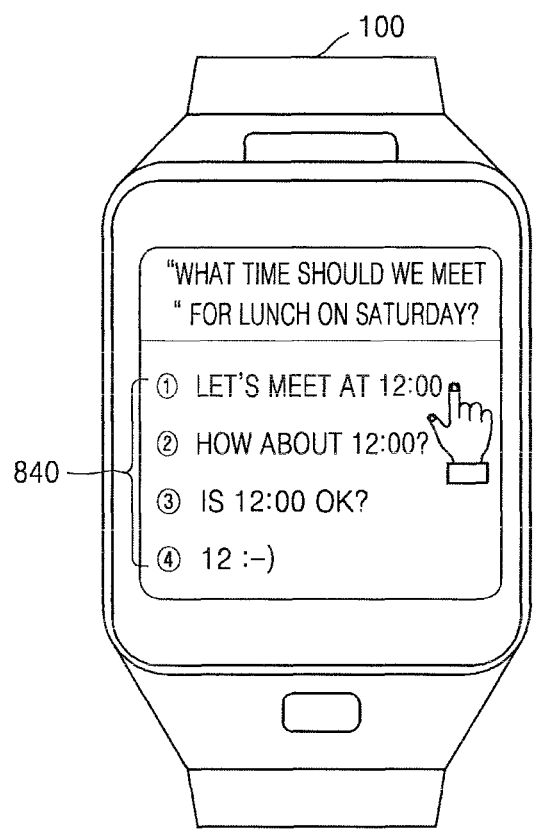

FIGS. 8A to 8C are diagrams of a method of providing, by a device, a UI for selecting a time when a message asking about a time is received, according to an embodiment of the present disclosure.

Referring to FIGS. 8A to 8C, when the received message is requesting to select a time for a certain situation, the device 100 may provide a UI for selecting a time and provide at least one recommended reply message including the selected time. For example, the device 100 may receive a message "what time should we meet for lunch on Saturday?". Upon receiving the message, the device 100 may determine that a message type of the message is a short-answer type and a category of the message is a time.

Upon determining that the message type is a short-answer type and the category is a time, the device 100 may display "I'm not sure", "what time is OK?", and "hold" as recommended reply messages 815. The device 100 may display a menu 810 for receiving a user input of selecting a time and generating a recommended reply message including the selected time.

Referring to FIG. 8B, upon receiving a user input of selecting the menu 810, the device 100 may display a UI providing a function of selecting a time. For example, the UI may include an analog clock image 820. The analog clock image 820 may include hands 822 and 824 having locations adjustable by the user.

Referring to FIG. 8C, upon receiving user inputs of adjusting the hands 822 and 824 and selecting a check button 830, the device 100 may display at least one recommended reply message 840 including a selected time. For example, when a sending intention of the message is a question asking when to meet and a time is selected by the user, the device 100 may determine the selected time, a question asking for an opinion about the selected time, or a suggestion about the selected time as a reply intention.

The device 100 may store "how about ~?" or "is ~OK?" as a recommended reply message correspondingly to a question asking for an opinion about a certain time, and store "oh, let's meet at ~" as a recommended reply message correspondingly to a suggestion about a certain time. The device 100 may combine the selected time and a recommended reply message corresponding to the reply intention and generate "let's meet at 12:00", "how about 12:00?", "is 12:00 OK?" or "12 :-)" as a recommended reply message.

The device 100 displays the recommended reply messages 840 and upon receiving a user input of selecting one of the recommended reply messages 840, transmits the selected recommended reply message to a device of a sender.

Figure 9A:
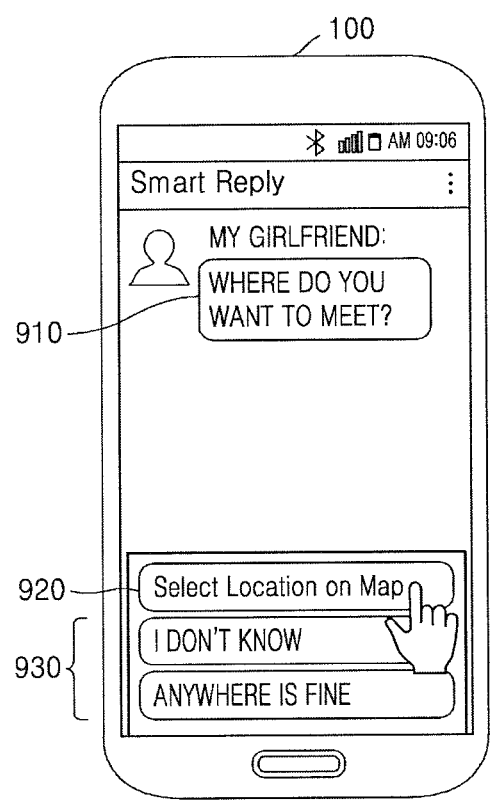
FIGS. 9A to 9C are diagrams of a method of providing, by a device, a UI for selecting a place when a message asking about a place is received, according to an embodiment of the present disclosure.
Figure 9B:
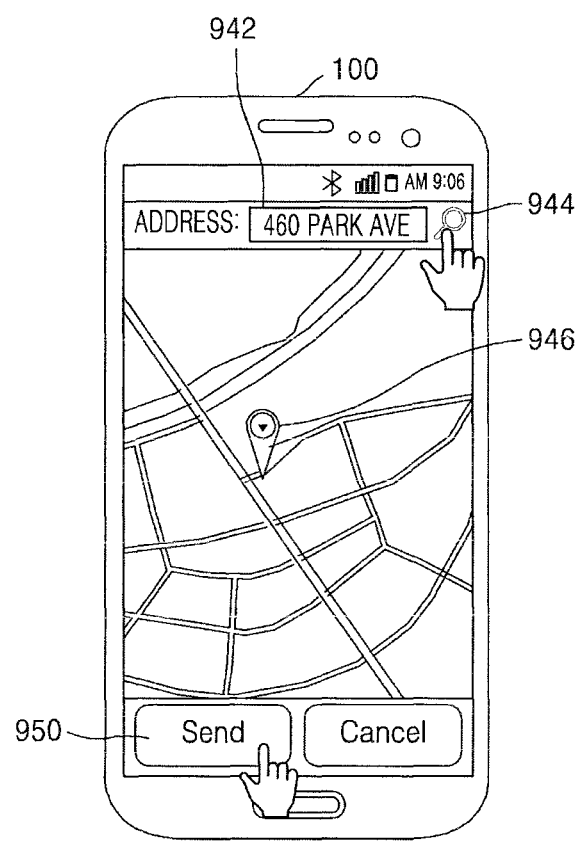
Figure 9C:
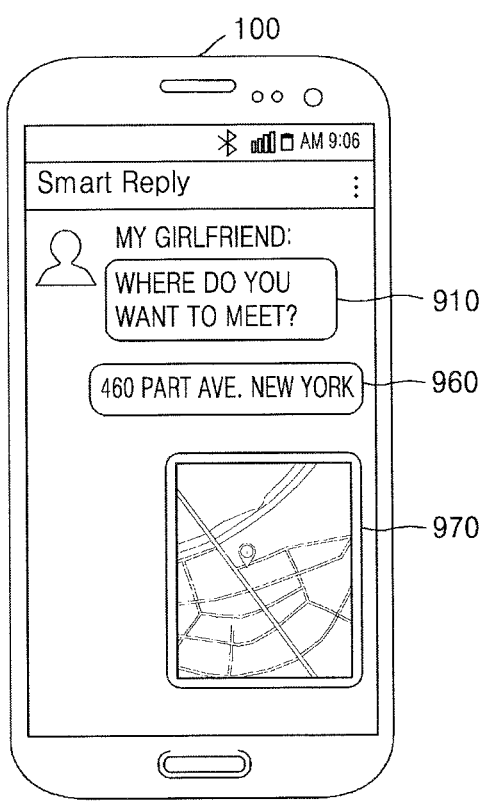

FIGS. 9A to 9C are diagrams of a method of providing, by a device, a UI for selecting a place when a message asking about a place is received, according to an embodiment of the present disclosure.

Referring to FIG. 9A, the device 100 may receive a message 910 of "where do you want to meet?". Upon receiving the message 910, the device 100 may display the message 910, a menu 920 for selecting a place, and at least one recommended reply message 930.

Upon receiving the message 910, the device 100 determines that a message type of the message 910 is a short-answer type, and a category of the message 910 is a place.

Upon determining that the message type is a short-answer type and the category is a place, the device 100 may determine "I don't know" and "anywhere is fine" as recommended reply messages 930. "I don't know" and "anywhere is fine" may be recommended reply messages pre-stored in the device 100 correspondingly to a case where a message type is a short-answer type and a category is a place.

The device 100 may also display the menu 920 for selecting a place.

Referring to FIG. 9B, the device 100 may display a UI for providing a function of selecting a place, upon receiving a user input of selecting the menu 920. For example, the UI for providing a function of selecting a place may include a map image. In this case, the device 100 may display a map around a place the device 100 is located. The device 100 may display a map around a place where messages are pre-exchanged between a sender and the user.

A map viewer, a map search function, or a place selecting function prepared in an application programming interface (API) distributed by a map service provider may be installed in the device 100. Accordingly, the device 100 may request a map server operated by a map service provider for map information of a certain place or a certain location, and receive the map information from the map server. The map may include a map image, latitude and longitude, and address information, but is not limited thereto.

The device 100 may display a search window 942 for searching for an address. Upon receiving user inputs of inputting an address into the search window 942 and selecting a search button 944, the device 100 may display a map image including the address and an indicator 946 indicating a location of the address in the map image 940.

The device 100 may receive a user input of moving the indicator 946 on the map image. When the indicator 946 moves, the device 100 may display an address of a spot where the indicator 946 is located.

Referring to FIG. 9C, upon receiving a user input of selecting a send button 950 for transmitting information about a spot indicated by the indicator 946, the device 100 may transmit, to a sender, a reply message 960 including the spot indicated by the indicator 946. The device 100 may transmit location information of the spot as distinguished from the reply message 960. The location information of the spot may include latitude and longitude of the spot.

The device 100 may display the reply message 960 on a chat window. The device 100 may transmit a map image 970 indicating a location of the spot.

Figure 10A:
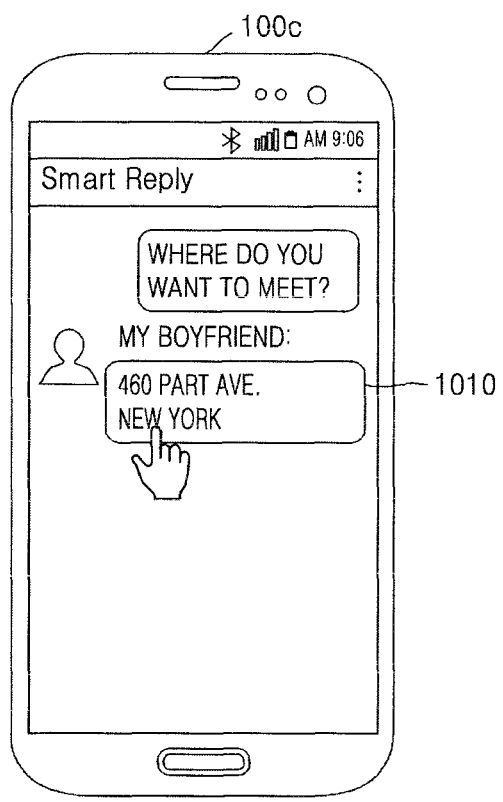
FIGS. 10A and 10B are diagrams of a method of displaying, by a device, information included in a message when a message indicating a place is received, according to an embodiment of the present disclosure.
Figure 10B:
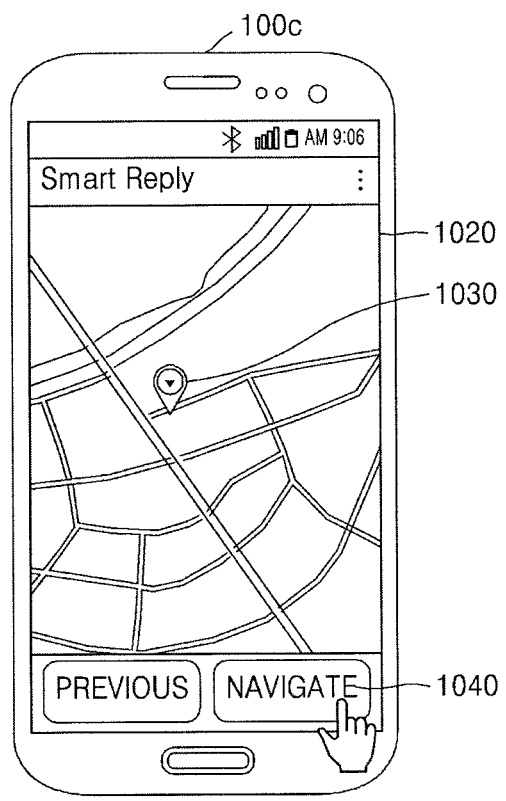

FIGS. 10A and 10B are diagrams of a method of displaying, by a device, information included in a message when a message indicating a place is received, according to an embodiment of the present disclosure.

Referring to FIG. 10A, the device 100c may receive a message 1010 indicating a place. In this case, the device 100c may receive, together with the message 1010, location information of the place. The location information may include, for example, longitude and latitude of the place. In this case, the location information may be distinguishably received from the message 1010. For example, a tag name of the message 1010 and a tag name of the location information may be different from each other. The message 1010 and the location information may be distinguished by pre-set identifiers. Upon receiving the message 1010, the device 100c may display the message 1010.

Referring to FIG. 10B, upon receiving a user input of selecting the message 1010, the device 100c may display a map image 1020 showing a location of the place based on the location information. In this case, the device 100c may display an indicator 1030 on the location of the place on the map image 1020.

The device 100c may display a navigate button 1040, and upon receiving a user input of selecting the navigate button 1040, display a path from a current location to the location of the place on the map image 1020.

Figure 11A:
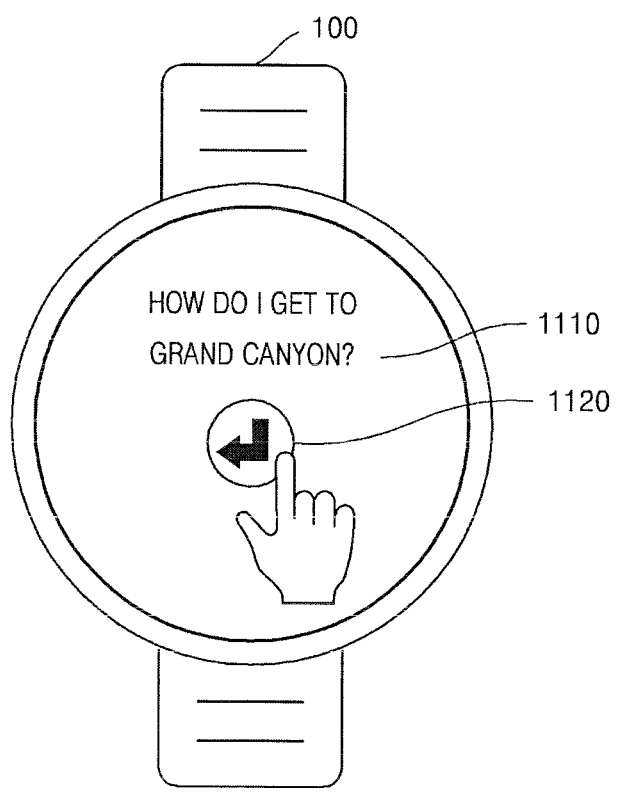
FIGS. 11A to 11C are diagrams of a method of providing, by a device, a UI for selecting a path when a message asking about a path to a destination is received, according to an embodiment of the present disclosure.
Figure 11B:
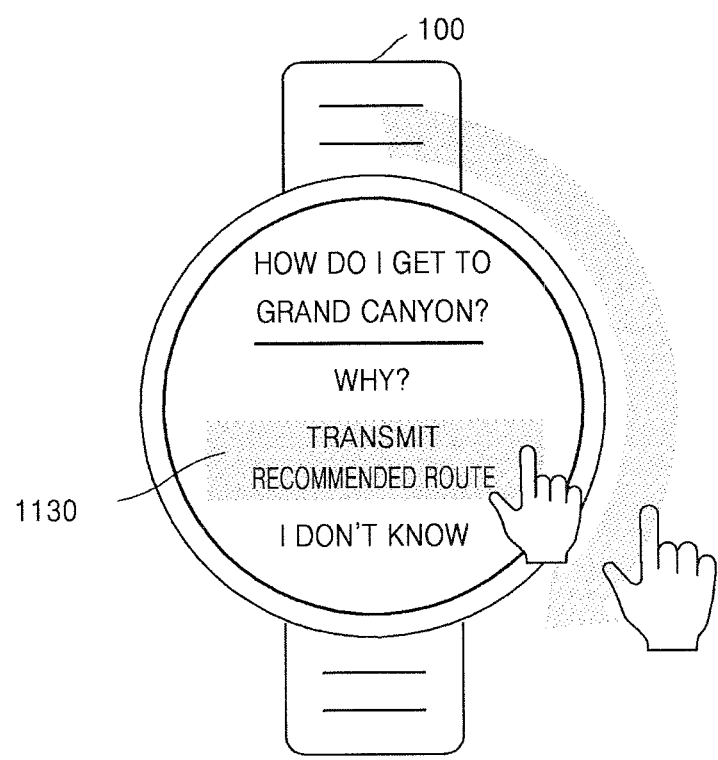
Figure 11C:
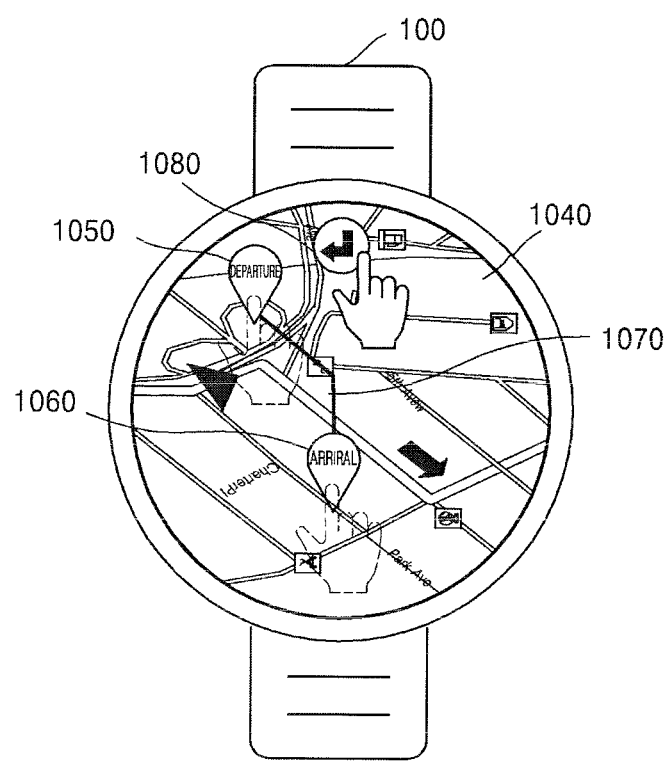

FIGS. 11A to 11C are diagrams of a method of providing, by the device 100, a UI for selecting a path when a message asking about a path to a destination is received, according to an embodiment of the present disclosure.

Referring to FIGS. 11A to 11C, when the received message is asking about a path to a destination, the device 100 may provide a UI for selecting a path and provide a recommended reply message indicating the selected path.

Referring to FIG. 11A, the device 100 may receive a message 1110 of "how do I get to Grand Canyon?". Upon receiving the message 1110, the device 100 may determine that a message type of the message 1110 is a short-answer type and a category of the message 1110 is a place. In addition, the device 100 may determine a path as a sub-category of the place.

Referring to FIG. 11B, upon receiving a user input of selecting a check button 1120, the device 100 may display a menu 1130 for selecting a path, together with a recommended reply message.

Referring to FIG. 11C, upon receiving a user input of selecting the menu 1130, the device 100 may display a UI for providing a function of selecting a path. The UI for providing a function of selecting a path may include a map image 1040, an icon 1050 for selecting a departure point, and an icon 1060 for selecting a destination.

The device 100 may receive user inputs of selecting the departure point and the destination by moving locations of the icons 1050 and 1060. The device 100 may also obtain additional information indicating the departure point and the destination from the message 1110, and set the departure point and the destination on the map image 1040.

Upon receiving user inputs of selecting the departure point and the destination and selecting a check button 1080, the device 100 may transmit a map image indicating a selected path 1070 to the sender's device.

Figure 12A:
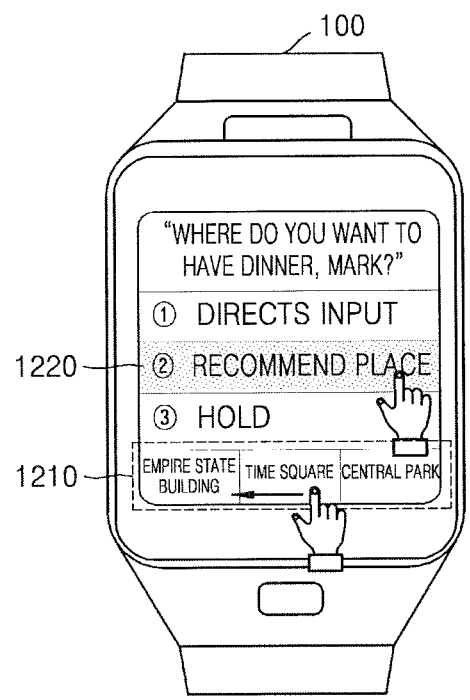
FIGS. 12A to 12C are diagrams of a method of providing, by a device, a UI for selecting a place when a message asking about a place is received, according to an embodiment of the present disclosure.
Figure 12B:
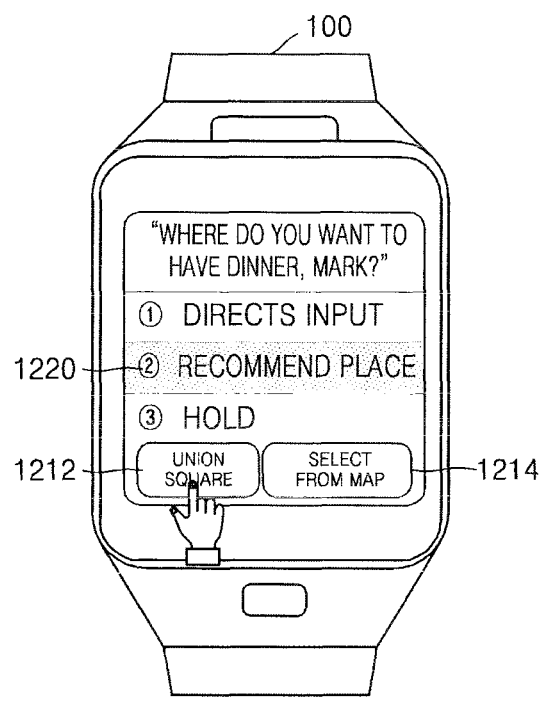
Figure 12C:
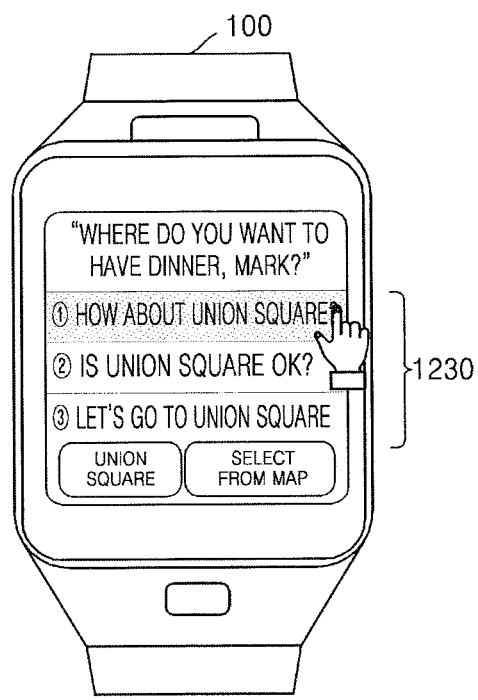

FIGS. 12A to 12C are diagrams of a method of providing, by a device, a UI for selecting a place when a message asking about a place is received, according to another embodiment of the present disclosure.

Referring to FIGS. 12A to 12C, when the received message is a message requesting to select a place for a certain situation, the device 100 may provide a UI for selecting a place and provide a recommended reply message indicating the selected place.

Referring to FIG. 12A, the device 100 may receive a message "where do you want to have dinner, Mark?". Upon receiving the message, the device 100 may determine that a sending intention of the message is a request to select a place for a dinner together. The device 100 may determine that a message type of the message is a short-answer type and a category of the message is a place.

Upon determining that the message type is a short-answer type and the category is a place, the device 100 may display a menu for selecting whether to directly input a place, receive a recommendation on a place, or to reply later. Upon receiving a user input of selecting a menu 1220 for receiving a recommendation, the device 100 may display at least one recommendation 1210.

For example, the device 100 may determine, as a recommendation, a downtown nearest to a location of the device 100 from among a plurality of pre-set downtowns. The device 100 may determine, as a recommendation, a place where the user and a sender met based on messages exchanged between the user and the sender or schedule information stored in the device 100. The device 100 may determine, as a recommendation, a place preferred by the user based on an age, a gender, a hobby, and a propensity of the user.

The device 100 may display the at least one recommendation 1210. For example, the device 100 may display "Empire State Building", "Time Square", "Central Park", and "Union Square" as the recommendations 1210.

Referring to FIG. 12B, upon receiving a user input of sweeping one of the recommendations 1210, the device 100 may display a list 1212 of new recommendations.

The device 100 may display a button 1214 for selecting a place from a map. Upon receiving a user input of selecting the button 1214, the device 100 may display a map showing a place around the user.

Upon receiving a user input of selecting one of the recommendations 1210, the device 100 may generate a recommended reply message indicating the selected recommendation.

For example, when a sending intention of the message is a request asking the user to select a place to meet, the device 100 may determine a recommendation on a place or a suggestion on a place as a reply intention. The device 100 may store a recommended reply message of "how about ~?" or "is ~OK?" according to a reply intention of recommending a place, and may store a recommended reply message of "let's go to ~" according to a reply intention of suggesting a place.

The device 100 may combine the selected recommendation and a message corresponding to a reply intention to generate "how about Union Square?", "is Union Square OK?", or "let's go to Union Square" as a recommended reply message.

Referring to FIG. 12C, the device 100 may display at least one recommended reply message 1230 including the selected recommendation.

The device 100 may display the at least one recommended reply message 1230, and upon receiving a user input of selecting one of the at least one recommended reply message 1230, transmit the selected recommended reply message to a device of a sender.

FIGS. 13A to 13D are diagrams of a method of providing, by a device, a UI for selecting a schedule when a message asking about a schedule is received, according to an embodiment of the present disclosure.

Figure 13A:
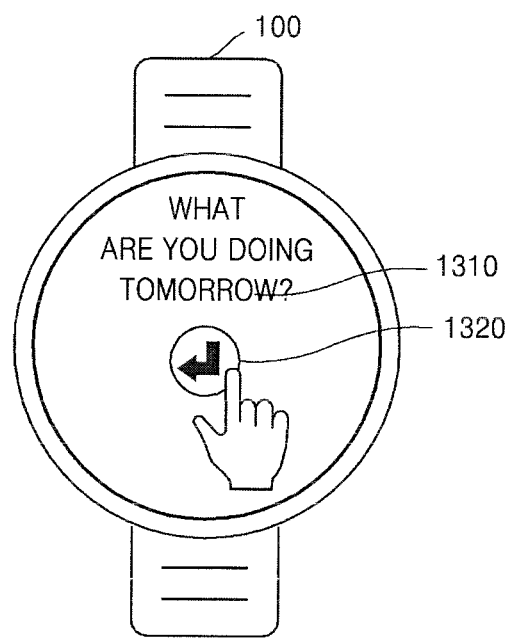
FIGS. 13A to 13D are diagrams of a method of providing, by a device, a UI for selecting a schedule when a message asking about a schedule is received, according to an embodiment of the present disclosure.

Referring to FIG. 13A, the device 100 may receive a message 1310 of "what are you doing tomorrow?". The device 100 may also display a check button 1320. Upon receiving a user input of selecting the check button 1320, the device 100 may determine that a sending intention of the message 310 is a question asking about a schedule tomorrow. The device 100 may determine that a message type of the message 1310 is a short-answer type, and that a category of the message 1310 is a schedule.

Figure 13B:
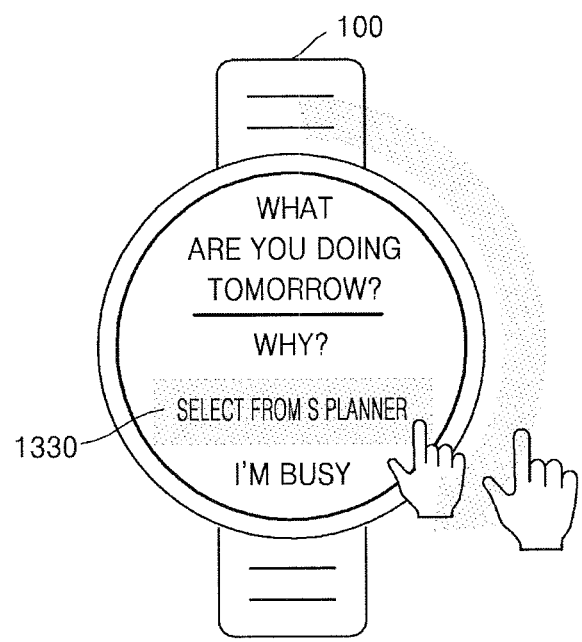

Referring to FIG. 13B, upon receiving a user input of selecting the check button 1320, the device 100 may display a menu 1330 for selecting one of schedules stored in the device 100.

Figure 13C:
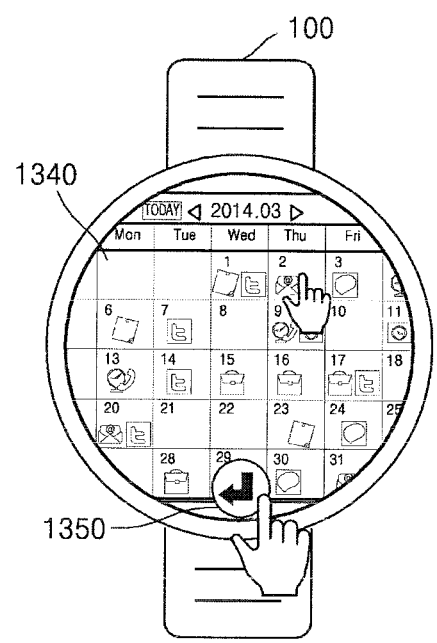

Referring to FIG. 13C, upon receiving a user input of selecting the menu 1330, the device 100 may display a list 1340 of schedules of the user stored in the device 100.

The device 100 may display a schedule of a date when the menu 1330 is selected. The device 100 may also obtain additional information of "tomorrow" specifying data to be selected from the message 1310, and display the schedule tomorrow.

Upon receiving user inputs of selecting a schedule from the list 1340, and selecting a check button 1350, the device 100 may transmit a reply message including the selected schedule to a device of a sender.

Figure 13D:
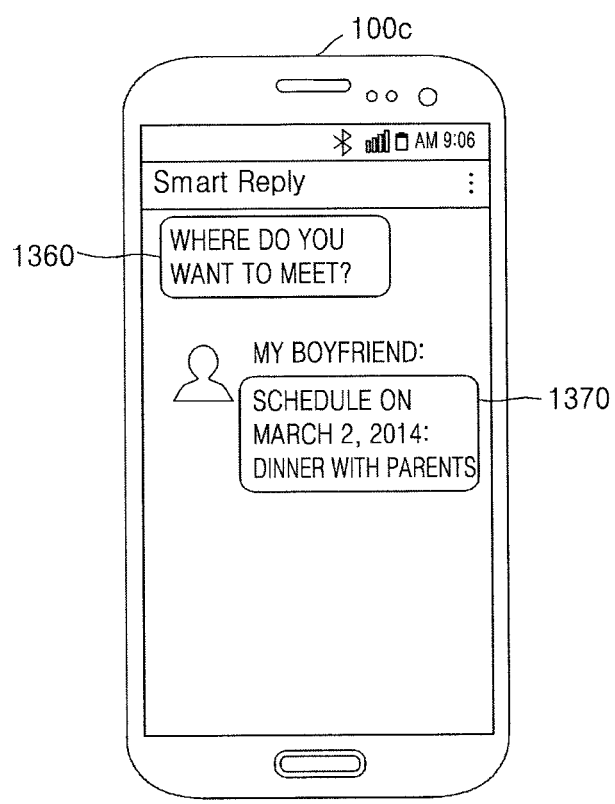

Referring to FIG. 13D, the device of the sender may display a transmitted message 1360 and a received reply message 1370.

Figure 14A:
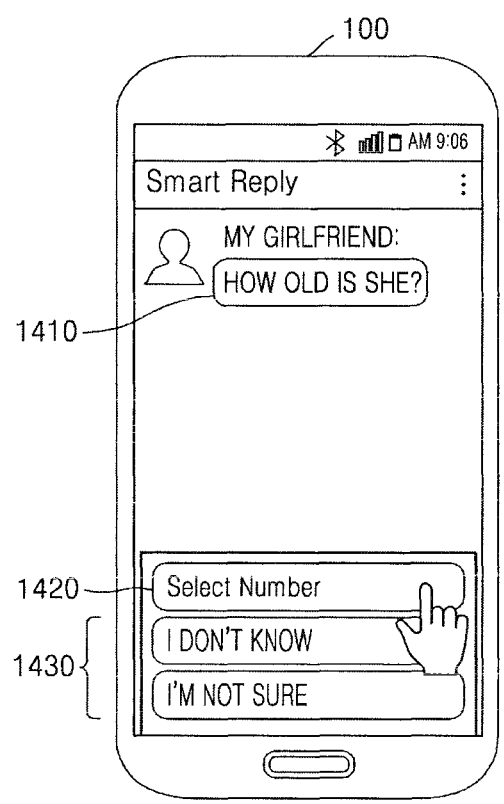
FIGS. 14A to 14C are diagrams of a method of providing, by a device, a UI for selecting an age when a message asking about an age is received, according to an embodiment of the present disclosure.
Figure 14B:
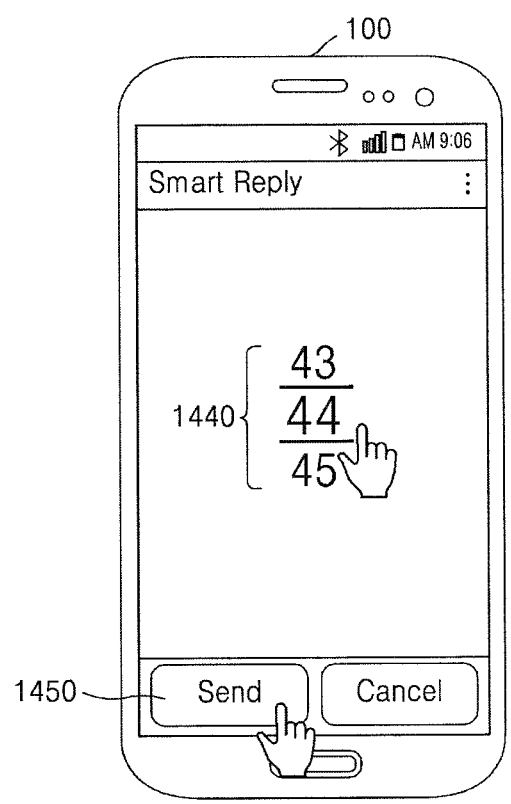
Figure 14C:
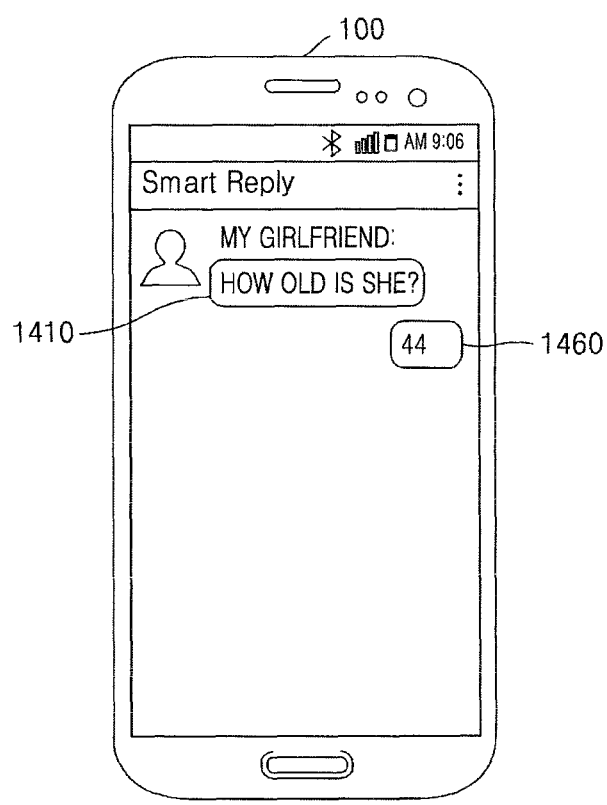

FIGS. 14A to 14C are diagrams for describing a method of providing, by the device 100, a UI for selecting an age when a message asking about an age is received, according to an embodiment of the present disclosure.

Referring to FIG. 14A, the device 100 may receive a message 1410 of "how old is she?". Upon receiving the message 1410, the device 100 may display the message 1410, a menu 1420 for selecting an age, and at least one recommended reply message 1430.

Upon receiving the message 1410, the device 100 may determine that a message type of the message 1410 is a short-answer type and a category of the message 1410 is an age.

Upon determining that the message type is a short-answer type, the device 100 may determine "I don't know" and "I'm not sure" as recommended reply messages.

The device 100 may also display the menu 1420 for selecting an age.

Referring to FIG. 14B, upon receiving a user input of selecting the menu 1420, the device 100 may display a UI for providing a function of selecting an age.

For example, the device 100 may display a UI 1440 sequentially displaying numbers from 0 to 120 according to a sweeping input of the user.

Referring to FIG. 14C, upon receiving user inputs of selecting one of the displayed numbers and selecting a send button 1450, the device 100 may transmit a reply message 1460 including the selected number to a device of a user. The device 100 may also display the reply message 1460 on a chat window.

Figure 15A:
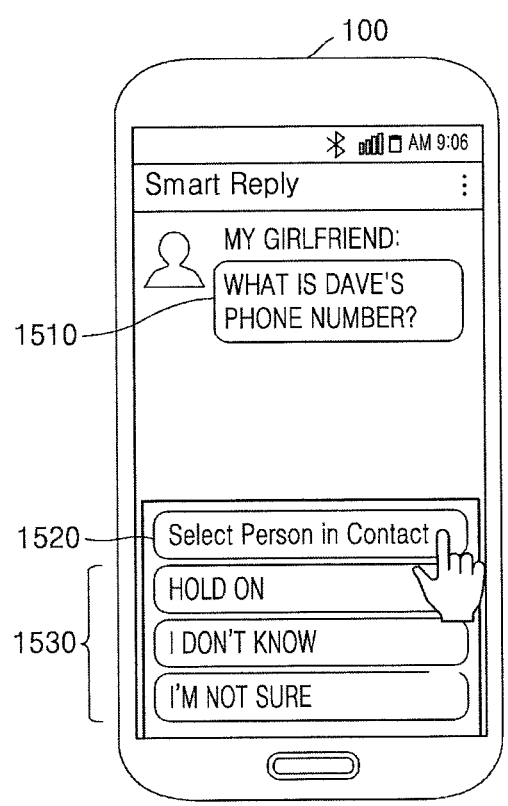
FIGS. 15A to 15C are diagrams of a method of providing, by a device, a UI for selecting a phone number when a message asking for a phone number is received, according to an embodiment of the present disclosure.
Figure 15B:
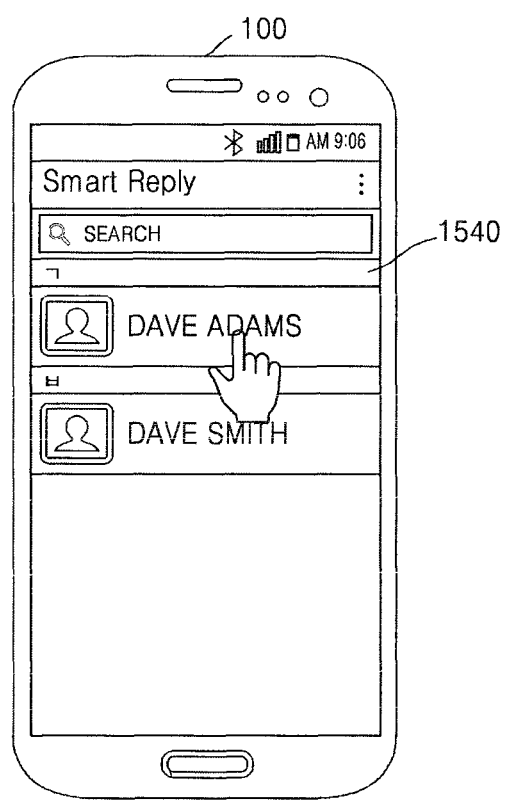
Figure 15C:
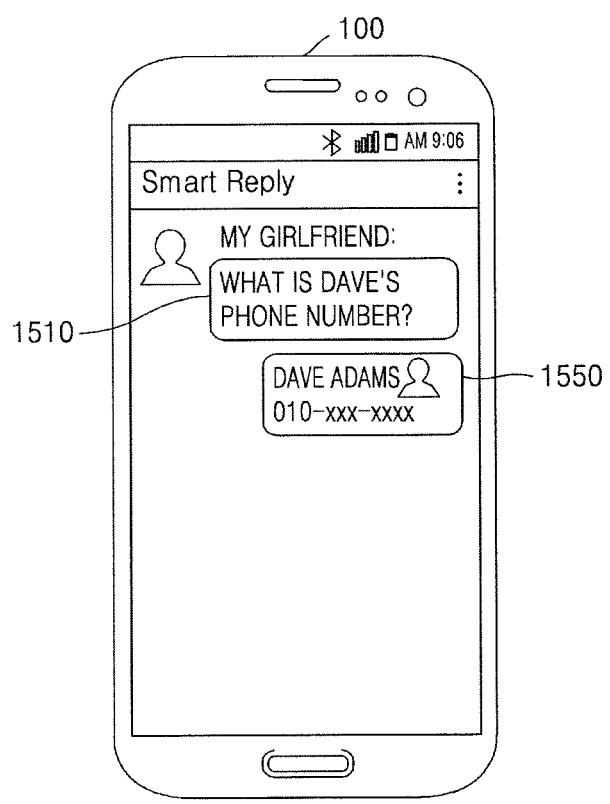

FIGS. 15A to 15C are diagrams of a method of providing, by a device, a UI for selecting a phone number when a message asking for a phone number is received, according to an embodiment of the present disclosure.

Referring to FIG. 15A, the device 100 may receive a message 1510 of "what is phone number of Dave?". Upon receiving the message 1510, the device 100 may display the message 1510, a menu 1520 for selecting a phone number, and at least one recommended reply message 1530.

Upon receiving the message 1510, the device 100 may determine that a message type of the message 1510 is a short-answer type and a category of the message 1510 is a phone number.

Upon determining that the message type is a short-answer type, the device 100 may determine "hold on", "I don't know", "I'm not sure" as recommended reply messages.

The device 100 may display the menu 1520 for selecting a phone number.

Referring to FIG. 15B, upon receiving a user input of selecting the menu 1520, the device 100 may execute a contact list application to search phone numbers stored in the device 100. By executing the contact list application, the device 100 may display a UI 1540 for searching the phone numbers stored in the device 100.

The device 100 may determine ID information of a certain person in the message 1510, and search for similar or same ID information from the phone numbers based on the determined ID information. The device 100 may display the search results.

For example, the device 100 may determine a word "Dave" included in the message 1510 as ID information of a certain person, search for "Dave Adams" and "Dave Smith" as same or similar ID information of "Dave" from the phone numbers stored in the device 100, and display "Dave Adams" and "Dave Smith" on a screen.

Referring to FIG. 15C, upon receiving a user input of selecting "Dave Adams", the device 100 may transmit a message "Dave Adams (010-1111-2222)" as a replay message 1550 to a device of a sender. The device 100 may also display the replay message 1550 on a chat window.

Figure 16A:
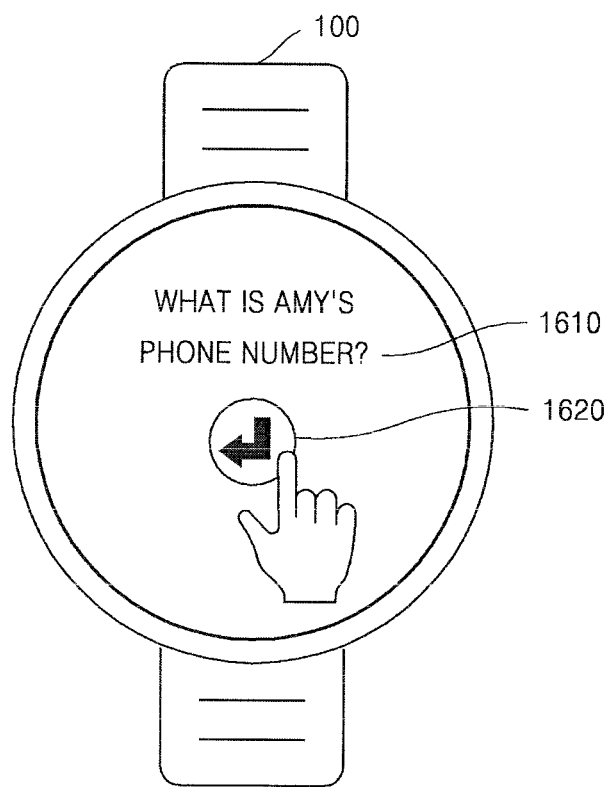
FIGS. 16A to 16C are diagrams of a method of providing, by a device, a UI for selecting a phone number when a message asking for a phone number is received, according to an embodiment of the present disclosure.
Figure 16B:
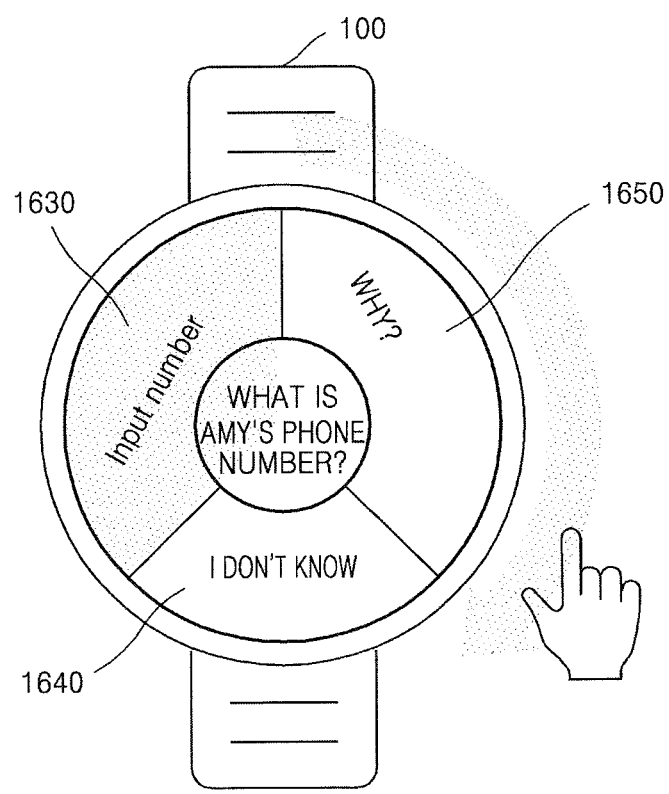
Figure 16C:
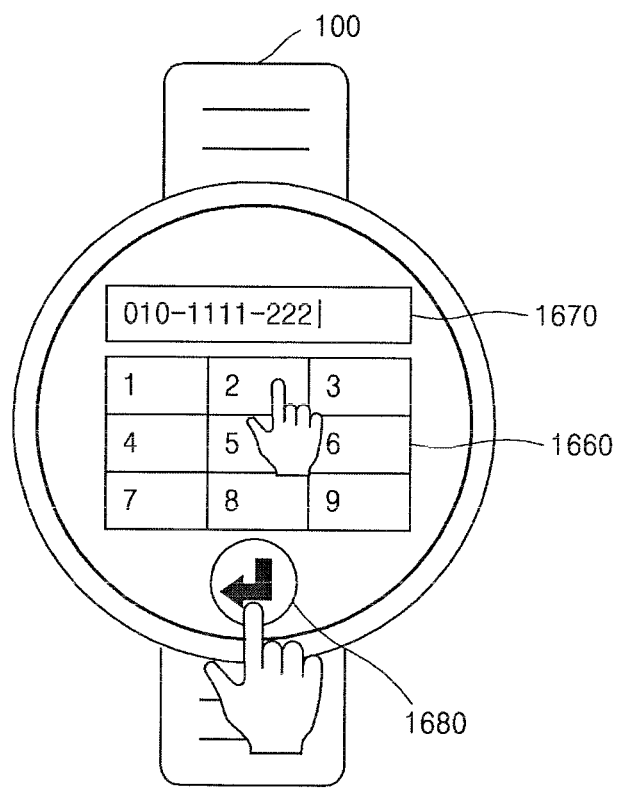

FIGS. 16A to 16C are diagrams of a method of providing, by a device, a UI for selecting a phone number when a message asking for a phone number is received, according to an embodiment of the present disclosure.

Referring to FIG. 16A, the device may receive a message 1610 of "what is phone number of Amy?". Upon receiving the message 1610, the device 100 may determine that a message type of the message 1610 is a short-answer type and a category of the message 1610 is a phone number. The device 100 may display a check button 1620.

Referring to FIG. 16B, upon receiving a user input of selecting the check button 1620, the device 100 may display recommended reply messages 1640 and 1650 and a menu 1630 for inputting a phone number.

Referring to FIG. 16C, upon receiving a user input of selecting the menu 1630 for inputting a phone number, the device 100 may display a plurality of number buttons 1660 for inputting a number and an input window 1670. Upon selecting the number buttons 1660, the device 100 may display selected numbers in a form of a phone number on the input window 1670.

Upon receiving a user input of inputting a phone number on the input window 1670 and selecting a check button 1680, the device 100 may transmit the input phone number to a device of a sender.

Figure 17A:
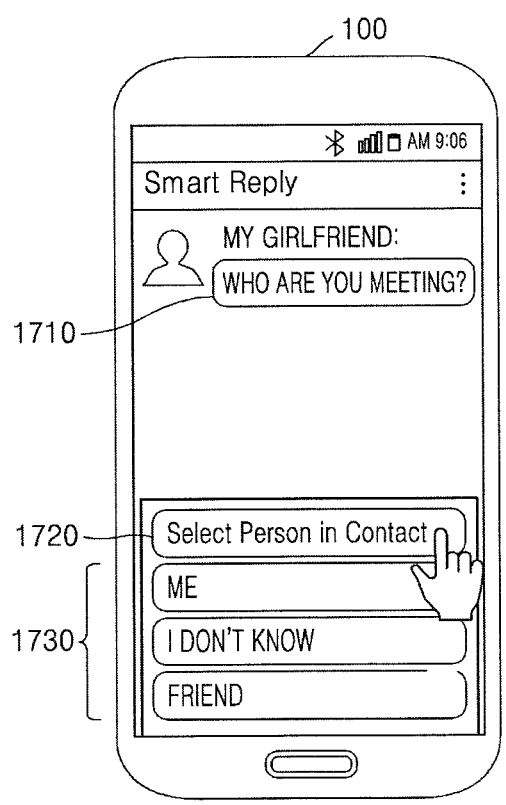
FIGS. 17A to 17C are diagrams of a method of providing, by a device, a UI for selecting a person when a message asking about a person is received, according to an embodiment of the present disclosure.
Figure 17B:
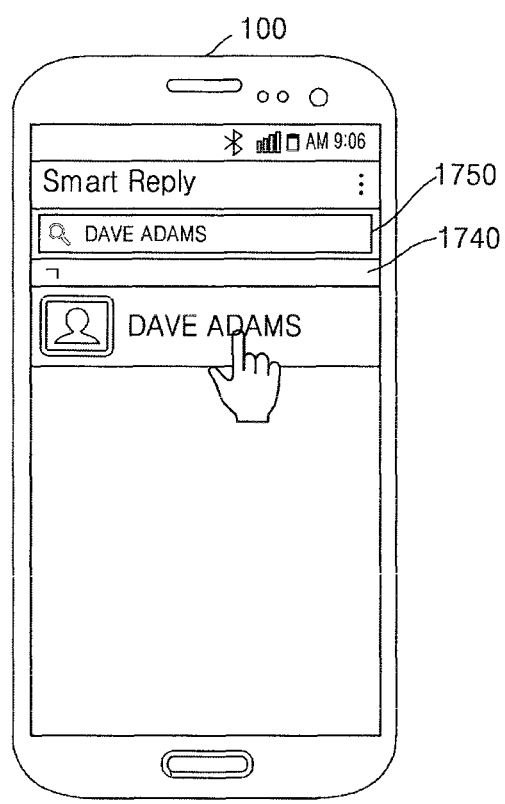
Figure 17C:
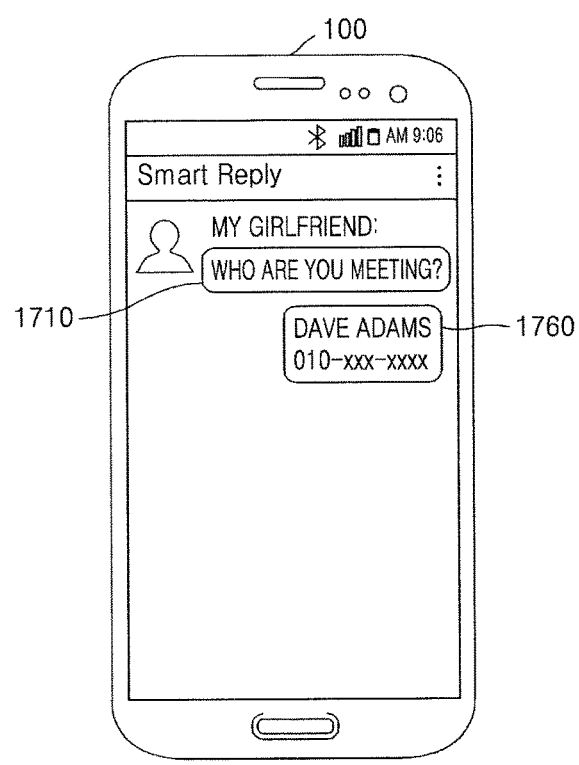

FIGS. 17A to 17C are diagrams of a method of providing, by the device 100, a UI for selecting a person when a message asking about a person is received, according to an embodiment of the present disclosure.

Referring to FIG. 17A, the device 100 may receive a message 1710 of "who are you meeting?". Upon receiving the message 1710, the device 100 may display the message 1710, a menu 1720 for selecting a person, and at least one recommended reply message 1730.

Upon receiving the message 1710, the device 100 may determine that a message type of the message 1710 is a short-answer type and a category of the message 1710 is a person.

When it is determined that the message type is a short-answer type and the category is a person, the device 100 may determine "me", "I don't know", and "friend" as recommended reply messages. "me", "I don't know", and "friend" may be recommended reply messages pre-stored in the device 100 correspondingly to a case where a message type is a short-answer type and a category is a person.

The device 100 may also display the menu 1720 for selecting a person.

Referring to FIG. 17B, upon receiving a user input of selecting the menu 1720, the device 100 may execute a contact list application installed in the device 100. Upon executing the contact list application, the device 100 may display a UI 1740 for searching phone numbers stored in the device 100.

The device 100 may also display a search window 1750 for searching the phone numbers stored in the device 100. Upon receiving user inputs of inputting a name "Dave Adams" into the search window 1750 and selecting a search button, the device 100 may search people having the same or similar names as the input name from among the stored phone numbers, and display a list of found people.

Referring to FIG. 17C, upon receiving a user input of selecting one of the found people, the device 100 may transmit a phone number of the selected person to a device of a sender.

For example, upon receiving a user input of selecting "Dave Adams", the device 100 may transmit a reply message 1760 of "Dave Adams (010-1111-2222)" to the device of the sender. The device 100 may also display the reply message 1760 on a chat window.

FIGS. 18A to 18D are diagrams for describing a method of providing, by a device, a UI for selecting ID information of an application when a message asking for ID information of an application is received, according to an embodiment of the present disclosure.

Figure 18A:
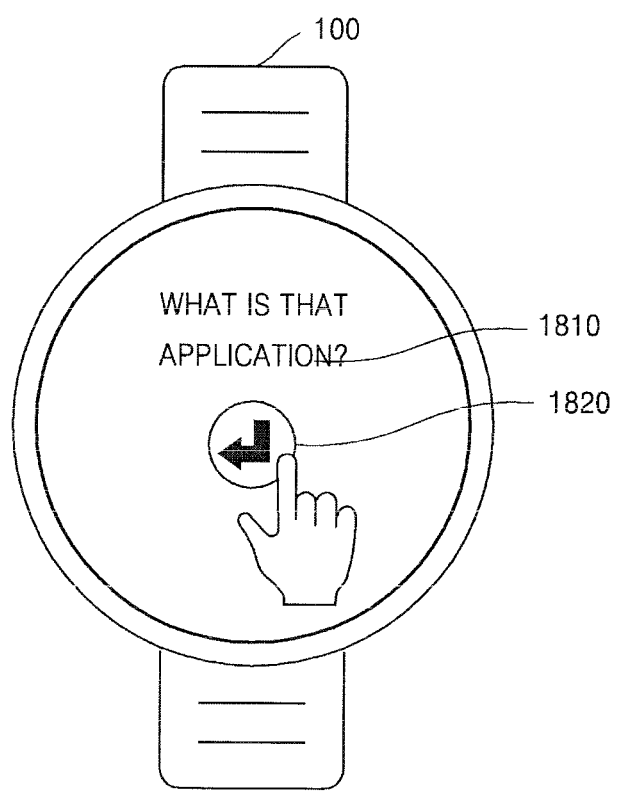
FIGS. 18A to 18D are diagrams of a method of providing, by a device, a UI for selecting identification (ID) information of an application when a message asking for ID information of an application is received, according to an embodiment of the present disclosure.

Referring to FIG. 18A, the device 100 may receive a message 1810 of "what is that application?". Upon receiving the message 1810, the device 100 may determine that a message type of the message 1810 is a short-answer type and a category of the message 1810 is ID information of an application. The device 100 may also display a check button 1820.

Figure 18B:
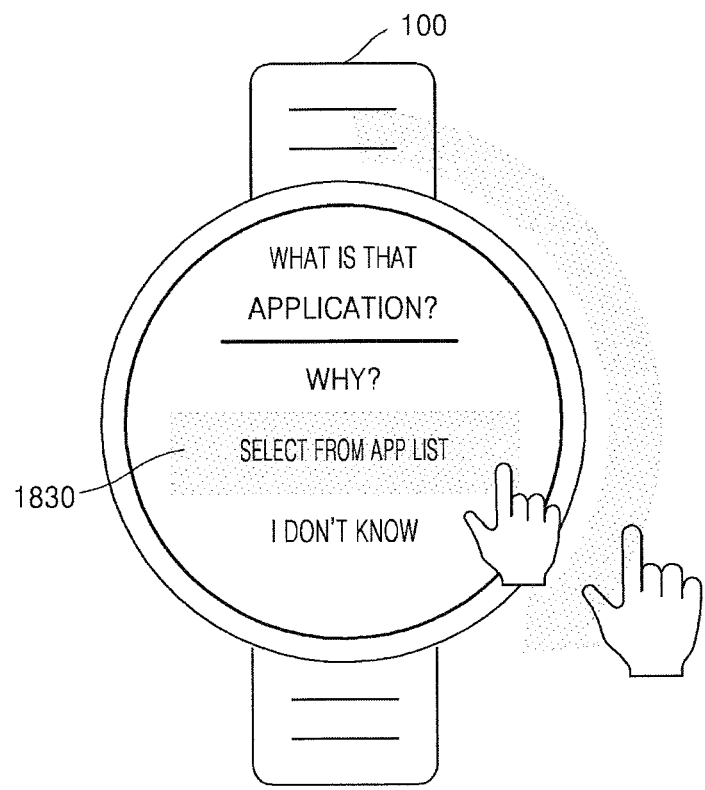

Referring to FIG. 18B, upon receiving a user input of selecting the check button 1820, the device 100 may display a recommended reply message and a menu 1830 for selecting one of applications installed in the device 100.

Figure 18C:
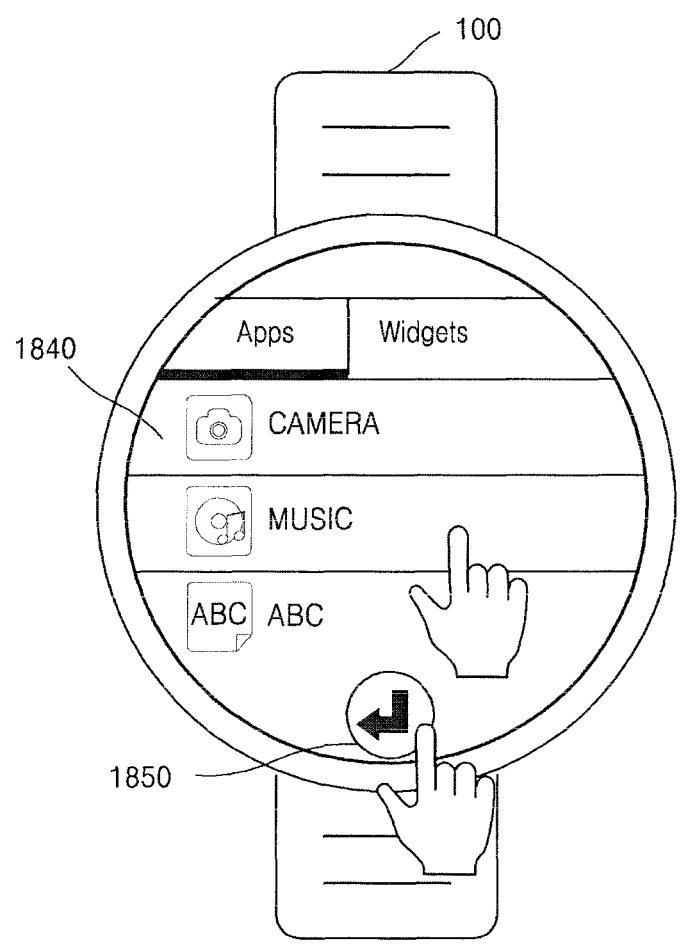

Referring to FIG. 18C, upon receiving a user input of selecting the menu 1830, the device 100 may display a list 1840 of applications or widgets installed in the device 100.

Upon receiving user inputs of selecting an application or widget from the list 1840 and selecting a check button 1850, the device 100 may transmit ID information of the selected application to a device of a sender. The ID information may include a name and an icon of the application, but is not limited thereto.

Figure 18D:
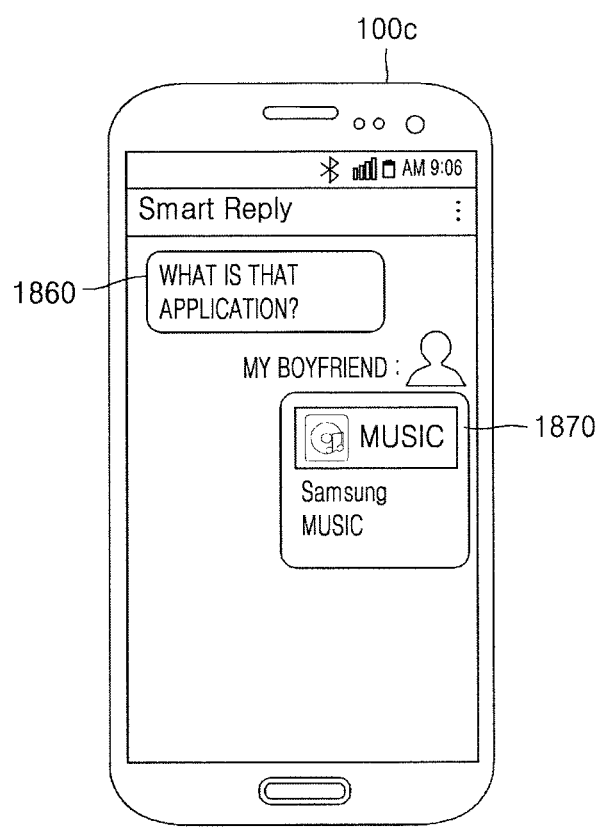

Referring to FIG. 18D, the device 100c of the sender may display a transmitted message 1860 and received ID information 1870.

Figure 19A:
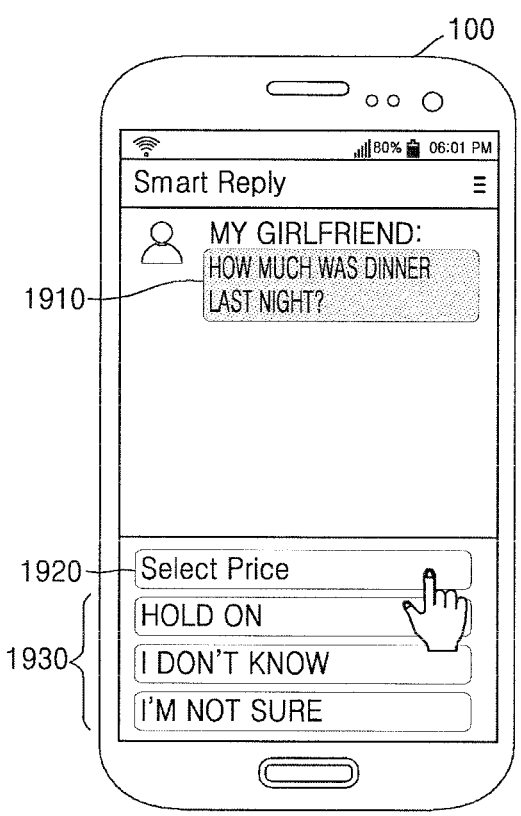
FIGS. 19A to 19C are diagrams of a method of providing, by a device, a UI for selecting a sum of money when a message asking about a sum of money is received, according to an embodiment of the present disclosure.
Figure 19B:
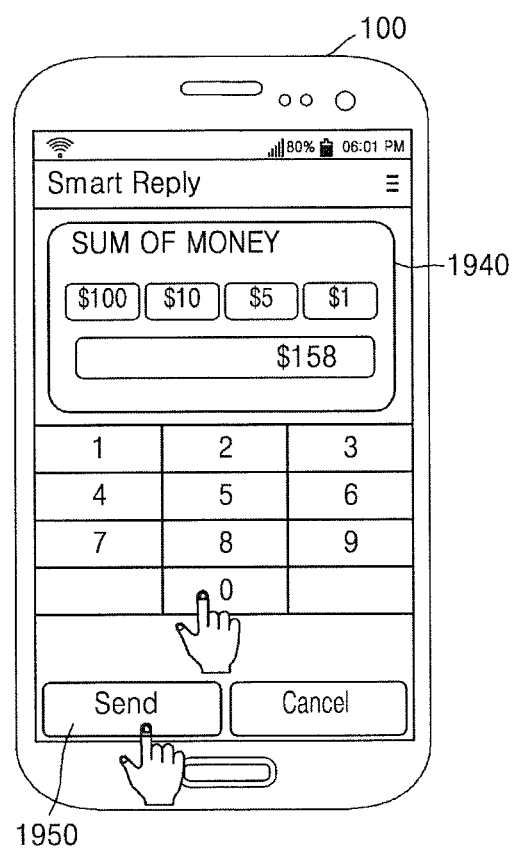
Figure 19C:
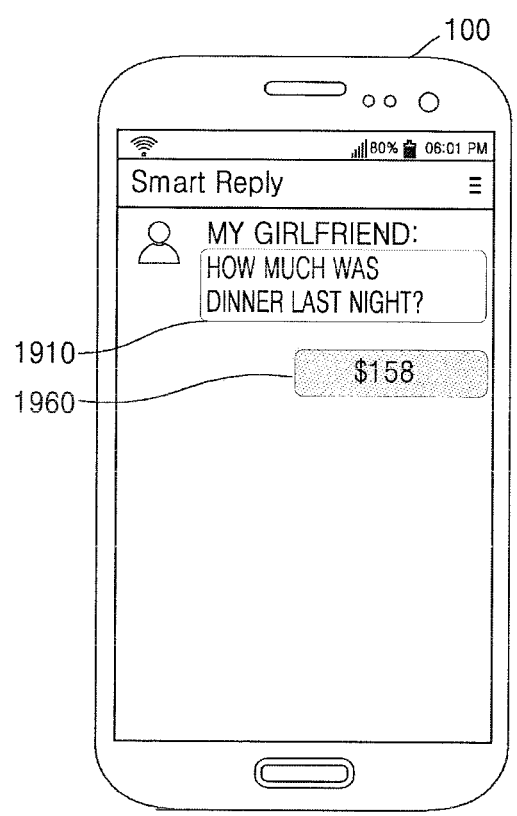

FIGS. 19A to 19C are diagrams of a method of providing, by a device, a UI for selecting a sum of money when a message asking about a sum of money is received, according to an embodiment of the present disclosure.

Referring to FIG. 19A, the device 100 may receive a message 1910 of "how much was dinner last night?". Upon receiving the message 1910, the device 100 may determine that a message type of the message 1910 is a short-answer type and a category of the message 1910 is a sum of money.

The device 100 may also display a recommended reply message 1930 and a menu 1920 for displaying a UI for inputting a sum of money.

Referring to FIG. 19B, upon receiving a user input of selecting the menu 1920, the device 100 may display a UI 1940 for inputting a sum of money.

The UI 1940 may include a plurality of number buttons and a plurality of buttons for selecting an amount of money. The UI 1940 may display an input window in which a selected button is displayed. The UI 1940 may also include a send button 1950 for transmitting an input sum of money to a device of a sender.

Referring to FIG. 19C, upon receiving a user input of selecting the send button 1950, the device 100 may transmit a reply message 1960 including the sum of money input in the input window to the device of the sender.

Figure 20A:
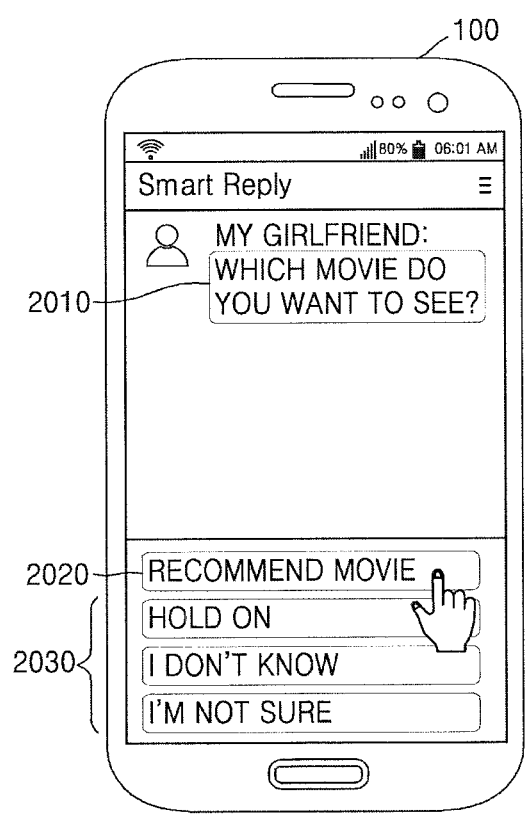
FIGS. 20A to 20C are diagrams of a method of providing, by a device, a UI for selecting a movie when a message asking about a movie is received, according to an embodiment of the present disclosure.
Figure 20B:
Figure 20C:
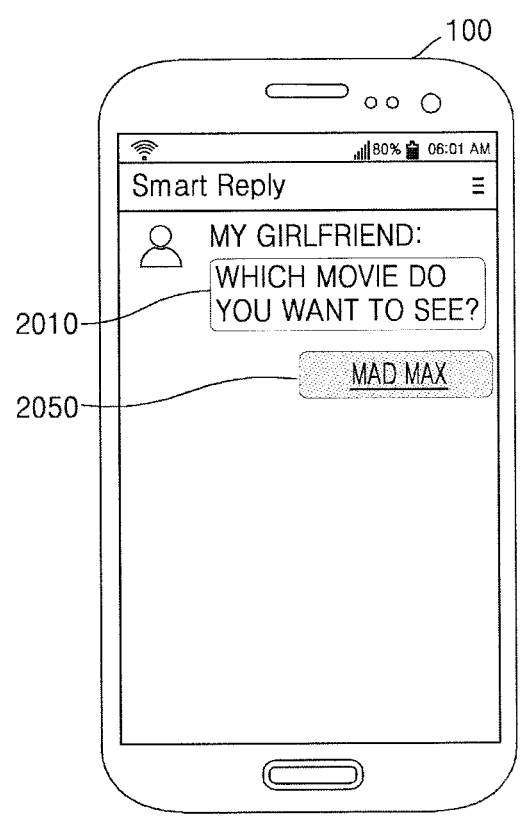

FIGS. 20A to 20C are diagrams of a method of providing, by a device, a UI for selecting a movie when a message asking about a movie is received, according to an embodiment of the present disclosure.

Referring to FIG. 20A, the device 100 may receive a message 2010 of "which movie do you want to see?". Upon receiving the message 2010, the device 100 may display the message 2010, a menu 2020 for selecting a movie, and at least one recommended reply message 2030.

Upon receiving the message 2010, the device 100 may determine that a message type of the message 2010 is a short-answer type and a category of the message 2010 is a movie.

Upon determining that the message type is a short-answer type, the device 100 may determine "hold on", "I don't know", and "I'm not sure" as the recommended reply messages 2030.

The device 100 may also display the menu 2020 for selecting a movie.

Referring to FIG. 20B, upon receiving a user input of selecting the menu 2020, the device 100 may display information about a movie.

A movie search function prepared in API distributed by a service provider providing information about movies may be provided in the device 100. Accordingly, the device 100 may request a movie information server operated by a service provider providing information about movies for information about movies, and receive the information about movies from the movie information server. The information about movies may include information about recent movies, currently playing movies, unreleased movies, ticket sale rankings, rating rankings, movie titles, movie synopses, trailers, and movie genres, but is not limited thereto.

By executing the movie search function, the device 100 may display a UI 2040 for searching movies. Upon receiving a user input of selecting a button 2045 for looking at ticket sale rankings, the device 100 may request the movie information server to provide a list of movies according to the ticket sale rankings. Upon receiving the list of movies from the movie information server, the device 100 may display the list.

Referring to FIG. 20C, upon receiving a user input of selecting a movie from the list of movies, the device 100 may transmit a title 2050 of the selected movie to a device of a sender.

For example, upon receiving a user input of selecting a movie "Mad Max" from the displayed list, the device 100 may transmit a message "Mad Max" to the device of the sender, as a reply message. The device 100 may transmit, together with the reply message, ID information of the movie identified by the movie information server to the device of the sender. The device 100 may also display the title 2050 on a chat window.

Upon receiving the title 2050, the device of the sender may display the title 2050 on a chat window. Upon receiving a user input of selecting the title 2050, the device of the sender may display detailed information about the movie "Mad Max". In this case, the device of the sender may request the movie information server for the detail information about the movie "Mad Max" by using the ID information of the movie, and receive the detail information from the movie information server.

Figure 21A:
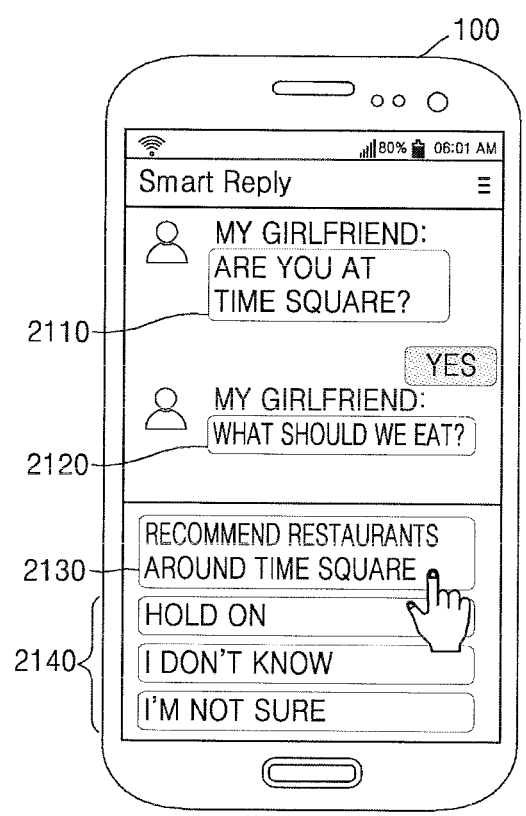
FIGS. 21A to 21C are diagrams of a method of recommending, by a device, data in a category based on messages exchanged between a sender and a user, according to an embodiment of the present disclosure.
Figure 21B:
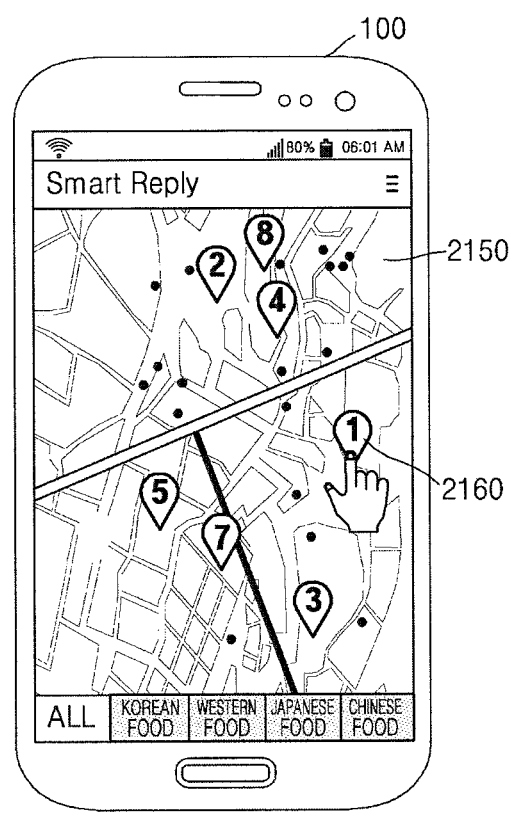
Figure 21C:
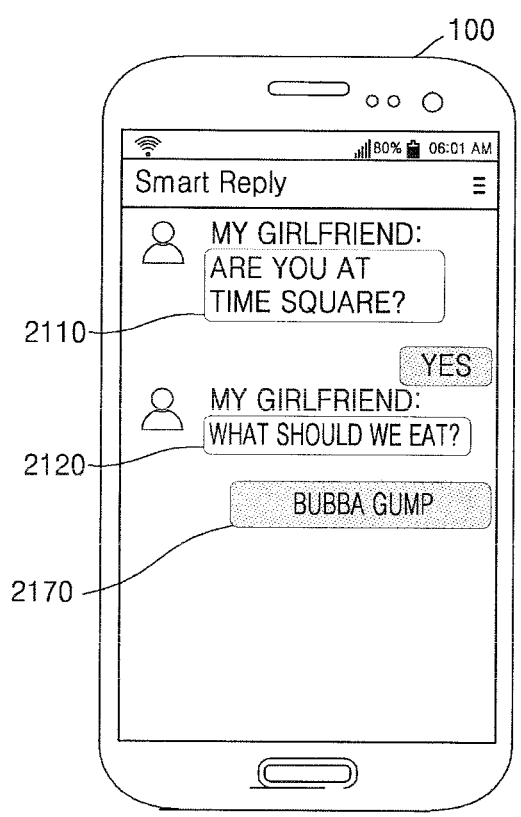

FIGS. 21A to 21C are diagrams of a method of recommending, by a device, data in a category based on messages exchanged between a sender and the user, according to an embodiment of the present disclosure.

Referring to FIG. 21A, the device 100 may receive a message 2110 of "are you at Time Square?". Also, the device 100 may receive a message 2120 of "what should we eat?" within a reference time. Upon receiving the messages 2110 and 2120, the device 100 may display the messages 2110 and 2120, a menu 2130 for selecting a restaurant, and at least one recommended reply message 2140.

Upon receiving the message 2120, the device 100 may determine that a message type of the message 2120 is a short-answer type and a category of the message 2120 is a food.

Upon determining that the message type is a short-answer type, the device 100 may determine "hold on", "I don't know" and "I'm not sure" as the recommended reply messages 2140.

The device 100 may also display the menu 2130 for selecting a restaurant. At this time, the device 100 may detect a message including place information from among messages exchanged within a reference time. For example, the device 100 may detect the message 2110 including a place "Time Square" from among messages exchanged within 1 hour before the message 2120 is received. Also, the device 100 may display the menu 2130 for selecting one of restaurants near a certain place based on the place information.

Referring to FIG. 21B, upon receiving a user input of selecting the menu 2130, the device 100 may display information about restaurants near the certain place.

A restaurant search function prepared in API distributed by a service provider providing information about restaurants may be provided in the device 100. Accordingly, the device 100 may request a restaurant information server operated by the service provider for information about restaurants around the certain place, and receive the information from the restaurant information server. The information may include names, menus, ratings, locations, and business hours of restaurants, but is not limited thereto.

By executing the restaurant search function, the device 100 may display a list of restaurants around the certain place. At this time, the device 100 may display a map image 2150 around the certain place, and an indicator 2160 indicating locations of the restaurants on the map image 2150.

Referring to FIG. 21C, upon receiving a user input of selecting one of the restaurants, the device 100 may transmit a name of the selected restaurant to a device of the sender.

For example, upon receiving a user input of selecting "Bubba Gump" from the list of restaurants, the device 100 may transmit a reply message 2170 of "Bubba Gump" to the device of the sender. Together with the reply message 2170, the device 100 may also transmit ID information of the selected restaurant identified by the restaurant information server. The device 100 may also display the reply message 2170 on a chat window.

Figure 22A:
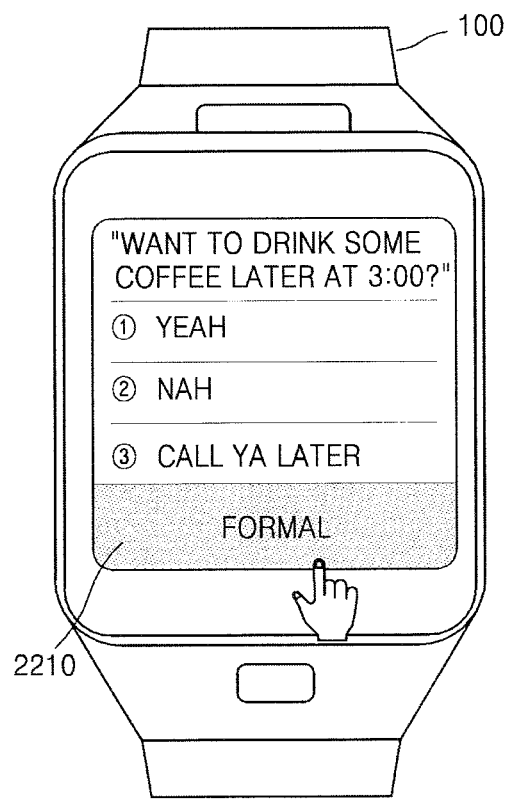
FIGS. 22A and 22B are diagrams of a method of providing, by a device, recommended reply messages in formal or informal styles, according to an embodiment of the present disclosure.
Figure 22B:

FIGS. 22A and 22B are diagrams of a method of providing, by a device, recommended reply messages in formal or informal styles, according to an embodiment of the present disclosure.

Referring to FIG. 22A, the device 100 may display a recommended reply message. In this case, the device 100 may display a recommended reply message in an informal style.

The device 100 may also display a toggle button 2210 for changing a recommended reply message from a formal style to an informal style or vice versa.

Referring to FIG. 22B, upon receiving a user input of selecting the toggle button 2210, the device 100 may change the recommended reply message from an informal style to a formal style.

For example, the device 100 may store recommended reply messages both in formal styles and informal styles with respect to the same reply intention. Accordingly, the device 100 may delete a recommended reply message in a formal style and display a recommended reply message in an informal style according to the same reply intention.

For example, when a message is in Korean, the device 100 may change a recommended reply message in an informal style to a formal style by adding a morpheme indicating an honorific form to each sentence For example, the device 100 may add a morpheme "요 (~yo)" indicating an honorific form to a sentence "아니 (ani)" to generate a recommended reply message in a formal style, "아니요 (aniyo)".

Figure 23A:
FIGS. 23A to 23C are diagrams of a method of providing, by a device, recommended reply messages in different styles, according to an embodiment of the present disclosure.
Figure 23B:
Figure 23C:

FIGS. 23A to 23C are diagrams for describing a method of providing, by the device 100, recommended reply messages in different styles, according to an embodiment of the present disclosure.

Referring to FIG. 23A, the device 100 may display recommended reply messages. The device 100 may display a button 2310 for changing a style of the recommended reply messages.

Examples of the style of the recommended reply messages may include a basic style, a friendly style, a cool style, and a user's style, but are not limited thereto. The user's style may mean a style the user usually uses, and the device 100 may determine a style of the user based on messages directly input by the user.

Also, the device 100 may store recommended reply messages in a plurality of styles with respect to the same reply intention.

Referring to FIG. 23B, upon receiving a user input of selecting the button 2310, the device 100 may change recommended reply messages in a basic style to a style indicated on the button 2310.

For example, when "friendly" is indicated on the button 2310 and a user input of selecting the button 2310 is received, the device 100 may obtain recommended reply messages in a friendly style from among the recommended reply messages in the plurality of styles, and display the obtained recommended reply messages. For example, the device 100 may change "yes" to "yup" stored in a friendly style.

The device 100 may also display another style on the button 2310. For example, the device 100 may display "my style" on the button 2310 to indicate that the recommended reply messages may be changed to the user's style.

Referring to FIG. 23C, upon receiving a user input of selecting the button 2310 indicating "my style", the device 100 may change the style of the recommended reply messages to the user's style.

For example, the user may tend to add an emoticon at the end of a sentence. Accordingly, the device 100 may generate recommended reply messages in the user's style by adding emoticons at the end. For example, the device 100 may change a recommended reply message "sorry" to "sorry :-(".

Figure 24A:
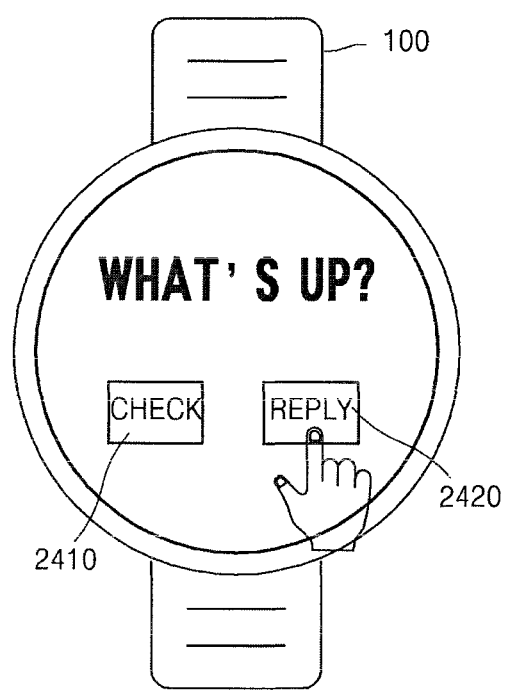
FIGS. 24A to 24C are diagrams of a method of generating a recommended reply message by combining at least two of a plurality of recommended reply messages, according to an embodiment of the present disclosure.
Figure 24B:
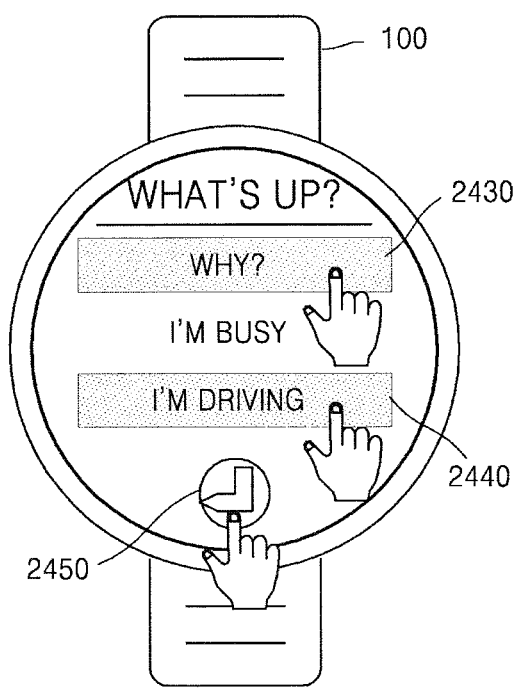
Figure 24C:
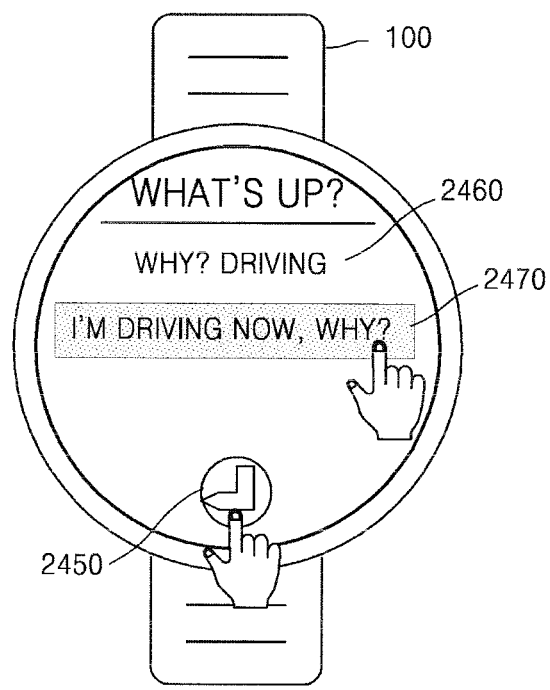

FIGS. 24A to 24C are diagrams of a method of generating a recommended reply message by combining at least two of a plurality of recommended reply messages, according to an embodiment of the present disclosure.

Referring to FIG. 24A, the device 100 may receive a message "what's up". Upon receiving the message, the device 100 may display, together with the message, a check button 2410 for inputting confirmation on checking the message, and a reply button 2420 for transmitting a reply message with respect to the message.

Referring to FIG. 24B, upon receiving a user input of touching the reply button 2420, the device 100 may display a plurality of recommended reply messages. For example, the device 100 may display phrases of "I'm driving" 2440, "why?" 2430, and "I'm busy" as the recommended reply messages with respect to the message "what's up?".

Referring to FIG. 24C, upon receiving user inputs of selecting at least two of the plurality of recommended messages and selecting a check button 2450, the device 100 may generate a new recommended reply message 2460 including reply intentions of the selected at least two recommended reply messages.

For example, upon receiving a user input of selecting the recommended reply messages, i.e., "why?" 2430 and "I'm driving" 2440, the device 100 may generate a new recommended reply message by simply connecting the selected recommended reply messages.

Upon receiving a user input of selecting the recommended reply messages, i.e., "why?" 2430 and "I'm driving" 2440, the device 100 may generate a new recommended reply message based on a reply intention of "why?" 2430 and a reply intention of "I'm driving" 2440. The device 100 may store a question about why as a reply intention of "why?" and a description about driving as a reply intention of "I'm driving".

Accordingly, the device 100 may generate a new recommended reply message indicating that the user is driving and why a sender is asking. For example, the device 100 may store "I'm driving", "driving", and "I'm driving now" as recommended reply messages indicating that the user is driving. Also, the device 100 may store "is there something you need?", "why do you ask?", and "why?" as recommended reply messages indicating why the sender is asking.

The device 100 may select "I'm driving now" and "why?" based on formality or the number of usage, and combine the two phrases to generate a new recommended reply message of "I'm driving now, why?" 2470.

Upon generating the new recommended reply messages, the device 100 may display the new recommended reply messages. Upon receiving user inputs of selecting one of the new recommended reply messages and selecting the check button 2450, the device 100 may transmit the selected new recommended reply message to a device of the sender.

Figure 25:
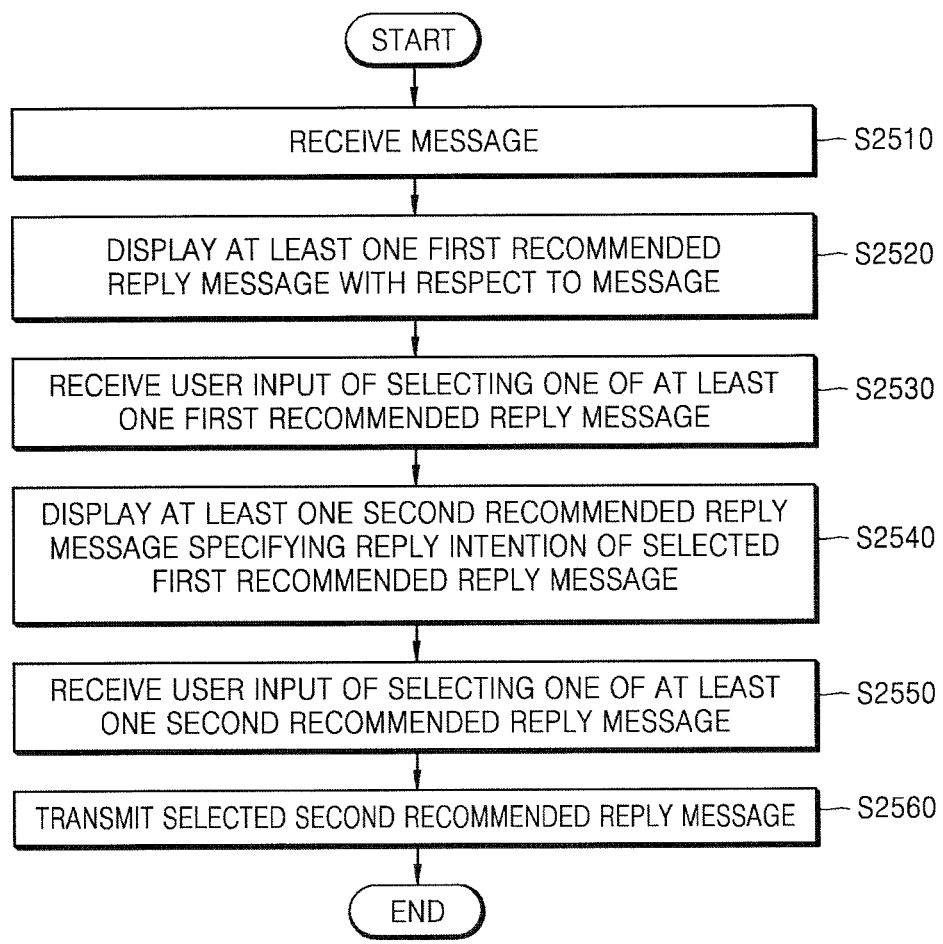
FIG. 25 is a flowchart of a method of providing, by a device, a new recommended reply message specifying a reply intention of a recommended reply message selected by a user, according to an embodiment of the present disclosure.

FIG. 25 is a flowchart of a method of providing, by a device, a new recommended reply message specifying a reply intention of a recommended reply message selected by a user, according to an embodiment of the present disclosure.

Referring to FIG. 25, in operation S2510, the device 100 may receive a message.

In operation S2520, the device 100 may display at least one first recommended reply message with respect to the message. The device 100 may determine a sending intention of the message, and determine at least one reply intention with respect to the sending intention. The device 100 may also display the at least one first recommended reply message indicating the at least one reply intention.

In operation S2530, the device 100 may receive a user input of selecting one of the at least one first recommended reply message. The user input of selecting one of the at least one first recommended reply message may be an input of selecting and then sweeping a first recommended reply message, or a long-key input on a first recommended reply message, but is not limited thereto.

In operation S2540, the device 100 may display at least two second recommended reply messages specifying a reply intention of the selected first recommended reply message. The device 100 may determine at least one of recommended reply messages pre-stored according to reply intentions as the at least one second recommended reply message specifying the reply intention. The device 100 may generate the at least one second recommended reply message specifying the reply intention by using a word in the message. The device 100 may determine a reply intention expected to be exchanged between a sender and the user based on the message, and generate at least one message indicating the reply intention as the at least one second recommended reply message.

In operation S2550, the device 100 may receive a user input of selecting one of the at least one second recommended reply message.

In operation S2560, the device 100 may transmit the selected second recommended reply message.

Figure 26A:
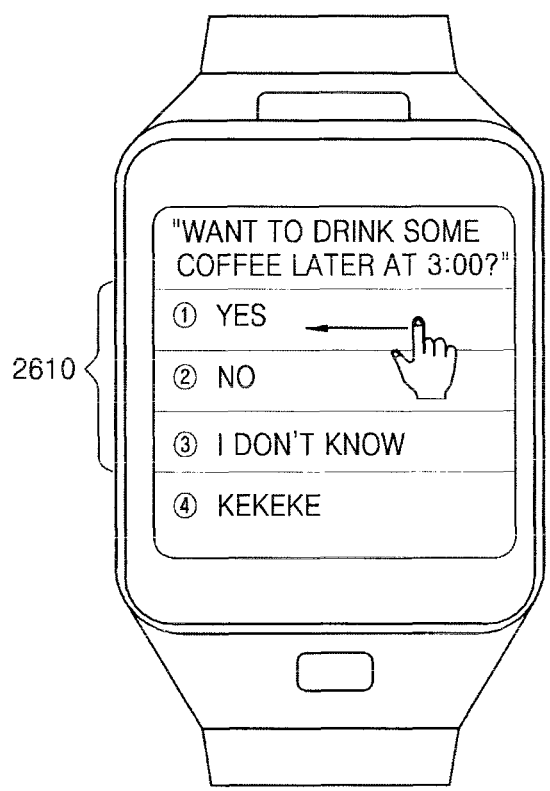
FIGS. 26A to 26C are diagrams of a method of providing, by a device, a new recommended reply message specifying a reply intention of a recommended reply message selected by a user, according to an embodiment of the present disclosure.
Figure 26B:
Figure 26C:
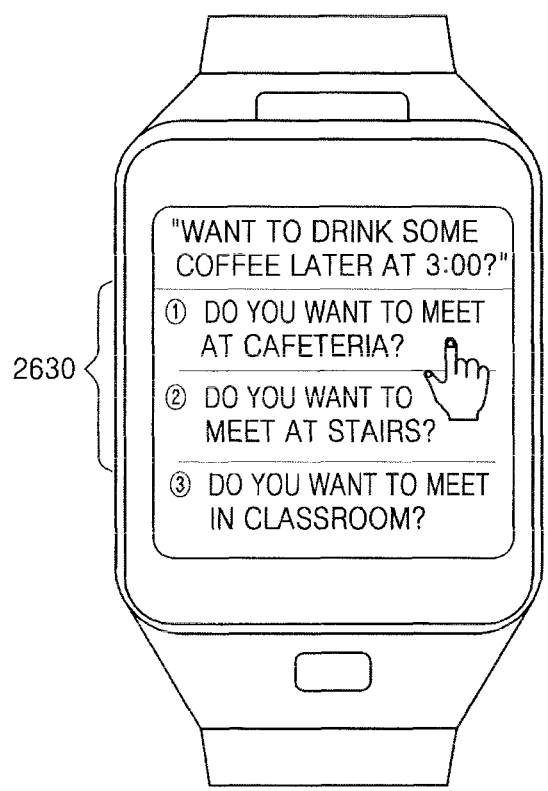

FIGS. 26A to 26C are diagrams of a method of providing, by a device, a new recommended reply message specifying a reply intention of a recommended reply message selected by a user, according to an embodiment of the present disclosure.

Referring to FIG. 26A, the device 100 may receive a message "want to drink some coffee later at 3:00?", and display a recommended reply message with respect to the message.

The device 100 may display a first recommended reply message 2610 with respect to the message. For example, the device 100 may determine whether a sending intention of the message is a yes-or-no question, and determine affirmation, negation, or ignorance as a reply intention. Also, the device 100 may display, as the first recommended reply messages 2610, "yes", "no", "I don't know", and "kekeke" indicating the replay intention.

Upon receiving a user input of selecting one of the first recommended reply messages 2610, the device 100 may transmit the selected first recommended message 2610 to a sender.

Referring to FIG. 26B, upon receiving user inputs of selecting and swiping "yes" to left, the device 100 may display at least one second recommended reply message 2620 specifying a reply intention of "yes".

A reply intention of "yes" is an affirmation intention, and the device 100 may generate at least one second recommended reply message indicating the affirmation intention. For example, the device 100 may generate a second recommended reply message indicating the affirmation intention based on "3:00", "coffee", "drink", "want", and "?", which are morphemes in the message. For example, the device 100 may display, as the second recommended reply messages 2620, "let's drink at 3:00", "coffee sounds good", and "I'll call you at 3:00".

In addition, the device 100 may determine sentence constituents of the morphemes in the message, and predict a message to be continued in conversion between a sender and the user based on the sentence constituents. For example, the device 100 may determine that the message "want to drink some coffee later at 3:00?" does not include a morpheme indicating a place, and determine a message asking about a place as the message to be continued in the conversation.

Accordingly, the device 100 may display "where do you want to meet?" as the second recommended reply message 2620.

Referring to FIG. 26C, upon receiving a user input of selecting and selecting "where do you want to meet?" from among the second recommended reply messages 2620, the device 100 may display at least one third recommended reply message 2630 specifying a reply intention of "where do you want to meet?". For example, the device 100 may determine at least one place based on a current location of the user and messages pre-exchanged between the user and the sender, and display the at least one third recommended reply message 2630 based on the at least one place. For example, the device 100 may display, as the third recommended reply messages 2630, "do you want to meet at cafeteria?", "do you want to meet at stairs?", and "do you want to meet at classroom?".

Figure 27:
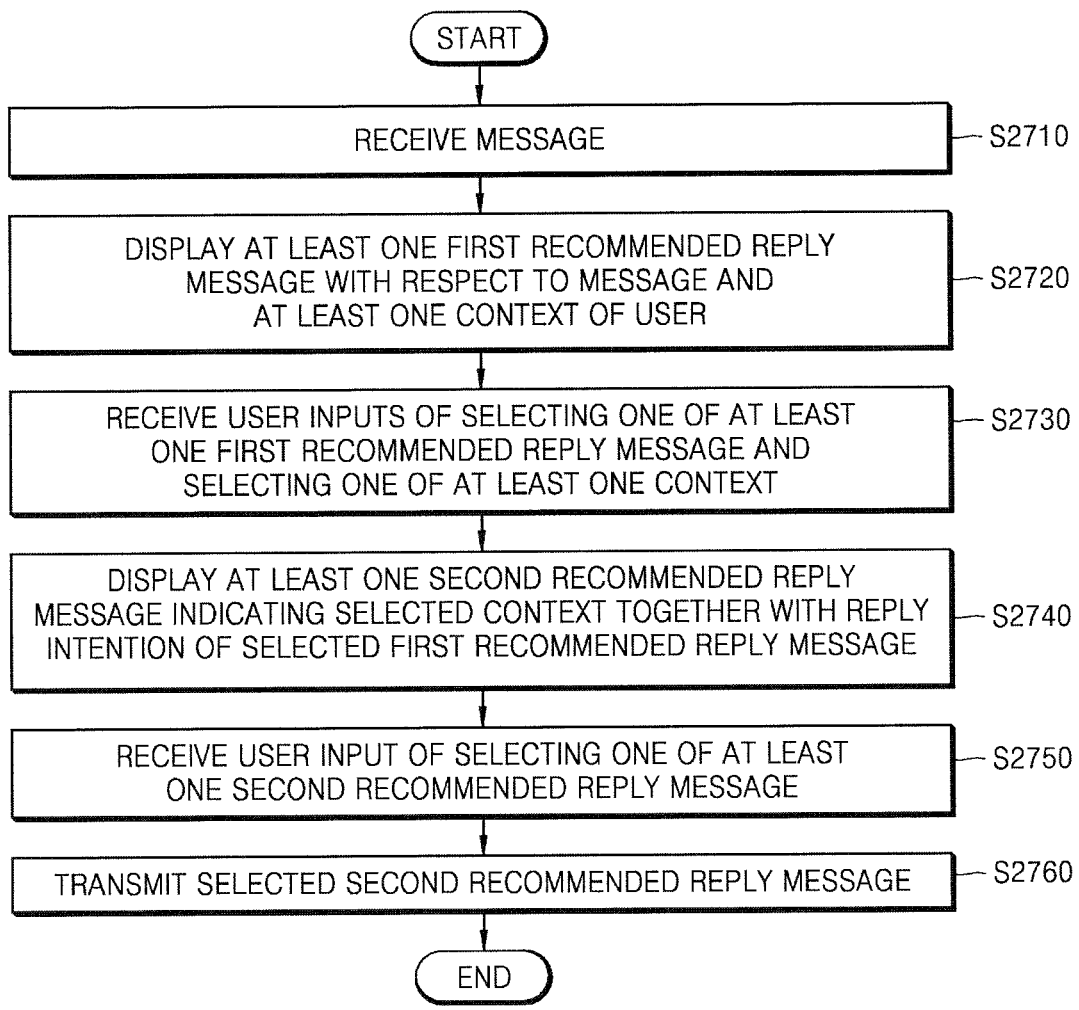
FIG. 27 is a flowchart of a method of generating, by a device, a recommended reply message based on a context selected by a user, according to an embodiment of the present disclosure.

FIG. 27 is a flowchart of a method of generating, by a device, a recommended reply message based on a context selected by a user, according to an embodiment of the present disclosure.

Referring to FIG. 27, in operation S2710, the device 100 may receive a message.

In operation S2720, the device 100 may display at least one first recommended reply message with respect to the message and at least one context of the user. The device 100 may determine a sending intention of the message, and obtain the at least one first recommended reply message corresponding to the sending intention. The device 100 may determine the at least one context of the user and display the at least one context.

In operation S2730, the device 100 may receive user inputs of selecting one of the at least one first recommended reply message and selecting one of the at least one context.

In operation S2740, the device 100 may display at least one second recommended reply message indicating the selected context together with a reply intention of the selected first recommended reply message. The device 100 may obtain the reply intention of the selected first recommended reply message, and display the at least one second recommended reply message indicating, together, the reply intention and the selected context.

In operation S2750, the device 100 may receive a user input of selecting one of the at least one second recommended reply message.

In operation S2760, the device 100 may transmit the selected second recommended reply message.

Figure 28A:
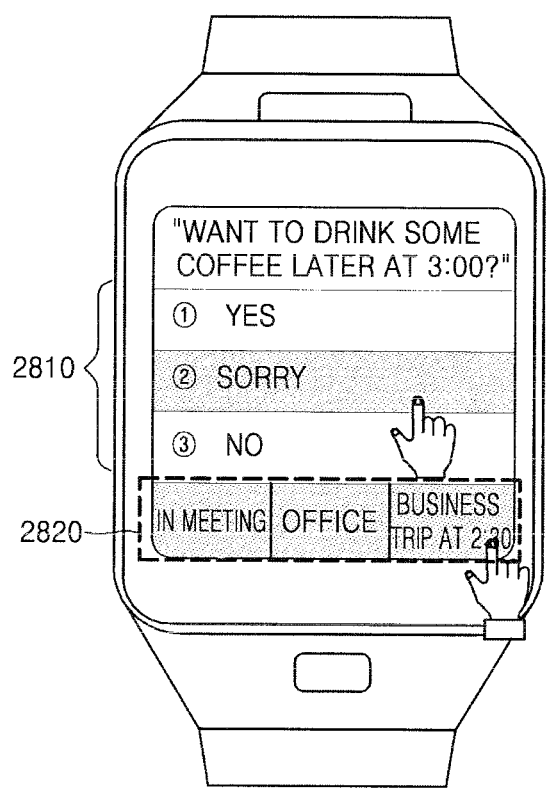
FIGS. 28A and 28B are diagrams of a method of generating, by a device, a recommended reply message based on a context selected by a user, according to an embodiment of the present disclosure.
Figure 28B:

FIGS. 28A and 28B are diagrams of a method of generating, by a device, a recommended reply message based on a context selected by a user, according to an embodiment of the present disclosure.

Referring to FIG. 28A, the device 100 may receive a message "want to drink some coffee later at 3:00?".

Upon receiving a user input of checking the message, the device 100 may display, as first recommended reply messages 2810, "yes", "sorry", and "no". Upon receiving a user input of checking the message, the device 100 may determine a context of the user. For example, the device 100 may determine in meeting as an activity, an office as a place, and a business trip at 2:30 as a schedule, as contexts of the user.

The device 100 may display, together with the first recommended reply messages 2810, contexts 2820 of the user.

Referring to FIG. 28B, the device 100 may receive user inputs of selecting one of the first recommended reply messages 2810 and at least one of the contexts 2820.

The device 100 may generate at least one second recommended reply message 2830 indicating the selected first recommended reply message and the selected context. The device 100 may generate the second recommended reply message 2830 by combining the selected first recommended reply message and the selected context. For example, when "no" is the selected first recommended reply message and "business trip at 2:30" is the selected context, the device 100 may determine, as the second recommended reply messages 2830, "sorry, I have a business trip at 2:30 :'(" and "sorry, I have a business trip at 2:30. rain check, please".

The device 100 may display the second recommended reply messages 2830, and transmit the second recommended reply message 2830 selected by the user to the sender's device.

Figure 29A:
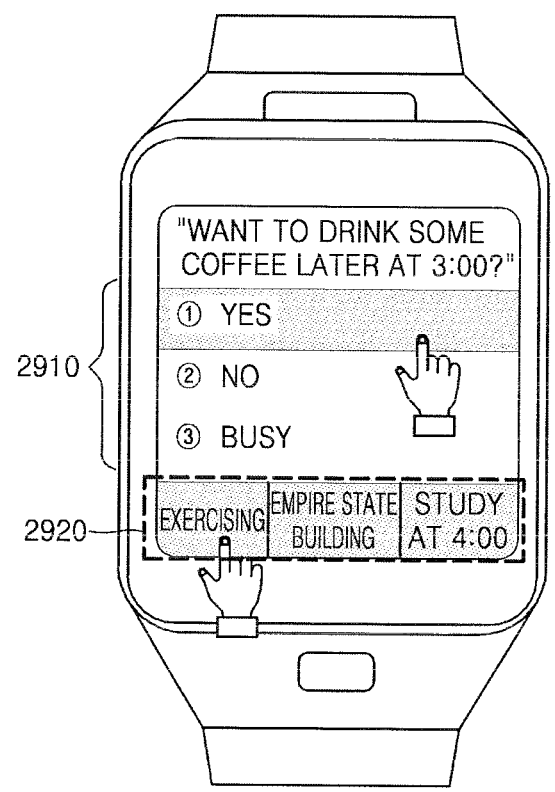
FIGS. 29A and 29B are diagrams of a method of generating, by a device, a recommended reply message based on a context selected by a user, according to another embodiment of the present disclosure.
Figure 29B:

FIGS. 29A and 29B are diagrams of a method of generating, by a device, a recommended reply message based on a context selected by a user, according to another embodiment of the present disclosure.

Referring to FIG. 29A, the device 100 may receive a message "want to drink some coffee later at 3:00?". Upon receiving a user input of checking the message, the device 100 may display "yes", "no", and "busy" as first recommended reply messages 2910. Upon receiving a user input of checking the message, the device 100 may determine a context of the user. For example, the device 100 may determine exercising as an activity, Empire State Building as a place, and study at 4:00 as a schedule, as contexts of the user.

The device 100 may display contexts 2920 of the user together with the first recommended reply message 2910.

Referring to FIG. 29B, the device 100 may receive user inputs of selecting one of the first recommended reply messages 2910 and selecting one of the contexts 2920.

The device 100 may generate at least one second recommended reply message 2930 indicating the selected first recommended reply message 2910 and the selected context 2920.

For example, when "yes" is the selected first recommended reply message and "exercising" is the selected context, the device 100 may determine, as the second recommended reply messages 2930, "yes, good. I'm exercising now" and "yes, I'm exercising now. I'll call you".

The device 100 may display the second recommended reply messages 2930, and transmit the second recommended reply message 2930 selected by the user.

Figure 30A:
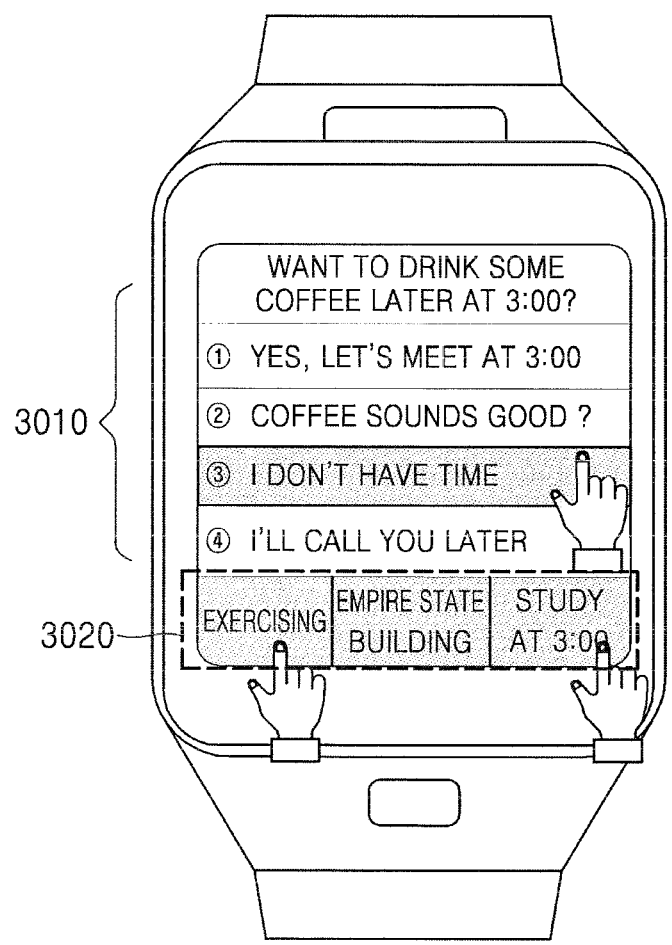
FIGS. 30A and 30B are diagrams of a method of generating, by a device, a recommended reply message based on a context selected by a user, according to an embodiment of the present disclosure.
Figure 30B:
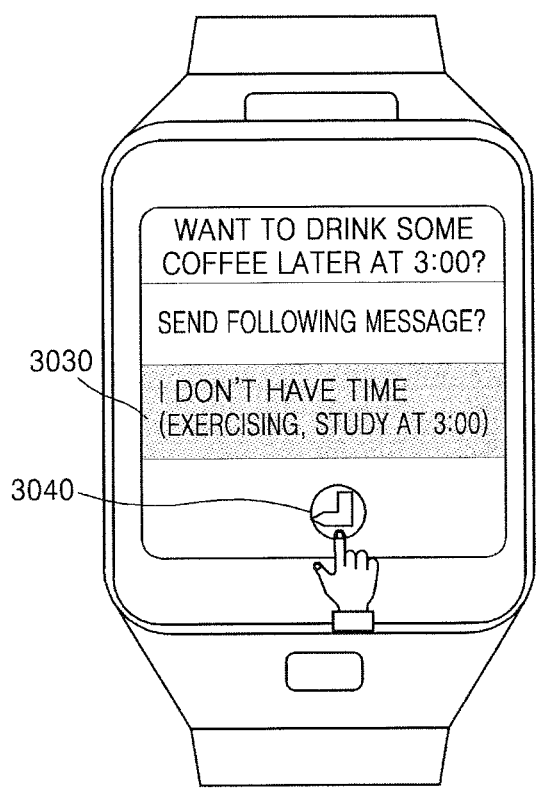

FIGS. 30A and 30B are diagrams of a method of generating, by the device 100, a recommended reply message based on a context selected by a user, according to an embodiment of the present disclosure.

Referring to FIG. 30A, the device 100 may receive a message "want to drink some coffee later at 3:00?".

Upon receiving a user input of checking the message, the device 100 may display, as first recommended reply messages 3010, "yes, let's meet at 3:00", "coffee sounds good", "I don't have time", and "I'll call you later". Also, upon receiving a user input of checking the message, the device 100 may determine a context of the user. For example, the device 100 may determine, as contexts of the user, exercising as an activity, Empire State Building as a place, and study at 3:00 as a schedule.

The device 100 may display, together with the first recommended reply messages 3010, contexts 3020 of the user.

Referring to FIG. 30B, the device 100 may receive user inputs of selecting one of the first recommended reply messages 3010 and selecting at least one of the contexts 3020.

The device 100 may generate a second recommended reply message 3030 indicating the selected first recommended message 3010 and the selected at least one context 3020. The device 100 may display the selected first recommended message 3010 as distinguished from the selected at least one context 3020. For example, a context of the user may be displayed such that a phrase displayed together with the first recommended reply message is a current context of the user.

The device 100 may display a send button 3040 for transmitting the second recommended reply message 3030, and upon receiving a user input of selecting the send button 3040, transmit the second recommended reply message 3030.

Figure 31:
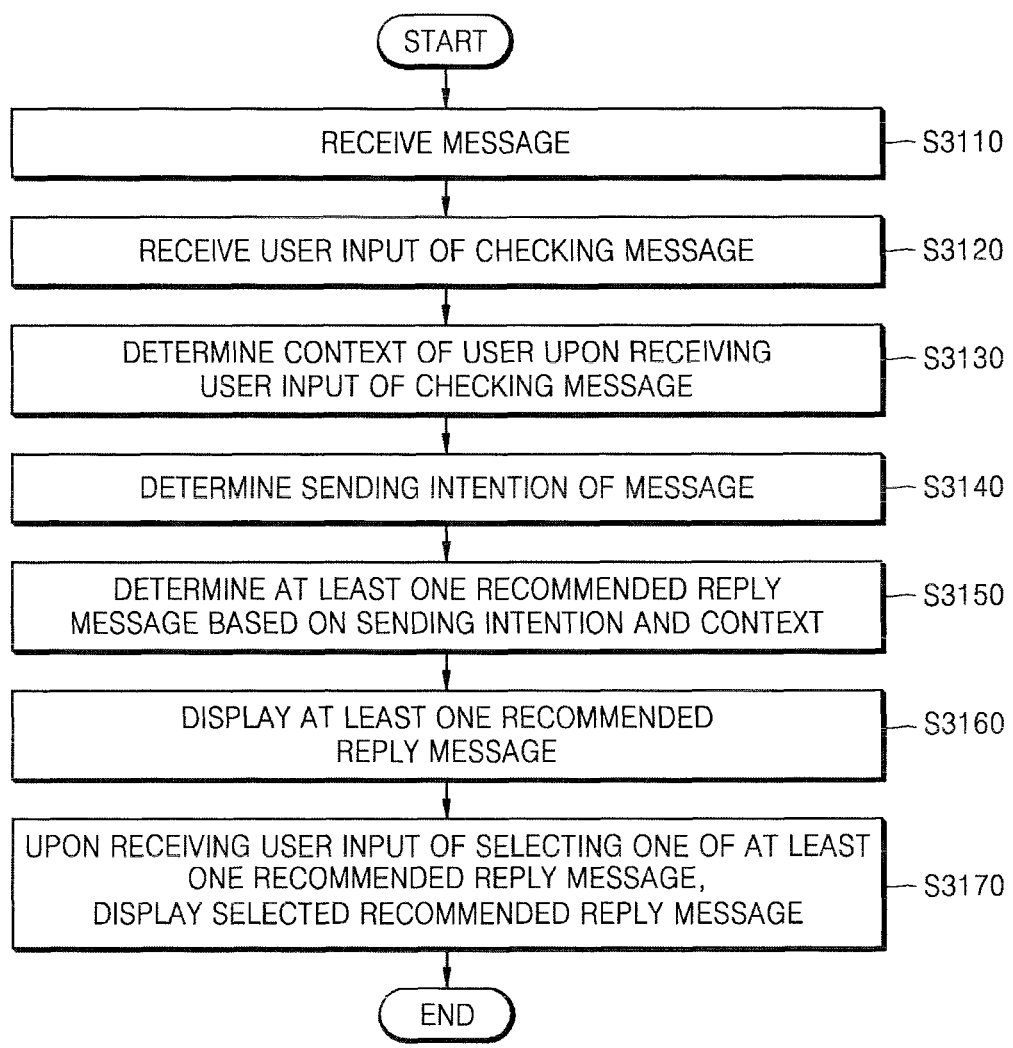
FIG. 31 is a flowchart of a method of determining, by a device, at least one recommended reply message based on a sending intention of a message and a context of a user, according to an embodiment of the present disclosure.

FIG. 31 is a flowchart of a method of determining, by the device 100, at least one recommended reply message based on a sending intention of a message and a context of a user, according to an embodiment of the present disclosure.

In operation S3110, the device 100 may receive a message.

In operation S3120, the device 100 may receive a user input of checking the message.

In operation S3130, the device 100 may determine a context of the user upon receiving the user input of checking the message. Examples of the context of the user may include a time, a day of the week, a date, a schedule of the user, a location of the user, and an activity of the user, but are not limited thereto.

In operation S3140, the device 100 may determine a sending intention of the message.

In operation S3150, the device 100 may determine at least one recommended reply message based on the sending intention and the context. The device 100 may store at least one recommended reply message according to sending intentions and contexts.

In operation S3160, the device 100 may display the at least one recommended reply message.

In operation S3170, upon receiving a user input of selecting one of the at least one recommended reply message, the device 100 may transmit the selected recommended reply message.

FIGS. 32A to 33B are diagrams of a method of determining, by a device, a recommended reply message according to a context of a user, according to various embodiments of the present disclosure.

Referring to FIGS. 32A through 33B, the device 100 may determine different recommended reply messages according to contexts of the user, even when the same message is received.

Figure 32B:
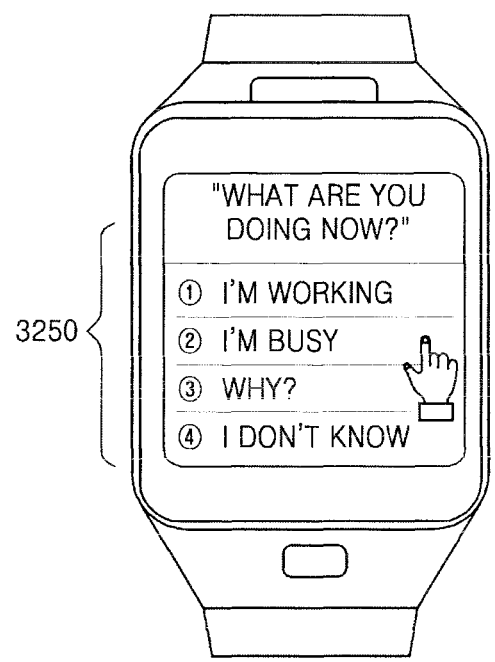

Referring to FIG. 32B, the device 100 may receive a message "what are you doing now?" at an office at 9:50 a.m. on Monday from a boyfriend.

Upon receiving a user input of checking the message, the device 100 may determine contexts 3230 of the user. Regarding the contexts 3230 of the user, a day of the week may be Monday, a time may be 9:50 a.m., a place may be an office, and a schedule may be a meeting at 10:00 a.m.

The device 100 may determine that a sending intention 3210 of the message is a question asking about an activity of the user. The device 100 may determine that a message type 3220 of the message is a short-answer type.

In this case, the device 100 may determine a reply intention 3240 corresponding to the sending intention 3210 and the contexts 3230. For example, the device 100 may store replay intentions of a question (WHY_ASK) asking why a sender is asking, a description (STATUS_WORKING) that the user is working, a description (STATUS_BUSY) that the user is busy, and a description (NOT_SURE) that it is difficult to determine now, correspondingly to a sending intention of a question asking about an activity and contexts of a weekday, morning, and an office.

Accordingly, the device 100 may obtain, from a corpus database, "why?" as a recommended reply message indicating the question (WHY_ASK), "I'm working" as a recommended reply message indicating the description (STATUS_WORKING), "I'm busy" as a recommended reply message indicating the description (STATUS_BUSY), and "I don't know) as a recommended reply message indicating the description (NOT_SURE). The device 100 may display recommended reply messages 3250 obtained as such.

Figure 33B:
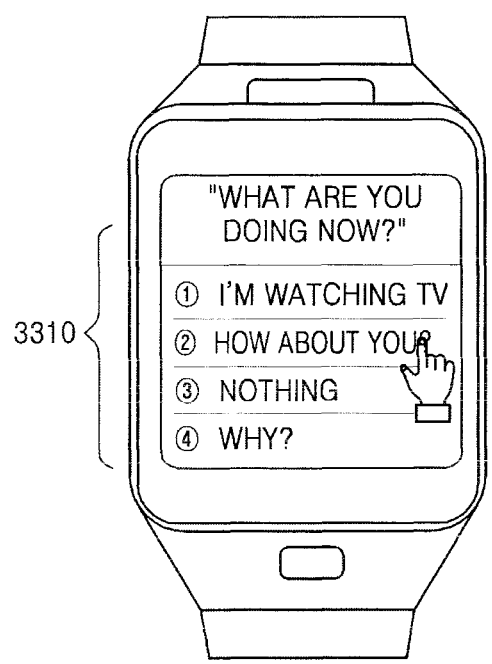

Referring to FIG. 33B, the device 100 may receive the same message 3310 from the boyfriend at 9:30 a.m. on Saturday at home.

Upon receiving a user input of checking the message, the device 100 may determine the contexts 3230 of the user. Regarding the contexts 3230, a day of the week may be Saturday, a time may be 9:30 a.m., a place may be home, and a schedule may be a plan with friends at 1:00 p.m.

In this case, the device 100 may determine, as the reply intentions 3240, a question (WHY_ASK) asking why a sender is asking, a description (ACTIVITY_WATCHING_TV) that the user is watching TV, a question (ASK_WHAT_ABOUT_YOU) asking the sender the same thing, and a description (ACTIVITY_DOING_NOTHING) that the user is doing nothing, correspondingly to the sending intention and the contexts.

Accordingly, the device 100 may obtain, from a corpus database, "why?" as a recommended reply message indicating the question (WHY_ASK), "I'm watching TV" as a recommended reply message indicating the description (ACTIVITY_WATCHING_TV), "how about you?" as a recommended reply message indicating the question (ASK_WHAT_ABOUT_YOU), and "nothing" as a recommended reply message indicating the description (ACTIVITY_DOING_NOTHING). The device 100 may display recommended reply messages 3310 obtained as such.

As shown in FIGS. 32A through 33B, the device 100 may provide recommended reply messages according to contexts of the user even when the same messages are received.

Figure 34:
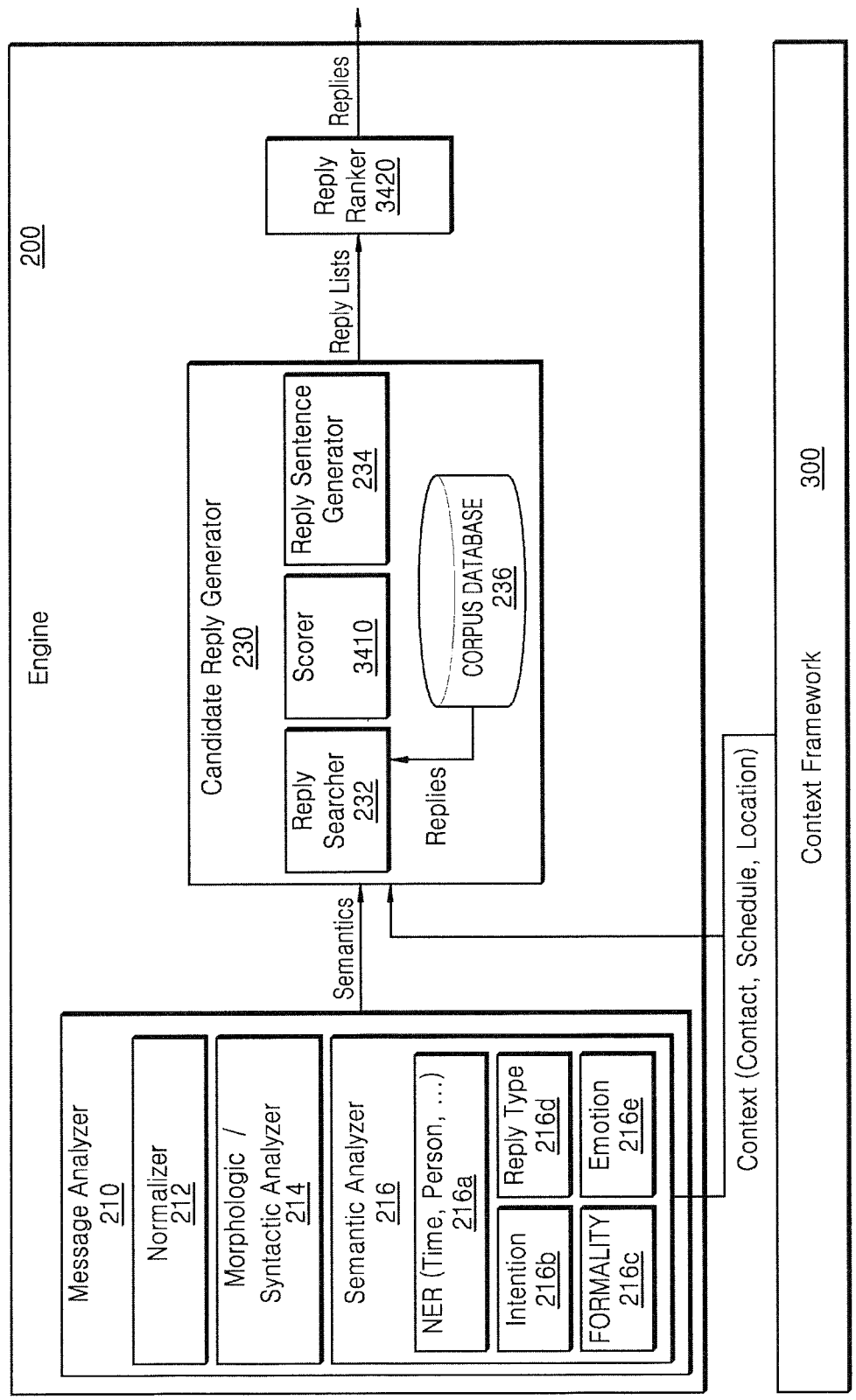
FIG. 34 illustrates an engine for generating a recommended reply message, according to an embodiment of the present disclosure.

FIG. 34 illustrates an engine for generating a recommended reply message, according to another embodiment of the present disclosure.

Referring to FIG. 34, the user may transmit different reply messages according to contexts even when same messages are received. For example, even when the user receives the same message "what's up?", the user may tend to transmit a reply intention of describing that the user is exercising and indicating that the user will contact again, such as "I'm exercising. I'll call you later" during exercising, but may tend to transmit a reply intention of notifying that the user is busy, such as "I'm busy now", during meeting.

Accordingly, the device 100 may determine a reply intention that is highly likely to be transmitted based on a current context of the user, based on a history of reply messages transmitted by the user with respect to one sending intention. In this case, the device 100 may determine a probability of transmitting a reply intention according to a current context based on a machine learning method.

The candidate reply generator 230 of FIG. 34 may include not only the reply searcher 232, the reply sentence generator 234, and the corpus database 236, but also a scorer 3410.

The scorer 3410 may calculate a probability of transmitting a reply intention based on a context of the user. For example, when a message having a sending intention of asking whether the user is tired is received, and contexts of the user is a weekday regarding a day of the week, an office regarding a place, and a wife regarding a sender, the scorer 3410 may average a correlation between an affirmation intention, the weekday, the office, and the wife to determine 75% as a probability of the affirmation intention, and average a correlation between a negation intention, the weekday, the office, and the wife to determine 25% as a probability of the negation intention.

The reply sentence generator 234 may determine a recommended reply message based on the probabilities calculated by the scorer 3410. For example, the reply sentence generator 234 may determine a recommended reply message indicating a reply intention having a high probability.

The engine 200 may include a reply ranker 3420. The reply ranker 3420 may store sending intentions of received messages and messages pre-transmitted according to contexts when message are received. The pre-transmitted messages may include a message selected by the user from among recommended reply messages or a message directly prepared by the user.

The reply ranker 3420 may determine a priority of contexts based on a selected message. For example, when sending intentions of messages are the same, the reply ranker 3420 may determine priority of contexts the user thinks important based on a message selected by the user. When a greeting message is received on a Christmas morning, the reply ranker 3420 may recommend "good morning" and "Merry Christmas", and when the user selects "Merry Christmas", the reply ranker 3420 may determine a priority of a holiday or an anniversary higher than that of a time. Upon determining a priority of contexts, the reply ranker 3420 may recommend a reply message based on a context having a high priority based on the determined priority.

FIGS. 35A and 35B are diagrams of a method of calculating, by a device, a correlation between a reply intention and a context or a sender, based on a pre-transmitted message of a user, according to an embodiment of the present disclosure.

Referring to FIG. 35A, the device 100 may store a received message 3520, a reply message 3510 regarding the received message 3520, a context 3530 when the reply message 3510 is transmitted, and a relationship 3540 between the user and a sender.

The context 3530 of the user may include a time, a day of the week, a date, a schedule of the user, a location of the user, an activity of the user, and a time the user arrived home the previous day, but is not limited thereto.

The user may transmit, to the senders, reply messages having different reply intentions according to contexts when the replay messages are transmitted with respect to messages having the same sending intention. The user may transmit, to the senders, reply messages having different reply intentions according to relationships with the senders with respect to messages having the same sending intention.

For example, as shown in FIG. 35A, with respect to a message asking whether the user is tired, when a day of the week the message is received is a weekday, the user may tend to transmit a reply message indicating affirmation, whereas when a day of the week the message is received is a weekend, the user may tend to transmit a reply message indicating negation. With respect to the message asking whether the user is tired, when a location of the user is an office, the user may tend to transmit a reply message indicating affirmation, whereas when a location is home, the user may tend to transmit a reply message indicating negation.

Accordingly, the device 100 may store a reply intention of a reply message according to a context of the user when the reply message is transmitted, and calculate a correlation between the context and the reply intention. The device 100 may store a reply intention of a reply message according to a relationship with a sender, and calculate a correlation between the relationship and the reply intention.

Referring to FIG. 35B, with respect to one sending intention, the device 100 may calculate a correlation 3560 between a context 3550 and a reply intention. A correlation between a first context value and a first reply intention may denote a probability the user may transmit the first reply intention when a context of the user has the first context value.

A correlation between each context and a reply intention may be calculated based on messages pre-exchanged between the user and senders with respect to messages having one sending intention.

For example, with respect to a sending intention of asking whether the user is tired, the device 100 may store a reply intention of affirmation or negation. The device 100 may detect, as contexts, a day of the week, a time, a location, a time the user arrived home the previous day. Regarding a context of a day of the week, days of the week from Monday to Sunday may be stored as context values or weekdays and weekends may be stored as context values. Regarding a context of a time, morning, noon, afternoon, evening, night, and dawn may be stored as context values. Regarding a context of a date, an anniversary or a national holiday may be stored as context values. Regarding a context of a location, an office and home may be stored as context values.

Regarding the sending intention asking whether the user is tired, the device 100 may calculate correlations between each of a day of the week, a time, a location, a time the user arrived home the previous day, and a sender and an affirmation intention or a negation intention. For example, as shown in FIG. 35B, a correlation between a weekday and an affirmation intention may be 0.73%, and a correlation between a weekend and an affirmation intention may be −0.5%. A correlation between an office and an affirmation intention may be 0.82% and a correlation between home and an affirmation intention may be −0.71%.

Figure 36C:

FIGS. 36A to 36C are diagrams of a method of displaying a recommended reply message based on a correlation between a reply intention and a context or a sender, according to an embodiment of the present disclosure.

Referring to FIGS. 36A through 36C, the device 100 may display a recommended reply message based on a correlation between a context or a sender and a replay intention.

Referring to FIG. 36A, the device 100 may receive a message "are you tired?". In this case, the device 100 may determine that a sending intention 3610 of the message is a question asking whether the user is tired. The device 100 may determine a message type 3620 to be a yes-or-no type.

Upon receiving a user input of transmitting a reply message regarding the message, the device 100 may determine a context 3630 of the user. For example, the device 100 may determine that a time is night, a day of the week is a weekday, and a location is an office. The device 100 may determine that a sender 3640 is a wife of the user. The device 100 may determine, as a reply intention 3650, affirmation (ANSWER_YES), negation (ANSWER_NO), or ignorance (NOT_SURE).

Referring to FIG. 36B, the device 100 may determine a probability of transmitting a reply intention based on a determined context. For example, when a time is night, a day of the week is weekend, a location is an office, and a sender is a wife, the device 100 may calculate a probability of transmitting an affirmation intention or a negation intention based on correlations between each context value shown in FIG. 35A and an affirmation intention.

Referring to FIG. 36C, the device 100 may display recommended reply messages 3660 based on a probability of a reply intention. For example, when a probability of an affirmation intention and a probability of a negation intention are different by at least a reference value, the device 100 may display recommended reply messages having reply intentions according to a probability order of the reply intentions. For example, the device 100 may display a recommended reply message having a reply intention of a high probability before a recommended reply message having a reply intention of a low probability.

The device 100 may display only a recommended reply message having a reply intention of a high probability. The device 100 may transmit a recommended reply message having a reply intention of a high probability to a sender without a user input.

Figure 37:
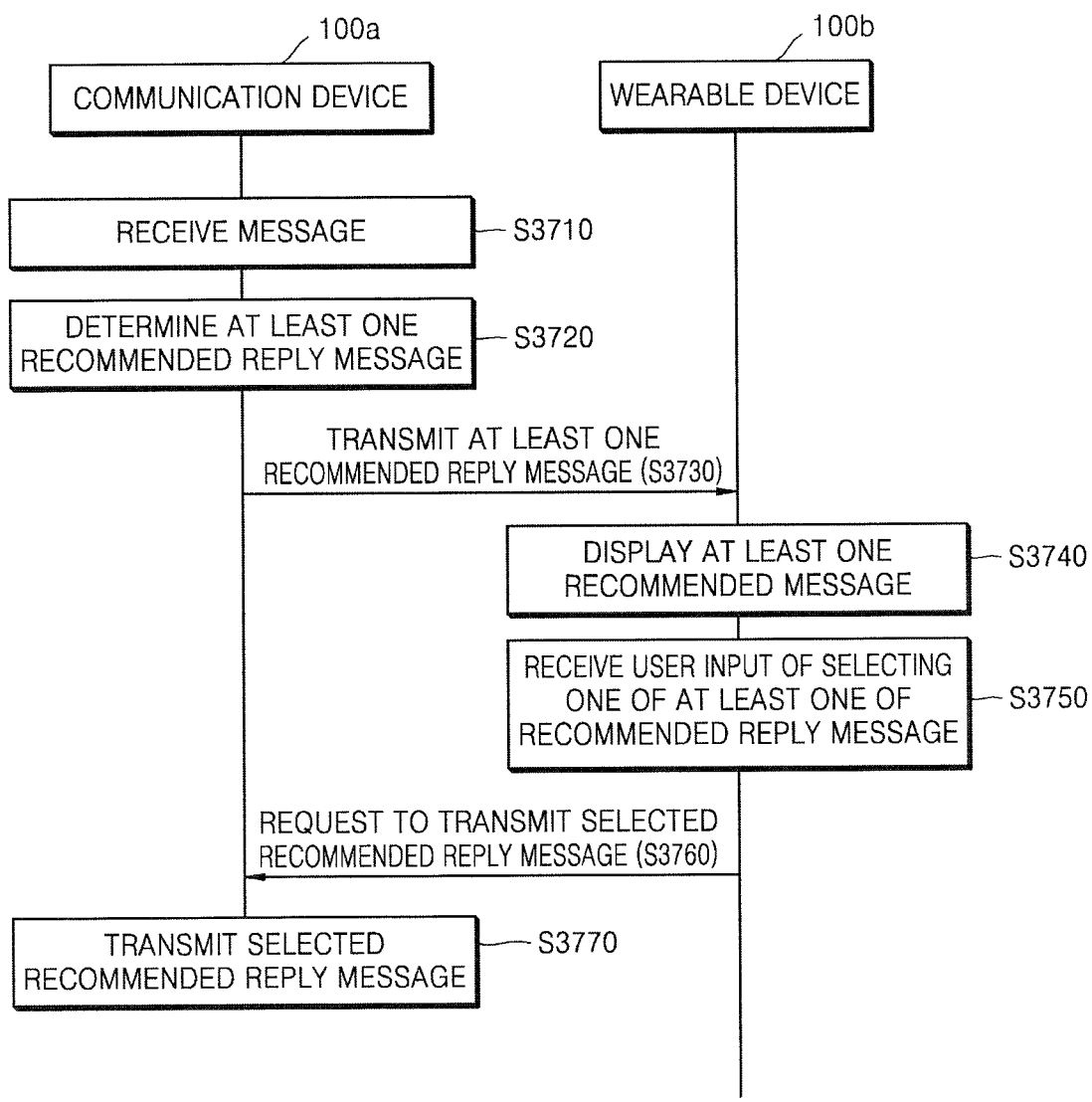
FIG. 37 is a flowchart of a method of providing a recommended reply message regarding a received message by using a communication device and a wearable device, according to an embodiment of the present disclosure.

FIG. 37 is a flowchart of a method of providing a recommended reply message regarding a received message by using a communication device and a wearable device, according to an embodiment of the present disclosure.

Referring to FIG. 37, the communication device 100a and the wearable device 100b may include at least one configuration in the engine 200 of FIG. 2 or 34. For example, components of the engine 200 of FIG. 2 or 34 may be divided into the communication device 100a and the wearable device 100b.

In operation S3710, the communication device 100a may receive a message.

The communication device 100a may perform not only a near field communication (NFC), but also a remote wireless communication. The communication device 100a may perform a wired communication. Accordingly, the communication device 100a may receive a message from a message server.

In operation S3720, the communication device 100a may determine at least one recommended reply message.

The communication device 100a may determine a sending intention or a message type of the message, and determine at least one recommended reply message based on the sending intention or the message type. The communication device 100a may include the configuration shown in FIG. 2.

In operation S3730, the communication device 100a may transmit the at least one recommended reply message to the wearable device 100b.

The wearable device 100b may denote the device 100 worn by the user. The wearable device 100b may be the device 100 that is not capable of performing a remote wireless communication. Accordingly, the wearable device 100b may not be able to directly receive a message from a message server.

An NFC connection may be set between the communication device 100a and the wearable device 100b. For example, the communication device 100a and the wearable device 100b may be Bluetooth-paired. Accordingly, when the wearable device 100b is located within a reference distance from the communication device 100a, the NFC connection may be automatically set between the communication device 100a and the wearable device 100b. When the NFC connection is set between the wearable device 100b and the communication device 100a, the communication device 100a may transmit the at least one recommended reply message to the wearable device 100b. The communication device 100a may transmit the at least one recommended reply message to the wearable device 100b together with the message received from a sender.

When the wearable device 100b is located outside the reference distance from the communication device 100a or the NFC connection between the communication device 100a and the wearable device 100b is not set due to a reason, such as a NFC function of the wearable device 100b or the communication device 100a is turned off, the communication device 100a may not transmit the at least one recommended reply message to the wearable device 100b, and display the at least one recommended reply message on a screen of the communication device 100a.

In operation S3740, the wearable device 100b may display the at least one recommended reply message.

The wearable device 100b may display the at least one recommended reply message and the message received from the sender. For example, the wearable device 100b may display the message received from the sender, and upon receiving a user input of inputting a reply message regarding the message, display the at least one recommended reply message.

In operation S3750, the wearable device 100b may receive a user input of selecting one of the at least one recommended reply message. The wearable device 100b may also receive a user input of commanding to transmit the selected recommended reply message.

In operation S3760, the wearable device 100b may request the communication device 100a to transmit the selected recommended reply message. The wearable device 100b may transmit the selected recommended reply message or ID information of the selected recommended reply message to the communication device 100a.

In operation S3770, the communication device 100a may transmit the selected recommended reply message to the sender.

The communication device 100a may also store the selected recommended reply message and a reply intention of the selected recommended reply message in correspondence to a sending intention of the message.

When the wearable device 100b receives the message through the communication device 100a, the communication device 100a may transmit information about whether the user is absent to a device of the sender based on a status of the NFC connection between the wearable device 100b and the communication device 100a. For example, when the message is received after the NFC between the wearable device 100b and the communication device 100a is disconnected, the communication device 100a may automatically transmit a message that the user is absent to the device of the sender if the NFC connection is not set within 1 minute after the message is received.

Figure 38:
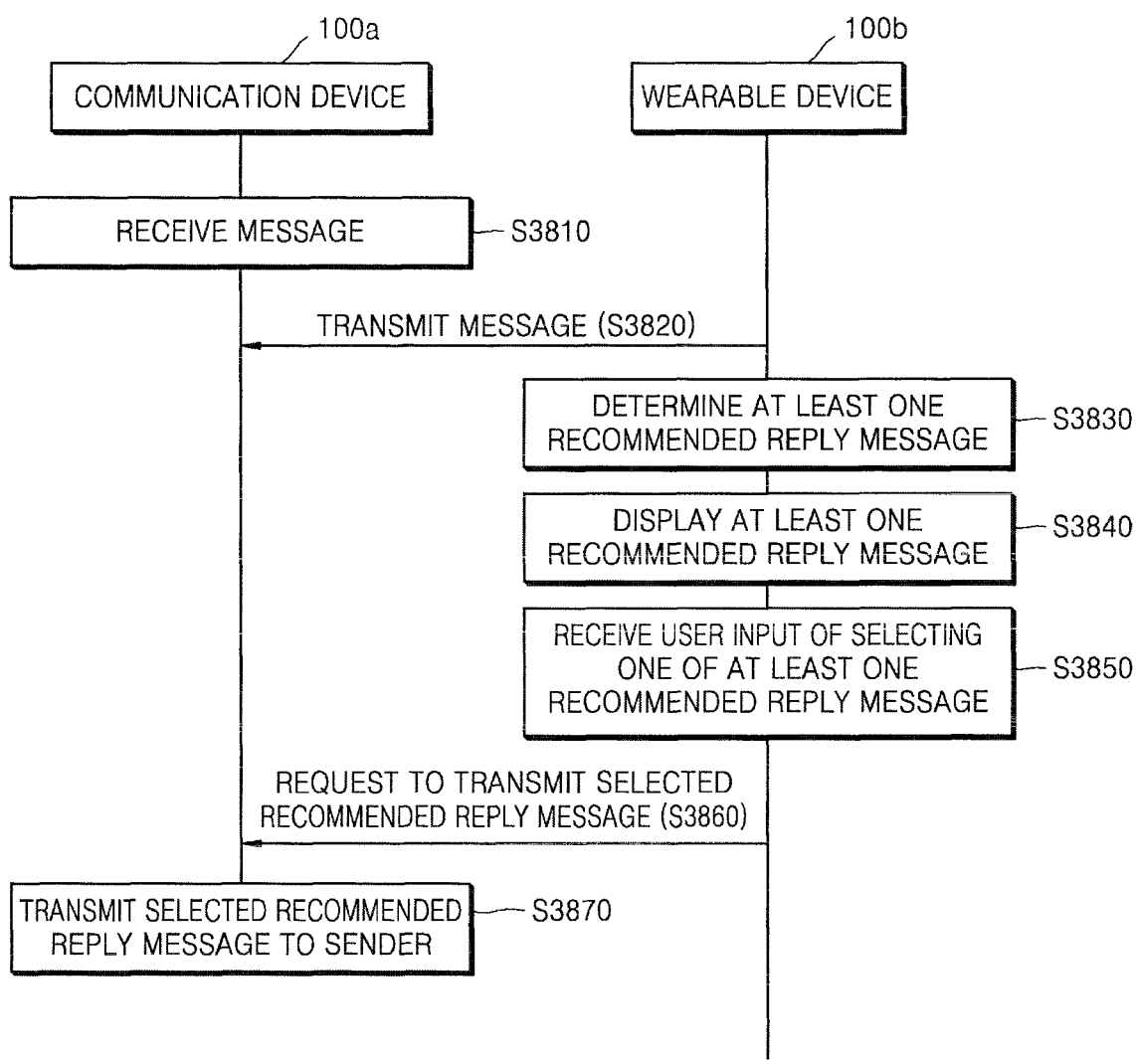
FIG. 38 is a flowchart of a method of providing a recommended reply message regarding a received message by using a communication device and a wearable device, according to an embodiment of the present disclosure.

FIG. 38 is a flowchart of a method of providing a recommended reply message regarding a received message by using a communication device and a wearable device, according to an embodiment of the present disclosure.

Referring to FIG. 38, the communication device 100a and the wearable device 100b may include at least one configuration in the engine 200 of FIG. 2 or 34. For example, components of the engine 200 of FIG. 2 or 34 may be divided into the communication device 100a and the wearable device 100b.

In operation S3810, the communication device 100a may receive a message. The communication device 100a may perform not only an NFC, but also a remote wireless communication. The communication device 100a may also perform a wired communication. Accordingly, the communication device 100a may receive a message from a message server.

In operation S3820, the communication device 100a may transmit the message to the wearable device 100b. The wearable device 100b may be the device 100 that is not capable of performing a remote wireless communication. Accordingly, the wearable device 100b may not be able to directly receive a message from a message server.

An NFC connection may be set between the communication device 100a and the wearable device 100b. For example, the communication device 100a and the wearable device 100b may be Bluetooth-paired. Accordingly, when the wearable device 100b is located within a reference distance from the communication device 100a, the NFC connection may be automatically set between the communication device 100a and the wearable device 100b. When the NFC connection is set between the wearable device 100b and the communication device 100a, the communication device 100a may transmit the message to the wearable device 100b.

When the NFC connection is not set between the communication device 100a and the wearable device 100b, the communication device 100a may not transmit the message to the wearable device 100b.

In operation S3830, the wearable device 100b may determine at least one recommended reply message. The wearable device 100b may display the message received from the communication device 100a. Upon receiving a user input of inputting a reply message regarding the message, the wearable device 100b may determine the at least one recommended reply message regarding the message.

The wearable device 100b may determine a sending intention or a message type of the message, and determine at least one recommended reply message based on the sending intention or the message type. The wearable device 100b may include the configuration shown in FIG. 2.

In operation S3840, the wearable device 100b may display the at least one recommended reply message. In operation S3850, the wearable device 100b may receive a user input of selecting one of the at least one recommended reply message.

In operation S3860, the wearable device 100b may request the communication device 100a to transmit the selected recommended reply message. The wearable device 100*b* may transmit the selected recommended reply message to the communication device 100*a*.

In operation S3870, the communication device 100*a* may transmit the selected recommended reply message to the sender.

The communication device 100*a* may also store the selected recommended reply message and a reply intention of the selected recommended reply message in correspondence to a sending intention of the message.

Figure 39:
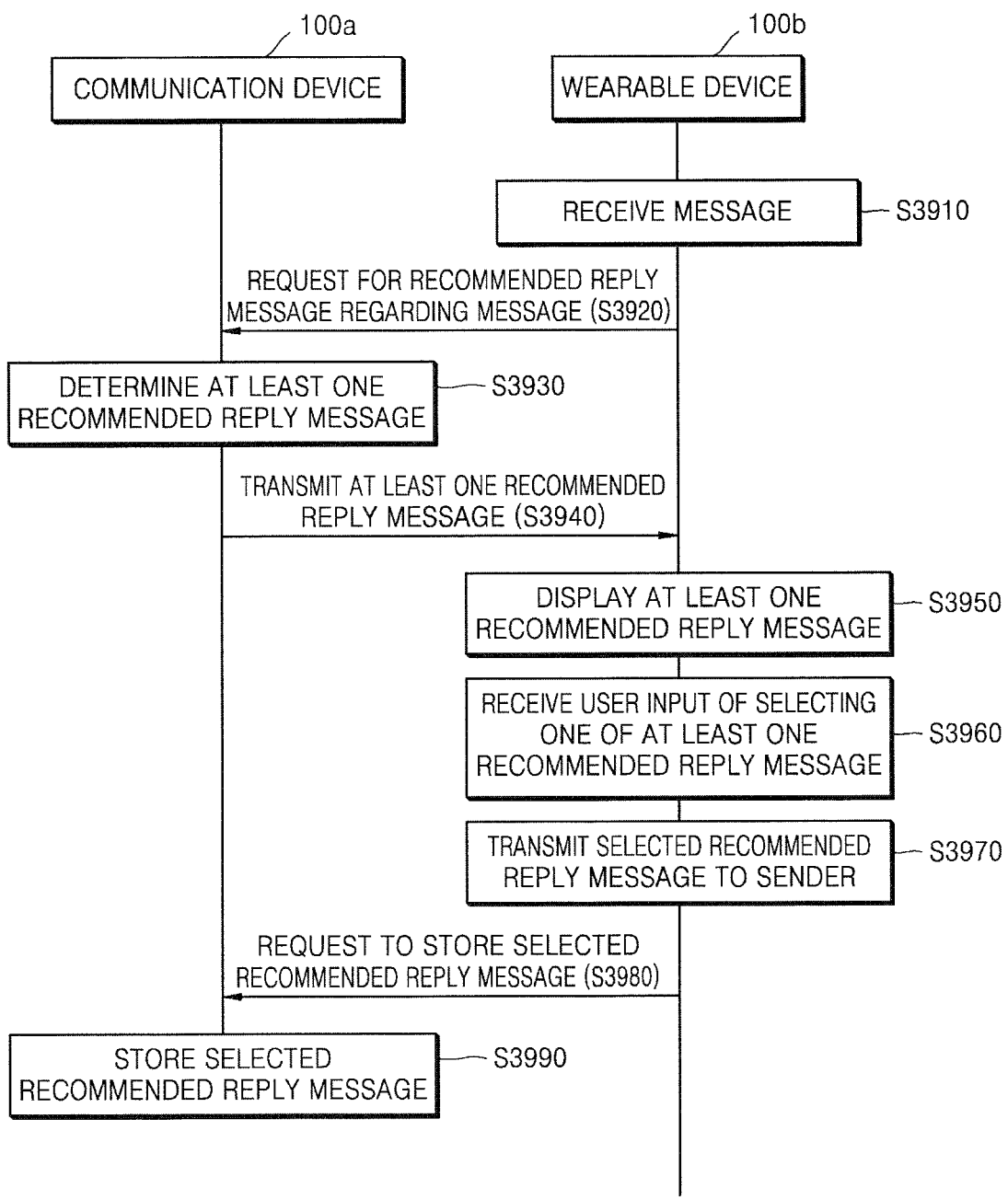
FIG. 39 is a flowchart of a method of providing a recommended reply message regarding a received message by using a communication device and a wearable device, according to an embodiment of the present disclosure.

FIG. 39 is a flowchart of a method of providing a recommended reply message regarding a received message by using a communication device and a wearable device, according to an embodiment of the present disclosure.

Referring to FIG. 39, the communication device 100*a* and the wearable device 100*b* may include at least one configuration in the engine 200 of FIG. 2 or 34. For example, components of the engine 200 of FIG. 2 or 34 may be divided into the communication device 100*a* and the wearable device 100*b*.

In operation S3910, the wearable device 100*b* may receive a message. The wearable device 100*b* may perform not only an NFC, but also a remote wireless communication. Accordingly, the wearable device 100*b* may receive a message from a message server.

In operation S3920, the wearable device 100*b* may request the communication device 100*a* for a recommended reply message regarding the message.

An NFC connection may be set between the communication device 100*a* and the wearable device 100*b*. For example, the communication device 100*a* and the wearable device 100*b* may be Bluetooth-paired. Accordingly, when the wearable device 100*b* is located within a reference distance from the communication device 100*a*, the NFC connection may be automatically set between the communication device 100*a* and the wearable device 100*b*. When the NFC connection is set between the wearable device 100*b* and the communication device 100*a*, the wearable device 100*b* may request the communication device 100*a* for a recommended reply message regarding the message.

In this case, the wearable device 100*b* may transmit the message to the communication device 100*a*.

In operation S3930, the communication device 100*a* may determine at least one recommended reply message. The communication device 100*a* may determine a sending intention or a message type of the message, and determine at least one recommended reply message based on the sending intention or the message type. The communication device 100*a* may include the configuration shown in FIG. 2.

In operation S3940, the communication device 100*a* may transmit the at least one recommended reply message to the wearable device 100*b*.

In operation S3950, the wearable device 100*b* may display the at least one recommended reply message. In operation S3960, the wearable device 100*b* may receive a user input of selecting one of the at least one recommended reply message.

In operation S3970, the wearable device 100*b* may transmit the selected recommended reply message to a sender of the message.

In operation S3980, the wearable device 100*b* may request the communication device 100*a* to store the selected recommended reply message.

In operation S3990, the communication device 100*a* may store the selected recommended reply message.

The communication device 100*a* may store the selected recommended reply message and a reply intention of the selected recommended reply message in correspondence to the sending intention of the message.

Figure 40:
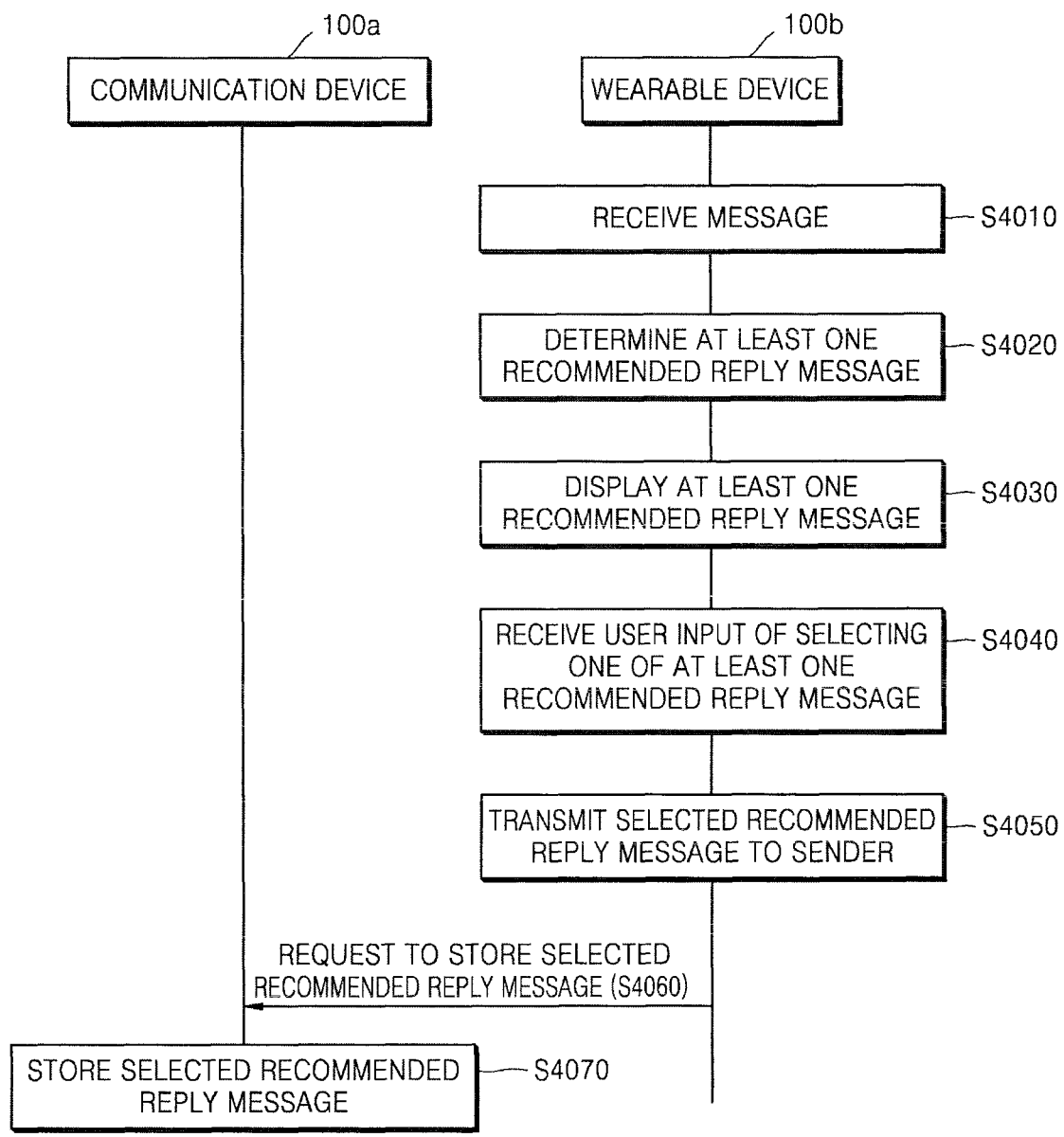
FIG. 40 is a flowchart of a method of providing a recommended reply message regarding a received message by using a communication device and a wearable device, according to an embodiment of the present disclosure.

FIG. 40 is a flowchart of a method of providing a recommended reply message regarding a received message by using a communication device and a wearable device, according to an embodiment of the present disclosure.

Referring to FIG. 40, the communication device 100*a* and the wearable device 100*b* may include at least one configuration in the engine 200 of FIG. 2 or 34. For example, components of the engine 200 of FIG. 2 or 34 may be divided into the communication device 100*a* and the wearable device 100*b*.

In operation S4010, the wearable device 100*b* may receive a message. The wearable device 100*b* may perform not only an NFC, but also a remote wireless communication. Accordingly, the wearable device 100*b* may receive a message from a message server.

In operation S4020, the wearable device 100*b* may determine at least one recommended reply message. The wearable device 100*b* may display the message, and upon receiving a user input of inputting a reply message regarding the message, the wearable device 100*b* may determine the at least one recommended reply message regarding the message.

The wearable device 100*b* may determine a sending intention or a message type of the message, and determine the at least one recommended reply message based on the sending intention or the message type. The wearable device 100*b* may include the configuration shown in FIG. 2.

In operation S4030, the wearable device 100*b* may display the at least one recommended reply message. In operation S4040, the wearable device 100*b* may receive a user input of selecting one of the at least one recommended reply message.

In operation S4050, the wearable device 100*b* may transmit the selected recommended reply message to a sender of the message.

In operation S4060, the wearable device 100*b* may request the communication device 100*a* to store the selected recommended reply message.

In operation S4070, the communication device 100*a* may store the selected recommended reply message.

The communication device 100*a* may store the selected recommended reply message and a reply intention of the selected recommended reply message in correspondence to the sending intention of the message.

Figure 41:
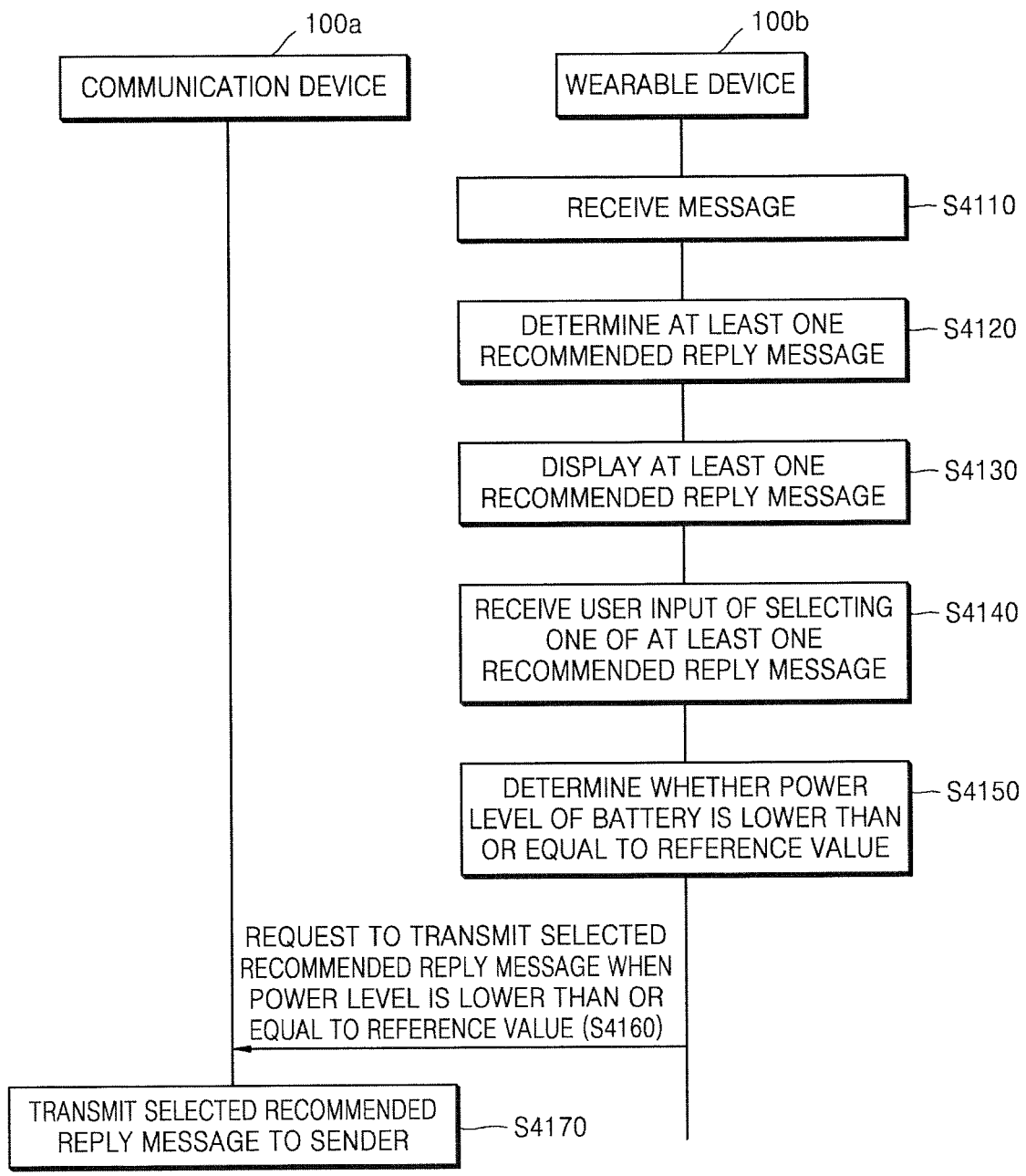
FIG. 41 is a flowchart of a method of providing a recommended reply message regarding a received message by using a communication device and a wearable device, according to an embodiment of the present disclosure.

FIG. 41 is a flowchart of a method of providing a recommended reply message regarding a received message by using a communication device and a wearable device, according to an embodiment of the present disclosure.

Referring to FIG. 41, the communication device 100*a* and the wearable device 100*b* may include at least one configuration in the engine 200 of FIG. 2 or 34. For example, components of the engine 200 of FIG. 2 or 34 may be divided into the communication device 100*a* and the wearable device 100*b*.

In operation S4110, the wearable device 100*b* may receive a message. In operation S4120, the wearable device 100*b* may determine at least one recommended reply message. In operation S4130, the wearable device 100*b* may display the at least one recommended reply message. In operation S4140, the wearable device 100*b* may receive a user input of selecting one of the at least one recommended reply message. Operations S4110 through S4140 may be respectively the same as operations S4310 through S4340 of FIG. 43.

In operation S4150, the wearable device 100b may determine whether a power level of a battery of the wearable device 100b is lower than or equal to a reference value.

In operation S4160, when the power level of the battery is lower than or equal to the reference value, the wearable device 100b may request the communication device 100a to transmit the selected recommended reply message.

At this time, the wearable device 100b may transmit the message, the selected recommended reply message, and ID information of a sender of the message to the communication device 100a.

In operation S4170, the communication device 100a may transmit the selected recommended reply message to the sender.

The communication device 100a may also store the selected recommended reply message and a reply intention of the selected recommended reply message in correspondence to the sending intention of the message.

Figure 42:
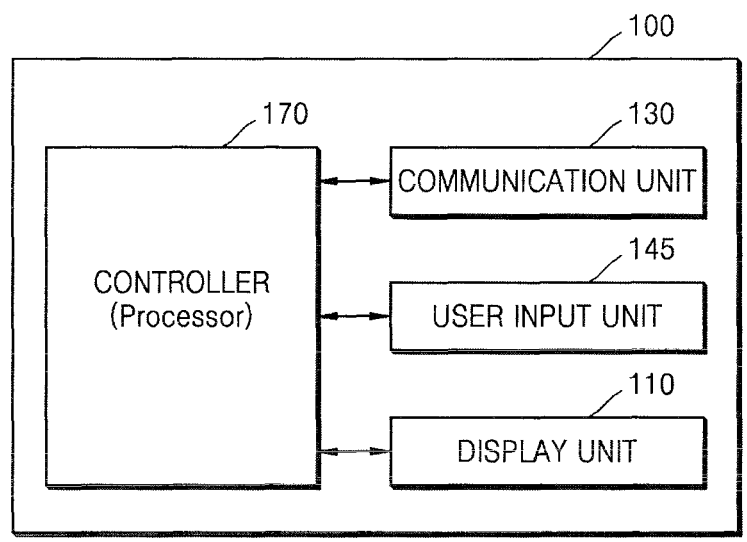
FIG. 42 is a block diagram of a device according to an embodiment of the present disclosure.

FIG. 42 is a block diagram of a device according to an embodiment of the present disclosure.

Referring to FIG. 42, the device 100 may include a display unit 110, a communication unit 130, a user input unit 145, and a controller 170. However, not all components shown in FIG. 42 are essential. The device 100 may be realized by greater or fewer components than those shown in FIG. 42.

The engine 200 of FIG. 2 or 34 may be realized by the configuration shown in FIG. 42. For example, the engine 200 of FIG. 2 or 34 may be realized as a program stored in a storage unit (not shown) that is executed by the controller 170.

The communication unit 130 may receive a message from another device. The communication unit 130 may transmit a reply message to another device. The communication unit 130 may request a server corresponding to a category for data in the category, and receive the data in the category from the server.

The controller 170 may determine a category of a question message. The category may include at least one of a time, a date, a place, an age, a size, a price, an activity, a food, a movie, and a person, but is not limited thereto.

The display unit 110 may display a UI for selecting data to be included in a reply message regarding the question message according to the category. The UI may include a menu for executing a function used to select data to be included in the reply message.

For example, when the category is a date, a UI corresponding to the category may include a calendar image for receiving a user input of selecting a date. When the category is a time, a UI corresponding to the category may include a clock image for receiving a user input of adjusting a time. When the category is a place, a UI corresponding to the category may include a map image for receiving a user input of selecting a spot. When the category is a phone number, a UI corresponding to the category may include a contact list of the user. When the category is a schedule, a UI corresponding to the category may include a schedule list of the user.

The controller 170 may obtain additional information specifying the data to be included in the reply message from the question message, and determine the data to be included in the reply message based on the category and the additional information.

The user input unit 145 may receive a user input of selecting the data to be included in the reply message through the UI. The user input unit 145 may receive a user input of selecting the menu. Upon receiving the user input of selecting the menu, the controller 170 may execute a function corresponding to the menu.

The controller 170 may determine a relationship between a sender and the user based on a history of messages exchanged between the sender and the user. For example, the relationship between the sender and the user may be determined based on intentions, contexts, or formality of the messages exchanged between the sender and the user. In this case, the controller 170 may determine closeness between the sender and the user or whether the user has to follow a command of the sender based on the history of the messages exchanged between the sender and the user.

The controller 170 may determine whether a received message is in an imperative sentence. When the received message is in an imperative sentence, the controller 170 may extract a command included in the received message. For example, when a message "stop playing a game" is received, the controller 170 may determine that the message is an imperative sentence and extract a command of stop playing a game.

The controller 170 may automatically perform a received command based on a relationship between a sender and the user. For example, when the user is executing a game, the controller 170 may stop a game application being executed. When the user is executing a game, the controller 170 may generate a key event for stopping a game application being executed. Accordingly, the device 100 may display a popup message asking the user whether to stop executing the game.

In this case, the controller 170 may automatically perform a received command only when the user has to follow a command from a sender.

Figure 43:
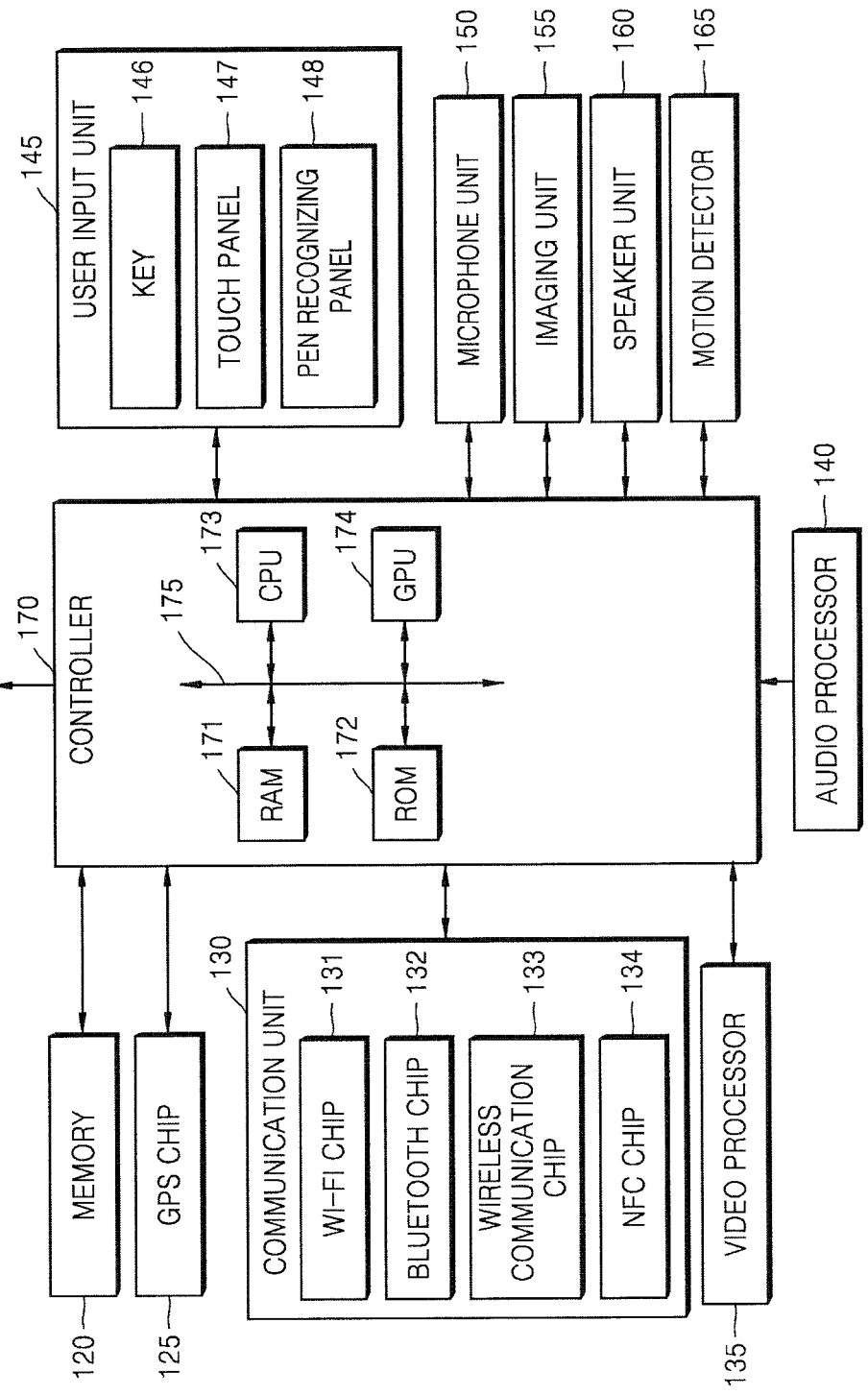
FIG. 43 is a block diagram of a device according to an embodiment of the present disclosure.

FIG. 43 is a block diagram of a device according to an embodiment of the present disclosure.

Referring to FIG. 43, the device 100 may be applied to various types of apparatuses, for example, a mobile phone, a tablet personal computer (PC), a personal digital assistant (PDA), a Moving Picture Experts Group phase 1 or phase 2 (MPEG-1 or MPEG-2) audio layer 3 (MP3) player, a kiosk, an electronic picture frame, a navigation device, a digital TV, and wearable devices, such as a smart watch, a wrist watch, smart glasses, and a head-mounted display (HMD).

As shown in FIG. 43, the device 100 may include at least one of the display unit 110, a memory 120, a GPS chip 125, the communication unit 130, a video processor 135, an audio processor 140, the user input unit 145, a microphone unit 150, an imaging unit 155, a speaker unit 160, a motion detector 165, and the controller 170.

The display unit 110 may include a display panel 111 and a controller (not shown) controlling the display panel 111. The display panel 111 may be realized as any type of display, such as a liquid crystal display (LCD), an organic light-emitting diode (OLED) display, an active-matrix OLED (AM-OLED) display, or a plasma display panel (PDP). The display panel 111 may be flexible, transparent, or wearable. The display unit 110 may combine with a touch panel 147 of the user input unit 145 to be provided as a touch screen (not shown). For example, the touch screen may include an integrated module in which the display panel 111 and the touch panel 147 are combined in a stacked structure.

The memory 1120 may include at least one of an internal memory (not shown) and an external memory (not shown). The internal memory may include, for example, at least one of a volatile memory (e.g., dynamic random access memory (DRAM), static RAM (SRAM), or synchronous DRAM (SDRAM)), a nonvolatile memory (e.g., a one-time programmable read-only memory (OTPROM), a PROM, a erasable and programmable ROM (EPROM), an electrically erasable and programmable ROM (EEPROM), a mask ROM, or a flash ROM), and a hard disk drive (HDD) or a solid-state drive (SSD). The controller 170 may load and process a command or data received from at least one of the nonvolatile memory or another component to and in the volatile memory. The controller 170 may store data received from or generated in another component, in the nonvolatile memory.

The external memory may include, for example, at least one of a compact flash (CF) card, a secure digital (SD) card, a micro-SD card, a mini-SD card, an extreme digital (xD) card, and a memory stick. The memory 120 may store various programs and data used in operations of the device 100.

The controller 170 may control the display unit 110 to display a part of content stored in the memory 120 thereon. The controller 170 may display the part of the content stored in the memory 120 on the display unit 110. Alternatively, when a user gesture occurs on a region of the display unit 110, the controller 170 may perform a control operation corresponding to the user gesture.

The controller 170 may include at least one of a RAM 171, a ROM 172, a central processing unit 173, a graphic processing unit 174, and a bus 175. The RAM 171, the ROM 172, the CPU 173, and the GPU 174 may be connected to each other through the bus 175.

The CPU 173 accesses the memory 120 to perform booting by using an operating system (OS) stored in the memory 120. The CPU 173 may perform various operations by using various programs, content, and data stored in the memory 120.

The ROM 172 stores a command set or the like for system booting. For example, when power is supplied to the device 100 as a turn-on command is input, the CPU 173 copies an OS stored in the memory 120 according to a command stored in the ROM 172, and boots a system by executing the OS. After the booting is completed, the CPU 173 copies various programs stored in the memory 120 to the RAM 171, and performs various operations by executing the various programs copied to the RAM 171. After the device 100 is booted, the GPU 174 displays a UI screen on a region of the display unit 110. The GPU 174 may generate a screen on which an electronic document including various objects, such as content, an icon, and a menu, is displayed. The GPU 174 calculates attribute values, such as coordinate values, shapes, sizes, and colors, of the objects according to a layout of the screen. The GPU 174 may generate the screen of various layouts including the objects based on the attribute values. The screen generated by the GPU 174 may be provided to the display unit 110, and displayed on a region of the display unit 110.

The GPS chip 125 receives a GPS signal from a GPS satellite to calculate a current location of the device 100. The controller 170 may calculate a location of the user by using the GPS chip 125 when a navigation program is used or when a current location of the user is required.

The communication unit 130 may communicate with any type of external device according to any type of communication method. The communication unit 130 may include at least one of a Wi-Fi chip 131, a Bluetooth chip 132, a wireless communication chip 133, and an NFC chip 134. The controller 170 may perform a communication with various external devices by using the communication unit 130.

The Wi-Fi chip 131 and the Bluetooth chip 132 may respectively perform communication via a Wi-Fi method and a Bluetooth method. When the Wi-Fi chip 131 or the Bluetooth chip 132 is used, various types of connection information, such as subsystem identification (SSID) and a session key, is received first, and then various types of information is exchanged by establishing a communication using the connection information. The wireless communication chip 133 is a chip communicating according to various communication standards, such as IEEE standards, Zigbee, third generation (3G), third generation partnership project (3GPP), and long-term evolution (LTE). The NFC chip 134 is a chip operating in an NFC manner using a 13.56 MHz band from among various radio frequency identification (RF-ID) frequency bands, such as 135 kHz, 13.56 MHz, 433 MHz, 860 to 960 MHz, and 2.45 GHz.

The video processor 135 may process video data included in content received through the communication unit 130 or in content stored in the memory 120. The video processor 135 may perform various image processes on the video data, such as decoding, scaling, noise filtering, frame rate changing, and resolution changing.

The audio processor 140 may process audio data included in content received through the communication unit 130 or in content stored in the memory 120. The audio processor 140 may perform various processes on the audio data, such as decoding, amplifying, and noise filtering.

When a reproduction program on multimedia content is executed, the controller 170 may reproduce the multimedia content by driving the video processor 135 and the audio processor 140. The speaker unit 160 may output audio data generated by the audio processor 140.

The user input unit 145 may receive various commands from the user. The user input unit 145 may include at least one of a key 146, the touch panel 147, and a pen recognizing panel 148.

The key 146 may include various types of keys, such as a mechanical button and a wheel, which are formed on various outer regions of a body of the device 100, such as a front region, a side region, and a rear region.

The touch panel 147 may detect a touch input of the user and output a touch event value corresponding to the touch input. When a touch screen (not shown) is formed as the touch panel 147 and the display panel 111 are combined, the touch screen may include any type of touch sensor, such as an electrostatic type, a pressure type, and a piezoelectric type. In the electrostatic type, a dielectric material coated on a surface of the touch screen is used to detect microelectricity induced by the user when a body of the user touches the screen, and a touched coordinate is calculated. In the pressure type, the touch screen includes two electrode plates, and when the user touches the touch screen, a touched coordinate is calculated by detecting a current flowing through the two electrode plates as the two electrode plates touch each other at a touched point. A touch event generated on the touch screen may be mainly generated by a finger of the user, but may alternatively generated by a conductive object that may apply capacitance change to the touch screen.

The pen recognizing panel 148 may detect a proximity input or a touch input of a touch pen, such as a stylus pen or a digitizer pen, and output a pen proximity event or a pen touch event. The pen recognizing panel 148 may use, for example, an electromagnetic resonance (EMR) method, and may detect a touch input or a proximity input according to a change of intensity of an electromagnetic field, which is caused as the pen approaches or touches the user input unit 145. The pen recognizing panel 148 may include an electron inducing coil sensor (not shown) having a grid structure, and an electron signal processor (not shown) providing an alternating signal having a certain frequency sequentially to each loop coil of the electron inducing coil sensor. When a pen including a resonance circuit is located near the loop coil of the pen recognizing panel 148, a magnetic field transmitted from the loop coil generates a current based on mutual electron induction in the resonance circuit. An induction magnetic field is generated from a coil forming the resonance circuit based on the current, and the pen recognizing panel 148 detects a proximity or touch location of the pen by detecting the induction magnetic field from the loop coil in a signal receiving state. The pen recognizing panel 148 may have a certain area below the display panel 111, for example, an area capable of covering a display region of the display panel 111.

The microphone unit 150 may receive the user's voice or other sound and convert the user's voice or other sound to audio data. The controller 170 may use the user's voice for a phone call operation, or convert the user's voice to audio data and store the audio data in the memory 120.

The imaging unit 155 may capture a still image or a moving image according to control of the user. A plurality of imaging units 155 may be used, such as a front camera and a rear camera.

When the imaging unit 155 and the microphone unit 150 are provided, the controller 170 may perform a control operation according to user's voice input through the microphone unit 150 or user's motion recognized by the imaging unit 155. For example, the device 100 may operate in a motion control mode or a voice control mode. In the motion control mode, the controller 170 activates the imaging unit 155 to capture the user, and performs a control operation corresponding to a motion change of the user. In the voice control mode, the controller 170 may analyze the user's voice input through the microphone unit 150, and perform a control operation according to the analyzed user's voice.

The motion detector 165 may detect movement of the body of the device 100. The device 100 may be rotated or tilted in any direction. The motion detector 165 may use at least one of various sensors, such as a geomagnetic sensor, a gyro sensor, and an acceleration sensor, to detect characteristics of the movement, such as a rotation direction, an angle, and a tilted angle.

Although not shown in FIG. 43, the device 100 may further include a universal serial bus (USB) port to which a USB connector is connected, various external input ports to which various external terminals, such as a headset, a mouse, a local area network (LAN) are connected, a digital multimedia broadcasting (DMB) chip that receives and processes a DMB signal, and various sensors.

Names of the components of the device 100 described above may be changed. The device 100 may include at least one of the components, may omits some of the components, or may include components other than the above components.

An embodiment of the present disclosure may also be realized in a form of a computer-readable recording medium, such as a program module executed by a computer. A computer-readable recording medium may be an arbitrary available non-transitory medium accessible by a computer, and examples thereof include all volatile and non-volatile media and separable and non-separable media. Examples of the computer-readable recording medium may include a non-transitory computer storage medium. Examples of the computer storage medium include all volatile and non-volatile media and separable and non-separable media, which have been implemented by an arbitrary method or technology, for storing information such as computer-readable commands, data structures, program modules, and other data.

While one or more embodiments have been particularly shown and described, it will be understood by those of ordinary skill in the art that various changes in form and details may be made therein without departing from the spirit and scope of the present disclosure as defined by the following claims. Hence, it will be understood that the embodiments described above are not limiting the scope of the present disclosure. For example, each component described in a single type may be executed in a distributed manner, and components described distributed may also be executed in an integrated form.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A wearable device for transmitting a reply message, the wearable device comprising:
   a communication unit configured to receive a question message from an external device;
   a touch screen displaying a user interface (UI); and
   a controller configured to:
     based on a sending intention of the question message received by the communication unit, identify a category of the received question message,
     obtain context information associated with a user of the wearable device, wherein the context information includes schedule information of the user stored in the wearable device, time information, and location information,
     display, in the UI, the received question message, first reply candidates corresponding to the received question message, and the context information, wherein the first reply candidates are generated based on the category of the received question message and the obtained context information,
     based on a touch input on one of the first reply candidates displayed in the UI and a touch input on one of the context information displayed in the UI, generate second reply candidates corresponding to a first reply message and the one of the context information, wherein the first reply message corresponds to the one of the first reply candidates,
     display, in the UI, the received question message and the second reply candidates, wherein the second reply candidates indicate a reply intention of the first reply message, and
     based on a touch input on one of the second reply candidates displayed in the UI, transmit, to the external device, a second reply message corresponding to the one of the second reply candidates.

2. The wearable device of claim 1, wherein the category comprises at least one of a time, a date, a place, an age, a size, a price, an activity, a food, a movie, or a person.

3. The wearable device of claim 1,
   wherein the UI comprises a menu for executing a function used to select data to be included in the reply message, and
   wherein the controller is further configured to:
     receive a user input of selecting the menu, and
     execute a function corresponding to the menu according to the user input of selecting the menu.

4. The wearable device of claim 2,
wherein the category is the date, and
wherein the UI comprises a calendar image for receiving a user input of selecting a date.

5. The wearable device of claim 2,
wherein the category is the time, and
wherein the UI comprises a watch image for receiving a user input of adjusting the time.

6. The wearable device of claim 2,
wherein the category is the place, and
wherein the UI comprises a map image for receiving a user input of selecting a location.

7. The wearable device of claim 1,
wherein the category is a phone number,
wherein the UI comprises a contact list of a user, and
wherein the controller is further configured to receive a user input of selecting one of a plurality of names in the contact list.

8. The wearable device of claim 1,
wherein the category is a schedule,
wherein the UI comprises a schedule list of a user, and
wherein the controller is further configured to receive a user input of selecting one schedule from the schedule list.

9. The wearable device of claim 1, wherein the controller is further configured to:
obtain additional information specifying data to be included in the reply message from the question message, and
determine data to be included in the UI based on the category and the additional information.

10. The wearable device of claim 1, wherein the communication unit is further configured to:
request a server corresponding to the category for a plurality of pieces of data in the category,
receive the plurality of pieces of data from the server, and
display the UI including the plurality of pieces of data,
wherein the plurality of pieces of data are included in different categories from each other.

11. A method of transmitting a reply message by a wearable device, the method comprising:
receiving a question message from an external device;
based on a sending intention of the question message received by a communication unit of the wearable device, identifying a category of the received question message;
obtaining context information associated with a user of the wearable device, wherein the context information includes schedule information of the user stored in the wearable device, time information, and location information;
displaying, in a user interface (UI) displayed on a touch screen of the wearable device, the received question message, first reply candidates corresponding to the received question message, and the context information, wherein the first reply candidates are generated based on the category of the received question message and the obtained context information;
based on a touch input on one of the first reply candidates displayed in the UI and a touch input on one of the context information displayed in the UI, generating second reply candidates corresponding to a first reply message and the one of the context information, wherein the first reply message corresponds to the one of the first reply candidates;
displaying, in the UI, the received question message and the second reply candidates, wherein the second reply candidates indicate a reply intention of the first reply message; and
based on a touch input on one of the second reply candidates displayed in the UI, transmitting, to the external device, a second reply message corresponding to the one of the second reply candidates.

12. The method of claim 11, wherein the category comprises at least one of a time, a date, a place, an age, a size, a price, an activity, a food, a movie, or a person.

13. The method of claim 11,
wherein the UI comprises a menu for executing a function used to select data to be included in the reply message, and
wherein the method further comprises:
receiving a user input of selecting the menu; and
executing a function corresponding to the menu according to the user input of selecting the menu.

14. The method of claim 12,
wherein the category is the date, and
wherein the UI comprises a calendar image for receiving a user input of selecting a date.

15. The method of claim 12,
wherein the category is the time, and
wherein the UI comprises a watch image for receiving a user input of adjusting the time.

16. The method of claim 12,
wherein the category is the place, and
wherein the UI comprises a map image for receiving a user input of selecting a location.

17. The method of claim 11,
wherein the category is a phone number,
wherein the UI comprises a contact list of a user, and
wherein the transmitting of the first reply message corresponding to the one of the first reply candidates comprises receiving a user input of selecting one of a plurality of names in the contact list.

18. The method of claim 11,
wherein the category is a schedule,
wherein the UI comprises a schedule list of a user, and
wherein the transmitting of the first reply message corresponding to the one of the first reply candidates comprises receiving a user input of selecting one schedule from the schedule list.

19. The method of claim 11, further comprising:
obtaining additional information specifying data to be included in the reply message from the question message; and
determining data to be included in the UI based on the category and the additional information.

20. The method of claim 11, further comprising:
requesting a server corresponding to the category for a plurality of pieces of data in the category;
receiving the plurality of pieces of data from the server; and
displaying the UI including the plurality of pieces of data,
wherein the plurality of pieces of data are included in different categories from each other.

* * * * *